US012659492B2

(12) United States Patent
Chen et al.

(10) Patent No.: US 12,659,492 B2
(45) Date of Patent: *Jun. 16, 2026

(54) INTER PREDICTION METHOD AND APPARATUS

(71) Applicant: HUAWEI TECHNOLOGIES CO., LTD., Shenzhen (CN)

(72) Inventors: Huanbang Chen, Shenzhen (CN); Haitao Yang, Shenzhen (CN); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/940,455

(22) Filed: Nov. 7, 2024

(65) Prior Publication Data

US 2025/0133218 A1     Apr. 24, 2025

Related U.S. Application Data

(63) Continuation of application No. 17/345,556, filed on Jun. 11, 2021, now Pat. No. 12,160,588, which is a
(Continued)

(30) Foreign Application Priority Data

Dec. 13, 2018    (CN) .......................... 201811530481.1
Apr. 22, 2019    (CN) .......................... 201910325612.0

(51) Int. Cl.
*H04N 19/159*         (2014.01)
*H04N 19/132*         (2014.01)
(Continued)

(52) U.S. Cl.
CPC ......... *H04N 19/159* (2014.11); *H04N 19/132* (2014.11); *H04N 19/137* (2014.11); *H04N 19/176* (2014.11); *H04N 19/82* (2014.11)

(58) Field of Classification Search
CPC .. H04N 19/159; H04N 19/132; H04N 19/137; H04N 19/176; H04N 19/82;
(Continued)

(56) References Cited

U.S. PATENT DOCUMENTS

2012/0250758 A1* 10/2012 Jou ...................... H04N 19/174
                                                                        375/240.03
2017/0013270 A1    1/2017 Okajima et al.
(Continued)

FOREIGN PATENT DOCUMENTS

CN          103414895 A      11/2013
CN          106134192 A      11/2016
(Continued)

OTHER PUBLICATIONS

Jianle Chen et al., Algorithm Description of Joint Exploration Test Model 7 (JEM 7). Joint Video Exploration Team JVET) of ITU-T SG 16 WP 3 and ISO/IEC JTC 1/SC 29WG 11, 7th Meeting: Torino, IT, 13 Jul. 21, 2017, JVET-G1001-v1, 50 pages (Year: 2017).*
(Continued)

*Primary Examiner* — Hesham K Abouzahra
(74) *Attorney, Agent, or Firm* — WOMBLE BOND DICKINSON (US) LLP

(57)              ABSTRACT

This application discloses an inter prediction method and apparatus. The method includes: determining a plurality of first picture blocks in a to-be-processed picture block based on a preset picture split width, a preset picture split height, and a width and a height of the to-be-processed picture block; separately performing bi-directional optical flow prediction on the plurality of first picture blocks to obtain a predictor of each first picture block; and obtaining a predictor of the to-be-processed picture block with a combination of the predictors of the plurality of first picture blocks. The apparatus includes a determining module, a prediction mod-
(Continued)

ule, and a combination module. In this application, complexity of implementing inter prediction can be reduced, and processing efficiency can be improved.

20 Claims, 17 Drawing Sheets

Related U.S. Application Data continuation of application No. PCT/CN2019/122735, filed on Dec. 3, 2019.

(51) Int. Cl.
| | | |
|---|---|---|
| *H04N 19/137* | (2014.01) | |
| *H04N 19/176* | (2014.01) | |
| *H04N 19/82* | (2014.01) | |

(58) Field of Classification Search
CPC .. H04N 19/119; H04N 19/107; H04N 19/136; H04N 19/96; H04N 19/577; H04N 19/503; H04N 19/117; H04N 19/186; H04N 19/42; H04N 19/567; H04N 19/70; H04N 19/91; H04N 19/122; H04N 19/513; H04N 19/80
See application file for complete search history.

(56) References Cited

U.S. PATENT DOCUMENTS

| | | | |
|---|---|---|---|
| 2017/0094305 A1 | 3/2017 | Li et al. | |
| 2018/0192072 A1 | 7/2018 | Chen et al. | |
| 2018/0199057 A1* | 7/2018 | Chuang | H04N 19/573 |
| 2018/0262773 A1 | 9/2018 | Chuang et al. | |
| 2019/0075328 A1* | 3/2019 | Huang | H04N 19/70 |
| 2020/0154127 A1* | 5/2020 | Lee | H04N 19/513 |

FOREIGN PATENT DOCUMENTS

| | | |
|---|---|---|
| CN | 107113425 A | 8/2017 |
| CN | 108028929 A | 5/2018 |
| JP | 7384908 B2 | 11/2023 |
| KR | 1020180061281 A | 6/2018 |
| KR | 20180119084 A | 11/2018 |
| RU | 2527751 C2 | 9/2014 |
| WO | 2017134957 A1 | 8/2017 |
| WO | 2018113658 A1 | 6/2018 |
| WO | 2018166357 A1 | 9/2018 |
| WO | 2018169099 A1 | 9/2018 |
| WO | 2018212578 A1 | 11/2018 |

OTHER PUBLICATIONS

Ching-Yeh Chen et al., CE9.5.2: BIO with simplified gradient calculation, adaptive BIO granularity, and applying BIO to chroma components. Joint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K0255-v1, 5 pages.
ITU-T H.261 (Mar. 1993), Line Transmission of Non-Telephone Signals, Video Codec for Audiovisual Services AT p x 64 kbits, total 29 pages.
Jianle Chen et al., Algorithm Description of Joint Exploration Test Model 7 (JEM 7). Joint Video Exploration Team (JVET) of ITU-T SG 16 WP 3 and ISO/IEC JTC 1/SC 29/WG 11, 7th Meeting: Torino, IT, 13 Jul. 21, 2017, JVET-G1001-v1, 50 pages.
ITU-T H.263(Jan. 2005), Series H: Audiovisual and Multimedia Systems, Infrastructure of audiovisual services-Coding of moving video, Video coding for low bit rate communication, total 226 pages.
ITU-T H.264(Apr. 2017), Series H: Audiovisual and Multimedia Systems, Infrastructure of audiovisual services-Coding of moving video, Advanced video coding for generic audiovisual services, total 812 pages.
ITU-T H.265(Feb. 2018), Series H: Audiovisual and Multimedia Systems Infrastructure of audiovisual services-Coding of moving video, High efficiency video coding, total 692 pages.
Document: JVET-L0591, Xiaoyu Xiu et al., CE9-related: A simplified design of bi-directional optical flow (BIO), Joint Video Experts Team (JVET) of ITU-T SG 16 WP 3 and ISO/IEC JTC 1/SC 29/WG 11, 12th Meeting: Macao, CN, Oct. 3-12, 2018, total 9 pages.
Jianle Chen et al., "Algorithm description for Versatile Video Coding and Test Model 3 (VTM 3)", Joint Video Experts Team (JVET), Dec. 3, 2018, [JVET-L1002-v1] (version 1), 4 pages.

* cited by examiner

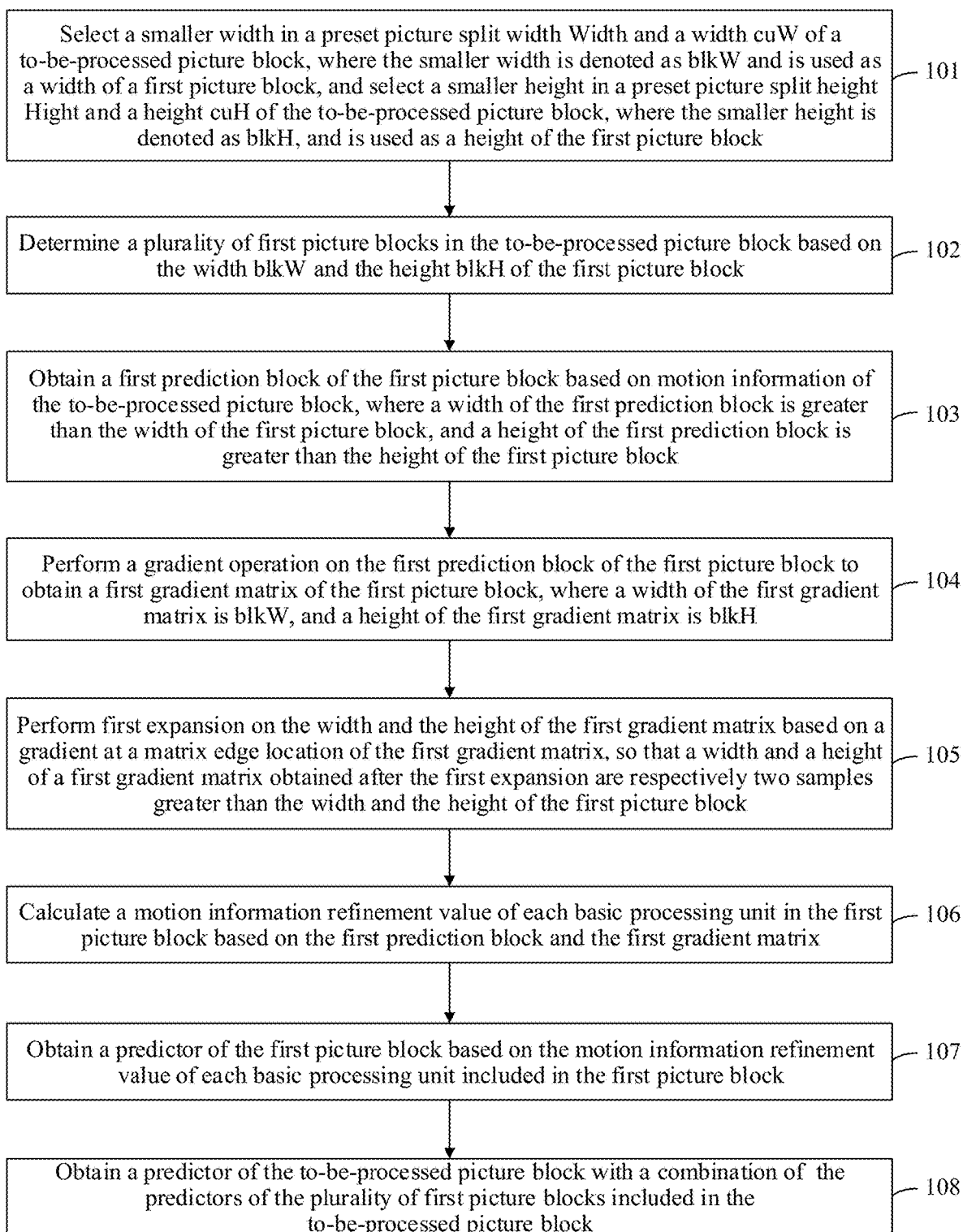

Select a smaller width in a preset picture split width Width and a width cuW of a to-be-processed picture block, where the smaller width is denoted as blkW and is used as a width of a first picture block, and select a smaller height in a preset picture split height Hight and a height cuH of the to-be-processed picture block, where the smaller height is denoted as blkH, and is used as a height of the first picture block — 101

Determine a plurality of first picture blocks in the to-be-processed picture block based on the width blkW and the height blkH of the first picture block — 102

Obtain a first prediction block of the first picture block based on motion information of the to-be-processed picture block, where a width of the first prediction block is greater than the width of the first picture block, and a height of the first prediction block is greater than the height of the first picture block — 103

Perform a gradient operation on the first prediction block of the first picture block to obtain a first gradient matrix of the first picture block, where a width of the first gradient matrix is blkW, and a height of the first gradient matrix is blkH — 104

Perform first expansion on the width and the height of the first gradient matrix based on a gradient at a matrix edge location of the first gradient matrix, so that a width and a height of a first gradient matrix obtained after the first expansion are respectively two samples greater than the width and the height of the first picture block — 105

Calculate a motion information refinement value of each basic processing unit in the first picture block based on the first prediction block and the first gradient matrix — 106

Obtain a predictor of the first picture block based on the motion information refinement value of each basic processing unit included in the first picture block — 107

Obtain a predictor of the to-be-processed picture block with a combination of the predictors of the plurality of first picture blocks included in the to-be-processed picture block — 108

FIG. 12

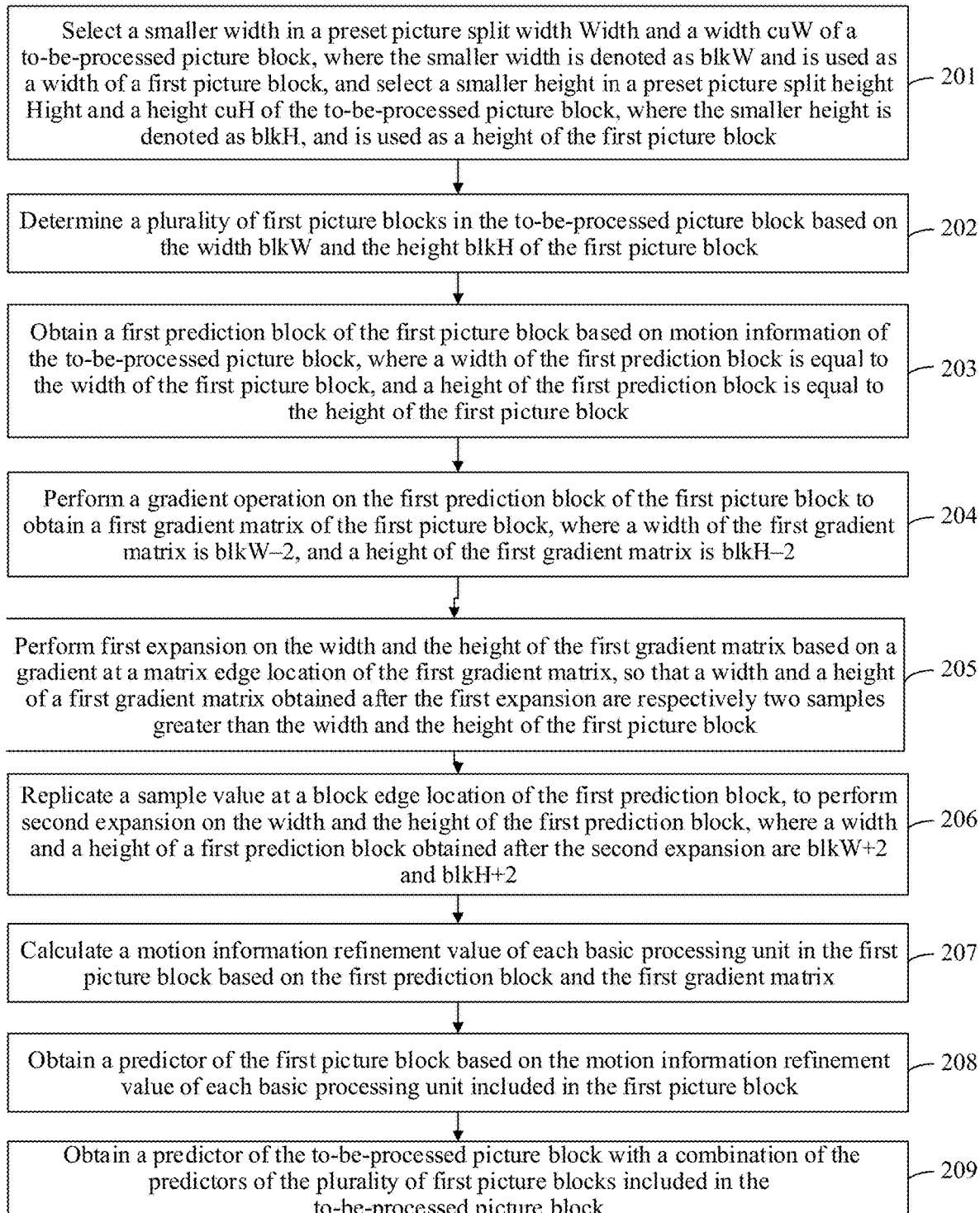

Select a smaller width in a preset picture split width Width and a width cuW of a to-be-processed picture block, where the smaller width is denoted as blkW and is used as a width of a first picture block, and select a smaller height in a preset picture split height Hight and a height cuH of the to-be-processed picture block, where the smaller height is denoted as blkH, and is used as a height of the first picture block — 201

Determine a plurality of first picture blocks in the to-be-processed picture block based on the width blkW and the height blkH of the first picture block — 202

Obtain a first prediction block of the first picture block based on motion information of the to-be-processed picture block, where a width of the first prediction block is equal to the width of the first picture block, and a height of the first prediction block is equal to the height of the first picture block — 203

Perform a gradient operation on the first prediction block of the first picture block to obtain a first gradient matrix of the first picture block, where a width of the first gradient matrix is blkW–2, and a height of the first gradient matrix is blkH–2 — 204

Perform first expansion on the width and the height of the first gradient matrix based on a gradient at a matrix edge location of the first gradient matrix, so that a width and a height of a first gradient matrix obtained after the first expansion are respectively two samples greater than the width and the height of the first picture block — 205

Replicate a sample value at a block edge location of the first prediction block, to perform second expansion on the width and the height of the first prediction block, where a width and a height of a first prediction block obtained after the second expansion are blkW+2 and blkH+2 — 206

Calculate a motion information refinement value of each basic processing unit in the first picture block based on the first prediction block and the first gradient matrix — 207

Obtain a predictor of the first picture block based on the motion information refinement value of each basic processing unit included in the first picture block — 208

Obtain a predictor of the to-be-processed picture block with a combination of the predictors of the plurality of first picture blocks included in the to-be-processed picture block — 209

FIG. 14

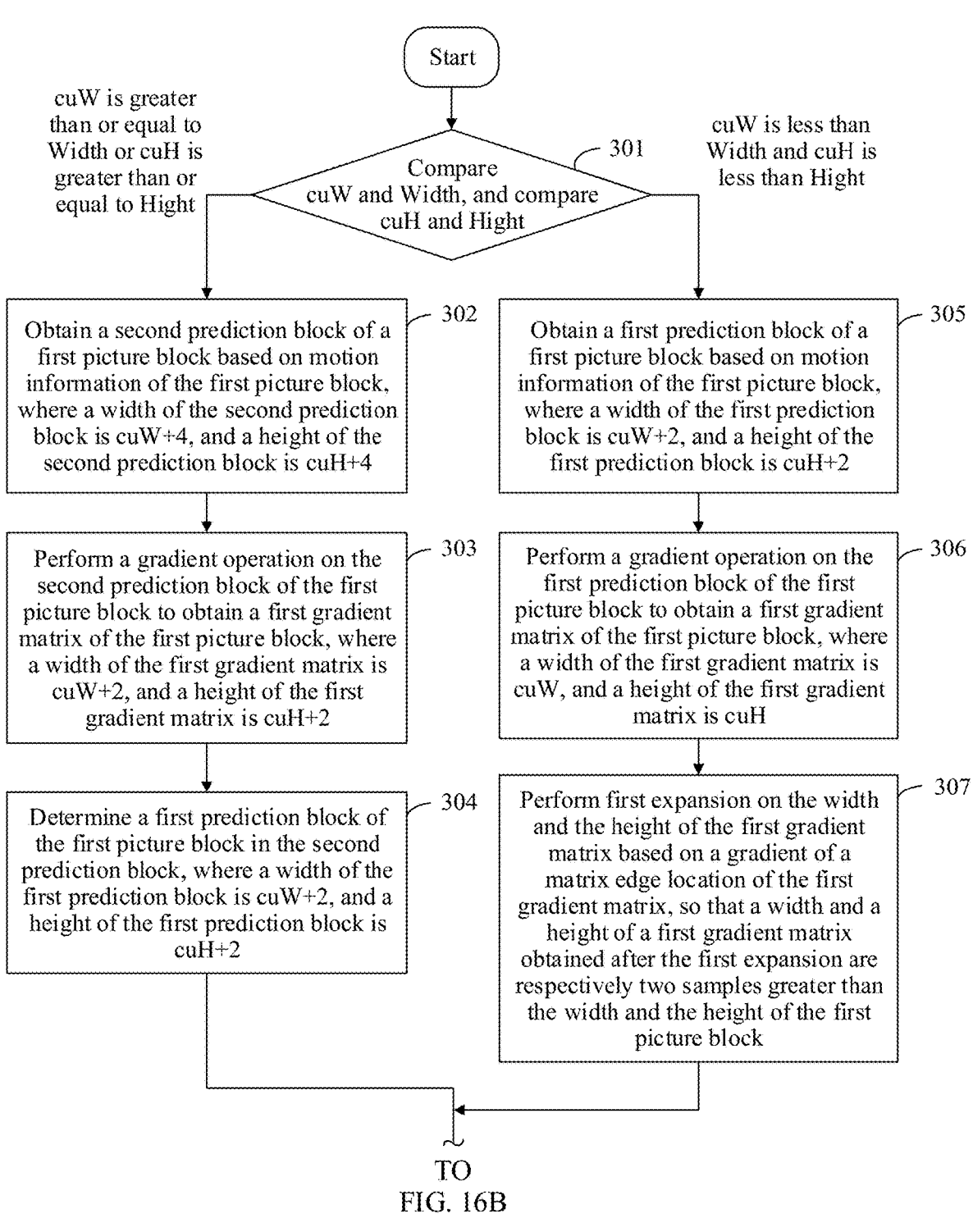

cuW is greater than or equal to Width or cuH is greater than or equal to Hight cuW is less than Width and cuH is less than Hight Start 301
Compare cuW and Width, and compare cuH and Hight 302
Obtain a second prediction block of a first picture block based on motion information of the first picture block, where a width of the second prediction block is cuW+4, and a height of the second prediction block is cuH+4

305
Obtain a first prediction block of a first picture block based on motion information of the first picture block, where a width of the first prediction block is cuW+2, and a height of the first prediction block is cuH+2

303
Perform a gradient operation on the second prediction block of the first picture block to obtain a first gradient matrix of the first picture block, where a width of the first gradient matrix is cuW+2, and a height of the first gradient matrix is cuH+2

306
Perform a gradient operation on the first prediction block of the first picture block to obtain a first gradient matrix of the first picture block, where a width of the first gradient matrix is cuW, and a height of the first gradient matrix is cuH 304
Determine a first prediction block of the first picture block in the second prediction block, where a width of the first prediction block is cuW+2, and a height of the first prediction block is cuH+2

307
Perform first expansion on the width and the height of the first gradient matrix based on a gradient of a matrix edge location of the first gradient matrix, so that a width and a height of a first gradient matrix obtained after the first expansion are respectively two samples greater than the width and the height of the first picture block

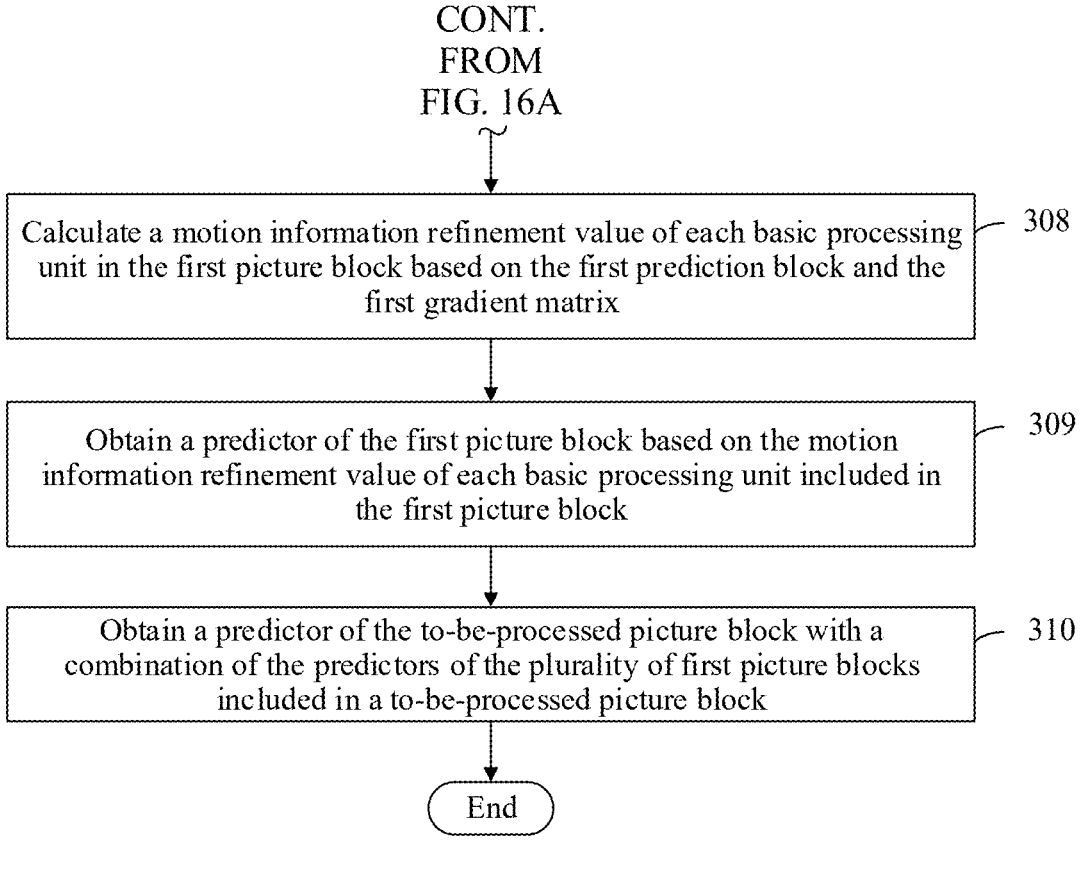

CONT.
FROM
FIG. 16A

Calculate a motion information refinement value of each basic processing unit in the first picture block based on the first prediction block and the first gradient matrix — 308

Obtain a predictor of the first picture block based on the motion information refinement value of each basic processing unit included in the first picture block — 309

Obtain a predictor of the to-be-processed picture block with a combination of the predictors of the plurality of first picture blocks included in a to-be-processed picture block — 310

End

FIG. 16B

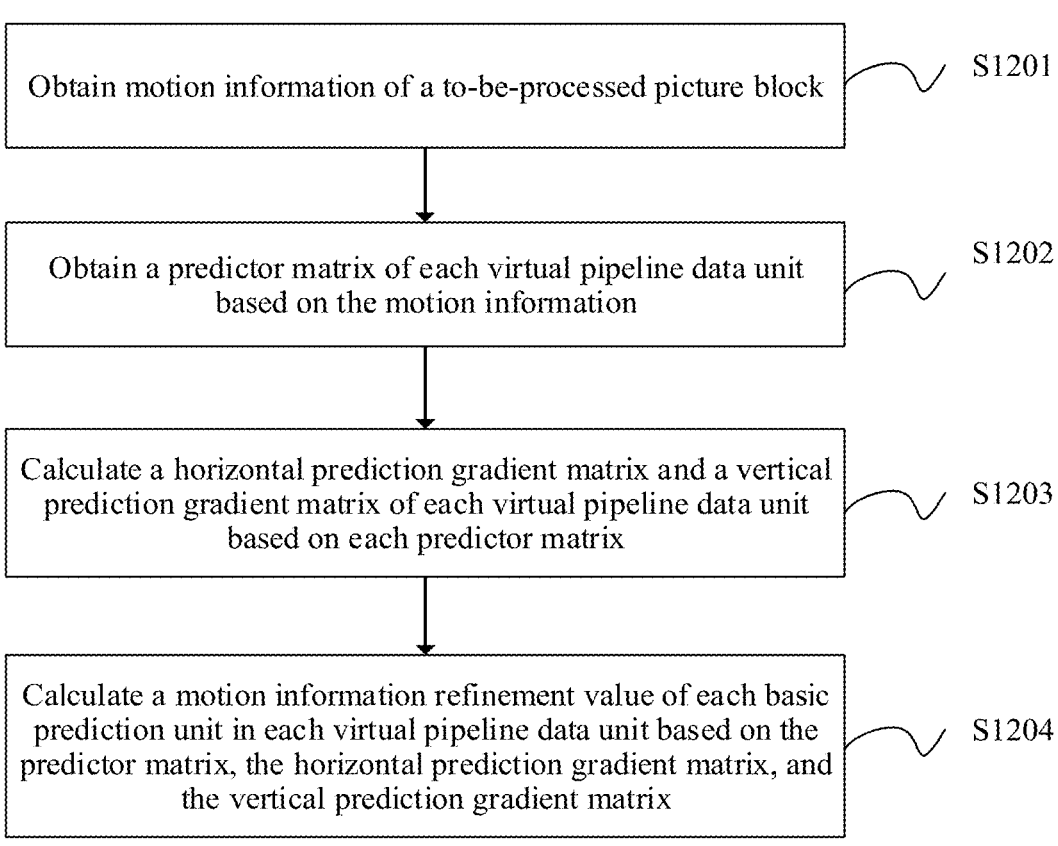

Obtain motion information of a to-be-processed picture block    S1201

Obtain a predictor matrix of each virtual pipeline data unit based on the motion information    S1202

Calculate a horizontal prediction gradient matrix and a vertical prediction gradient matrix of each virtual pipeline data unit based on each predictor matrix    S1203

Calculate a motion information refinement value of each basic prediction unit in each virtual pipeline data unit based on the predictor matrix, the horizontal prediction gradient matrix, and the vertical prediction gradient matrix    S1204

FIG. 17

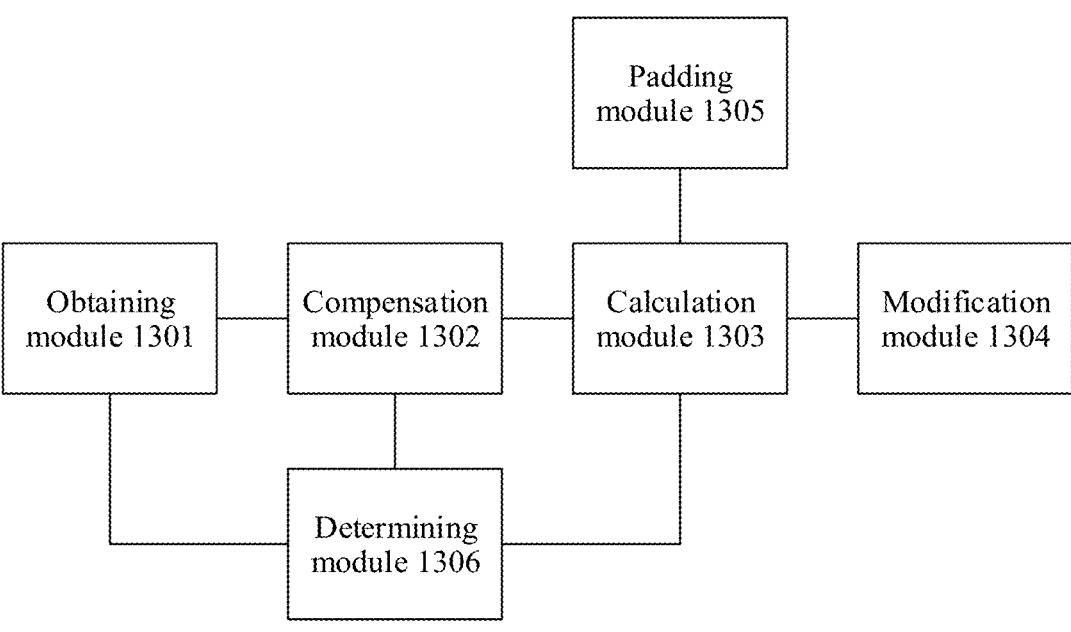

Padding module 1305

Obtaining module 1301    Compensation module 1302    Calculation module 1303    Modification module 1304

Determining module 1306

FIG. 18

INTER PREDICTION METHOD AND APPARATUS

CROSS-REFERENCE TO RELATED APPLICATIONS

This application is a continuation of U.S. patent application Ser. No. 17/345,556, filed on Jun. 11, 2021, which is a continuation of International Application No. PCT/CN2019/122735, filed on Dec. 3, 2019. The International Application claims priority to Chinese Patent Application No. 201811530481.1, filed on Dec. 13, 2018 and Chinese Patent Application No. 201910325612.0, filed on Apr. 22, 2019. All of the afore-mentioned patent applications are hereby incorporated by reference in their entireties.

TECHNICAL FIELD

This application relates to the field of video encoding and decoding, and in particular, to an inter prediction method and apparatus.

BACKGROUND

Inter prediction is to implement picture compression by using a correlation between video picture frames, that is, a time correlation, and is widely applied to compression encoding or decoding in scenarios such as a common television, a video conference television, a video phone, and a high definition television. A picture is processed through inter prediction on both an encoder side and a decoder side.

When inter prediction is performed on a picture, the picture is first split into a plurality of picture blocks based on heights and widths of the picture blocks corresponding to the picture, and then inter prediction is performed on each picture block obtained through splitting. When the widths and the heights of the picture blocks corresponding to the picture are relatively large, an area of each picture block obtained through splitting is relatively large. Consequently, when inter prediction is performed on each picture block obtained through splitting, complexity of implementing inter prediction is relatively high.

SUMMARY

Embodiments of this application provide an inter prediction method and apparatus, to reduce complexity of implementing inter prediction and improve processing efficiency.

According to a first aspect, this application provides an inter prediction method. In the method, a plurality of first picture blocks are determined in a to-be-processed picture block based on a preset picture split width, a preset picture split height, and a width and a height of the to-be-processed picture block. Bi-directional optical flow prediction is separately performed on the plurality of first picture blocks to obtain a predictor of each first picture block. A predictor of the to-be-processed picture block is obtained with the combination of the predictors of the plurality of the first picture blocks. The plurality of first picture blocks are determined in the to-be-processed picture block based on the preset picture split width, the preset picture split height, and the width and the height of the to-be-processed picture block. Therefore, a size of the first picture block is constrained by the preset picture split width and the preset picture split height, and an area of each determined first picture block is not very large, so that fewer hardware resources such as memory resources can be consumed, thereby reducing complexity of implementing inter prediction, and improving processing efficiency.

In an embodiment, the width and the height of the to-be-processed picture block are respectively the same as a width and a height of the first picture block, that is, the to-be-processed picture block includes only one first picture block. Correspondingly, when the to-be-processed picture block is determined as the first picture block based on the preset picture split width, the preset picture split height, and the width and the height of the to-be-processed picture block, bi-directional optical flow prediction is performed on the to-be-processed picture block that is used as a processing unit, to obtain the predictor of the to-be-processed picture block.

In an embodiment, the preset picture split width is compared with the width of the to-be-processed picture block to determine widths of the first picture block. The preset picture split height is compared with the height of the to-be-processed picture block to determine heights of the first picture block. The plurality of first picture blocks are determined in the to-be-processed picture block based on the widths and the heights of the first picture block. In this way, the width of the first picture block is constrained by the preset picture split width, the height of the first picture block is constrained by the preset picture split height, and an area of each determined first picture block is not very large, so that fewer hardware resources such as memory resources can be consumed, thereby reducing complexity of implementing inter prediction, and improving processing efficiency.

In an embodiment, the width of the first picture block is a smaller value in the preset picture split width and the width of the to-be-processed picture block, and the height of the first picture block is a smaller value in the preset picture split height and the height of the to-be-processed picture block. Therefore, an area of a determined first picture block can be reduced, complexity of implementing inter prediction can be reduced to a greatest extent, and processing efficiency can be improved.

In an embodiment, a first prediction block of the first picture block is obtained based on motion information of the to-be-processed picture block. A gradient operation is performed on the first prediction block to obtain a first gradient matrix of the first picture block. A motion information refinement value of each basic processing unit in the first picture block is calculated based on the first prediction block and the first gradient matrix. The predictor of the first picture block is obtained based on the motion information refinement value of each basic processing unit. Because the predictor of the first picture block is obtained based on the motion information refinement value of each basic processing unit, the predictor of the first picture block can be more accurate.

In an embodiment, first expansion is performed on a width and a height of the first prediction block based on a sample value of a block edge location of the first prediction block, so that a width and a height of a first prediction block obtained after the first expansion are respectively two samples greater than the width and the height of the first picture block; and/or first expansion is performed on a width and a height of the first gradient matrix based on a gradient of a matrix edge location of the first gradient matrix, so that a width and a height of a first gradient matrix obtained after the first expansion are respectively two samples greater than the width and the height of the first picture block. Correspondingly, the motion information refinement value of each basic processing unit in the first picture block is calculated based on the first prediction block obtained after the first expansion and/or the first gradient matrix obtained after the first expansion. First expansion is performed on the width and the height of the first prediction block, so that the width and the height of the first prediction block obtained after the first expansion are respectively two samples greater than the width and the height of the first picture block. In this way, when bi-directional prediction is performed on a picture block in a reference picture to obtain a first prediction block, a size of the obtained first prediction block may be reduced, and correspondingly, a size of the picture block is also reduced, so as to reduce an amount of data for bi-directional prediction, thereby consuming fewer hardware resources.

In an embodiment, interpolation filtering is performed on sample values of a block edge region of the first prediction block, or the sample value of the block edge location of the first prediction block is replicated, to perform second expansion on the width and the height of the first prediction block. Correspondingly, a gradient operation is performed on a first prediction block obtained after the second expansion. The sample value of the block edge location of the first prediction block is replicated, to perform second expansion on the width and the height of the first prediction block. Therefore, an implementation is simple, and operation complexity is low.

In an embodiment, the first prediction block includes a forward prediction block and a backward prediction block, and the first gradient matrix includes a forward horizontal gradient matrix, a forward vertical gradient matrix, a backward horizontal gradient matrix, and a backward vertical gradient matrix.

In an embodiment, the preset picture split width is 64, 32, or 16, and the preset picture split height is 64, 32, or 16. In this way, a size of the determined first picture block can be reduced under constraints of the preset picture split width and the preset picture split height.

In an embodiment, the basic processing unit is a 4×4 sample matrix.

According to a second aspect, this application provides an inter prediction apparatus, including a determining module, a prediction module, and a combination module. The determining module determines a plurality of first picture blocks in a to-be-processed picture block based on a preset picture split width, a preset picture split height, and a width and a height of the to-be-processed picture block. The prediction module separately performs bi-directional optical flow prediction on the plurality of first picture blocks to obtain a predictor of each first picture block. The combination module obtains a predictor of the to-be-processed picture block with a combination of the predictors of the plurality of first picture blocks. The determining module determines the plurality of first picture blocks in the to-be-processed picture block based on the preset picture split width, the preset picture split height, and the width and the height of the to-be-processed picture block. Therefore, a size of the first picture block is constrained by the preset picture split width and the preset picture split height, and an area of each determined first picture block is not very large, so that fewer hardware resources such as memory resources can be consumed, complexity of implementing inter prediction can be reduced, and processing efficiency can be improved.

In an embodiment, the determining module, the prediction module, and the combination module may be further configured to perform operations of the method in any possible implementation of the first aspect. Details are not described herein again.

According to a third aspect, an embodiment of this application provides an inter prediction apparatus. The apparatus includes a processor and a memory, and the processor is connected to the memory. The memory stores one or more programs, the one or more programs are executed by the processor, and the one or more programs include an instruction for performing the method in the first aspect or any possible implementation of the first aspect.

According to a fourth aspect, this application provides a non-volatile computer readable storage medium, configured to store a computer program. The computer program is loaded by a processor to execute an instruction for the method in the first aspect or any possible implementation of the first aspect.

According to a fifth aspect, this application provides a chip. The chip includes a programmable logic circuit and/or a program instruction. When the chip runs, the method in the first aspect or any possible implementation of the first aspect is implemented.

According to a sixth aspect, an embodiment of this application provides an inter prediction method, including: obtaining motion information of a to-be-processed picture block, where the to-be-processed picture block includes a plurality of virtual pipeline data units, and the virtual pipeline data unit includes at least one basic processing unit; obtaining a predictor matrix of each virtual pipeline data unit based on the motion information; calculating a horizontal prediction gradient matrix and a vertical prediction gradient matrix of each virtual pipeline data unit based on each predictor matrix; and calculating a motion information refinement value of each basic processing unit in each virtual pipeline data unit based on the predictor matrix, the horizontal prediction gradient matrix, and the vertical prediction gradient matrix.

In an embodiment, the obtaining a predictor matrix of each virtual pipeline data unit based on the motion information includes: obtaining an initial prediction matrix of each virtual pipeline data unit based on the motion information, where a size of the initial prediction matrix is equal to a size of the virtual pipeline data unit; and using the initial prediction matrix as the predictor matrix.

In an embodiment, after the obtaining an initial prediction matrix of each virtual pipeline data unit, the method further includes: performing sample expansion on an edge of the initial prediction matrix to obtain an expanded prediction matrix, where a size of the expanded prediction matrix is greater than the size of the initial prediction matrix; and correspondingly, the using the initial prediction matrix as the predictor matrix includes: using the expanded prediction matrix as the predictor matrix.

In an embodiment, the performing sample expansion on an edge of the initial prediction matrix includes: obtaining a sample value of a sample outside the initial prediction matrix based on an interpolant of a sample value of a sample in the initial prediction matrix; or using a sample value of a sample on the edge of the initial prediction matrix as a sample value of a sample that is outside the initial prediction matrix and that is neighboring to the edge.

In an embodiment, the virtual pipeline data unit includes a plurality of motion compensation units, and the obtaining a predictor matrix of each virtual pipeline data unit based on the motion information includes: obtaining a compensation value matrix of each motion compensation unit based on the motion information; and combining the compensation value matrices of the plurality of motion compensation units to obtain the predictor matrix.

In an embodiment, the calculating a horizontal prediction gradient matrix and a vertical prediction gradient matrix of each virtual pipeline data unit based on each predictor matrix includes: separately performing horizontal gradient calculation and vertical gradient calculation on the predictor matrix to obtain the horizontal prediction gradient matrix and the vertical prediction gradient matrix.

In an embodiment, before the calculating a motion information refinement value of each basic processing unit in each virtual pipeline data unit based on the predictor matrix, the horizontal prediction gradient matrix, and the vertical prediction gradient matrix, the method further includes: performing sample expansion on an edge of the predictor matrix to obtain a padding prediction matrix, where the padding prediction matrix has a preset size; and separately performing gradient expansion on an edge of the horizontal prediction gradient matrix and an edge of the vertical prediction gradient matrix to obtain a padding horizontal gradient matrix and a padding vertical gradient matrix, where the padding horizontal gradient matrix and the padding vertical gradient matrix each have the preset size; and correspondingly, the calculating a motion information refinement value of each basic processing unit in each virtual pipeline data unit based on the predictor matrix, the horizontal prediction gradient matrix, and the vertical prediction gradient matrix includes: calculating the motion information refinement value of each basic processing unit in each virtual pipeline data unit based on the padding prediction matrix, the padding horizontal gradient matrix, and the padding vertical gradient matrix.

In an embodiment, before the performing sample expansion on an edge of the predictor matrix, the method further includes: determining that a size of the predictor matrix is less than the preset size.

In an embodiment, before the performing gradient expansion on an edge of the horizontal prediction gradient matrix and an edge of the vertical prediction gradient matrix, the method further includes: determining that a size of the horizontal prediction gradient matrix and/or a size of the vertical prediction gradient matrix are/is less than the preset size.

In an embodiment, after the calculating a motion information refinement value of each basic processing unit in each virtual pipeline data unit, the method further includes: obtaining a predictor of each basic processing unit based on the predictor matrix of the virtual pipeline data unit and the motion information refinement value of each basic processing unit in the virtual pipeline data unit.

In an embodiment, the method is used for bi-directional prediction; correspondingly, the motion information includes first reference frame list motion information and second reference frame list motion information; the predictor matrix includes a first predictor matrix and a second predictor matrix, the first predictor matrix is obtained based on the first reference frame list motion information, and the second predictor matrix is obtained based on the second reference frame list motion information; the horizontal prediction gradient matrix includes a first horizontal prediction gradient matrix and a second horizontal prediction gradient matrix, the first horizontal prediction gradient matrix is calculated based on the first predictor matrix, and the second horizontal prediction gradient matrix is calculated based on the second predictor matrix; the vertical prediction gradient matrix includes a first vertical prediction gradient matrix and a second vertical prediction gradient matrix, the first vertical prediction gradient matrix is calculated based on the first predictor matrix, and the second vertical prediction gradient matrix is calculated based on the second predictor matrix; and the motion information refinement value includes a first reference frame list motion information refinement value and a second reference frame list motion information refinement value, the first reference frame list motion information refinement value is calculated based on the first predictor matrix, the first horizontal prediction gradient matrix, and the first vertical prediction gradient matrix, and the second reference frame list motion information refinement value is calculated based on the second predictor matrix, the second horizontal prediction gradient matrix, and the second vertical prediction gradient matrix.

In an embodiment, before the performing sample expansion on an edge of the initial prediction matrix, the method further includes: determining that a time domain location of a picture frame in which the to-be-processed picture block is located is located between a first reference frame indicated by the first reference frame list motion information and a second reference frame indicated by the second reference frame list motion information.

In an embodiment, after the obtaining a predictor matrix of each virtual pipeline data unit, the method further includes: determining that a difference between the first predictor matrix and the second predictor matrix is less than a first threshold.

In an embodiment, the motion information refinement value of the basic processing unit corresponds to one basic predictor matrix in the predictor matrix; and before the calculating a motion information refinement value of each basic processing unit in each virtual pipeline data unit based on the predictor matrix, the horizontal prediction gradient matrix, and the vertical prediction gradient matrix, the method further includes: determining that a difference between a first basic predictor matrix and a second basic predictor matrix is less than a second threshold.

In an embodiment, a size of the basic processing unit is 4×4.

In an embodiment, a width of the virtual pipeline data unit is W, a height of the virtual pipeline data unit is H, and the size of the expanded prediction matrix is $(W+n+2) \times (H+n+2)$. Correspondingly, the size of the horizontal prediction gradient matrix is $(W+n) \times (H+n)$, and the size of the vertical prediction gradient matrix is $(W+n) \times (H+n)$, where W and H are positive integers, and n is an even number.

In an embodiment, n is 0, 2, or −2.

In an embodiment, before the obtaining motion information of a to-be-processed picture block, the method further includes: determining that the to-be-processed picture block includes the plurality of virtual pipeline data units.

According to a seventh aspect, an embodiment of this application provides an inter prediction apparatus, including: an obtaining module, configured to obtain motion information of a to-be-processed picture block, where the to-be-processed picture block includes a plurality of virtual pipeline data units, and the virtual pipeline data unit includes at least one basic processing unit; a compensation module, configured to obtain a predictor matrix of each virtual pipeline data unit based on the motion information; a calculation module, configured to calculate a horizontal prediction gradient matrix and a vertical prediction gradient matrix of each virtual pipeline data unit based on each predictor matrix; and a refinement module, configured to calculate a motion information refinement value of each basic processing unit in each virtual pipeline data unit based on the predictor matrix, the horizontal prediction gradient matrix, and the vertical prediction gradient matrix.

In an embodiment, the compensation module is specifically configured to: obtain an initial prediction matrix of each virtual pipeline data unit based on the motion information, where a size of the initial prediction matrix is equal to a size of the virtual pipeline data unit; and use the initial prediction matrix as the predictor matrix.

In an embodiment, the compensation module is specifically configured to: perform sample expansion on an edge of the initial prediction matrix to obtain an expanded prediction matrix, where a size of the expanded prediction matrix is greater than the size of the initial prediction matrix; and use the expanded prediction matrix as the predictor matrix.

In an embodiment, the compensation module is specifically configured to: obtain a sample value of a sample outside the initial prediction matrix based on an interpolant of a sample value of a sample in the initial prediction matrix; or use a sample value of a sample on the edge of the initial prediction matrix as a sample value of a sample that is outside the initial prediction matrix and that is neighboring to the edge.

In an embodiment, the virtual pipeline data unit includes a plurality of motion compensation units, and the compensation module is specifically configured to: obtain a compensation value matrix of each motion compensation unit based on the motion information; and combine the compensation value matrices of the plurality of motion compensation units to obtain the predictor matrix.

In an embodiment, the calculation module is specifically configured to separately perform horizontal gradient calculation and vertical gradient calculation on the predictor matrix to obtain the horizontal prediction gradient matrix and the vertical prediction gradient matrix.

In an embodiment, the apparatus further includes a padding module, configured to: perform sample expansion on an edge of the predictor matrix to obtain a padding prediction matrix, where the padding prediction matrix has a preset size; separately perform gradient expansion on an edge of the horizontal prediction gradient matrix and an edge of the vertical prediction gradient matrix to obtain a padding horizontal gradient matrix and a padding vertical gradient matrix, where the padding horizontal gradient matrix and the padding vertical gradient matrix each have the preset size; and calculate the motion information refinement value of each basic processing unit in each virtual pipeline data unit based on the padding prediction matrix, the padding horizontal gradient matrix, and the padding vertical gradient matrix.

In an embodiment, the apparatus further includes a determining module, configured to determine that a size of the predictor matrix is less than the preset size.

In an embodiment, the determining module is further configured to determine that a size of the horizontal prediction gradient matrix and/or a size of the vertical prediction gradient matrix are/is less than the preset size.

In an embodiment, the refinement module is further configured to obtain a predictor of each basic processing unit based on the predictor matrix of the virtual pipeline data unit and the motion information refinement value of each basic processing unit in the virtual pipeline data unit.

In an embodiment, the apparatus is used for bi-directional prediction; correspondingly, the motion information includes first reference frame list motion information and second reference frame list motion information; the predictor matrix includes a first predictor matrix and a second predictor matrix, the first predictor matrix is obtained based on the first reference frame list motion information, and the second predictor matrix is obtained based on the second reference frame list motion information; the horizontal prediction gradient matrix includes a first horizontal prediction gradient matrix and a second horizontal prediction gradient matrix, the first horizontal prediction gradient matrix is calculated based on the first predictor matrix, and the second horizontal prediction gradient matrix is calculated based on the second predictor matrix; the vertical prediction gradient matrix includes a first vertical prediction gradient matrix and a second vertical prediction gradient matrix, the first vertical prediction gradient matrix is calculated based on the first predictor matrix, and the second vertical prediction gradient matrix is calculated based on the second predictor matrix; and the motion information refinement value includes a first reference frame list motion information refinement value and a second reference frame list motion information refinement value, the first reference frame list motion information refinement value is calculated based on the first predictor matrix, the first horizontal prediction gradient matrix, and the first vertical prediction gradient matrix, and the second reference frame list motion information refinement value is calculated based on the second predictor matrix, the second horizontal prediction gradient matrix, and the second vertical prediction gradient matrix.

In an embodiment, the determining module is further configured to determine that a time domain location of a picture frame in which the to-be-processed picture block is located is located between a first reference frame indicated by the first reference frame list motion information and a second reference frame indicated by the second reference frame list motion information.

In an embodiment, the determining module is further configured to determine that a difference between the first predictor matrix and the second predictor matrix is less than a first threshold.

In an embodiment, the determining module is further configured to determine that a difference between the first basic predictor matrix and the second basic predictor matrix is less than a second threshold.

In an embodiment, a size of the basic processing unit is $4 \times 4$.

In an embodiment, a width of the virtual pipeline data unit is W, a height of the virtual pipeline data unit is H, and the size of the expanded prediction matrix is $(W+n+2) \times (H+n+2)$. Correspondingly, the size of the horizontal prediction gradient matrix is $(W+n) \times (H+n)$, and the size of the vertical prediction gradient matrix is $(W+n) \times (H+n)$, where W and H are positive integers, and n is an even number.

In an embodiment, n is 0, 2, or −2.

In an embodiment, the determining module is further configured to determine that the to-be-processed picture block includes the plurality of virtual pipeline data units.

According to an eighth aspect, an embodiment of this application provides an encoding device, including a non-volatile memory and a processor that are coupled to each other. The processor invokes program code stored in the memory, to perform some or all operations of the method in the first aspect or some or all operations of the method in the sixth aspect.

According to a ninth aspect, an embodiment of this application provides a decoding device, including a non-volatile memory and a processor that are coupled to each other. The processor invokes program code stored in the memory, to perform some or all operations of the method in the first aspect or some or all operations of the method in the sixth aspect.

According to a tenth aspect, an embodiment of this application provides a computer readable storage medium.

The computer readable storage medium stores program code, and the program code includes an instruction used to perform some or all operations of the method in the first aspect or some or all operations of the method in the sixth aspect.

According to an eleventh aspect, an embodiment of this application provides a computer program product. When the computer program product is run on a computer, the computer is enabled to perform some or all operations of the method in the first aspect or some or all operations of the method in the sixth aspect.

BRIEF DESCRIPTION OF DRAWINGS

To describe the technical solutions in embodiments of this application or in the background more clearly, the following describes the accompanying drawings for describing the embodiments of this application or the background.

FIG. 12 is a flowchart of an inter prediction method according to an embodiment of this application;

FIG. 14 is a flowchart of another inter prediction method according to an embodiment of this application;

FIG. 16A and FIG. 16B are a flowchart of another inter prediction method according to an embodiment of this application;

FIG. 17 is a flowchart of a method according to an embodiment of this application;

FIG. 18 is a structural block diagram of an inter prediction apparatus according to an embodiment of this application.

DETAILED DESCRIPTION OF EMBODIMENTS

Figure 1A:
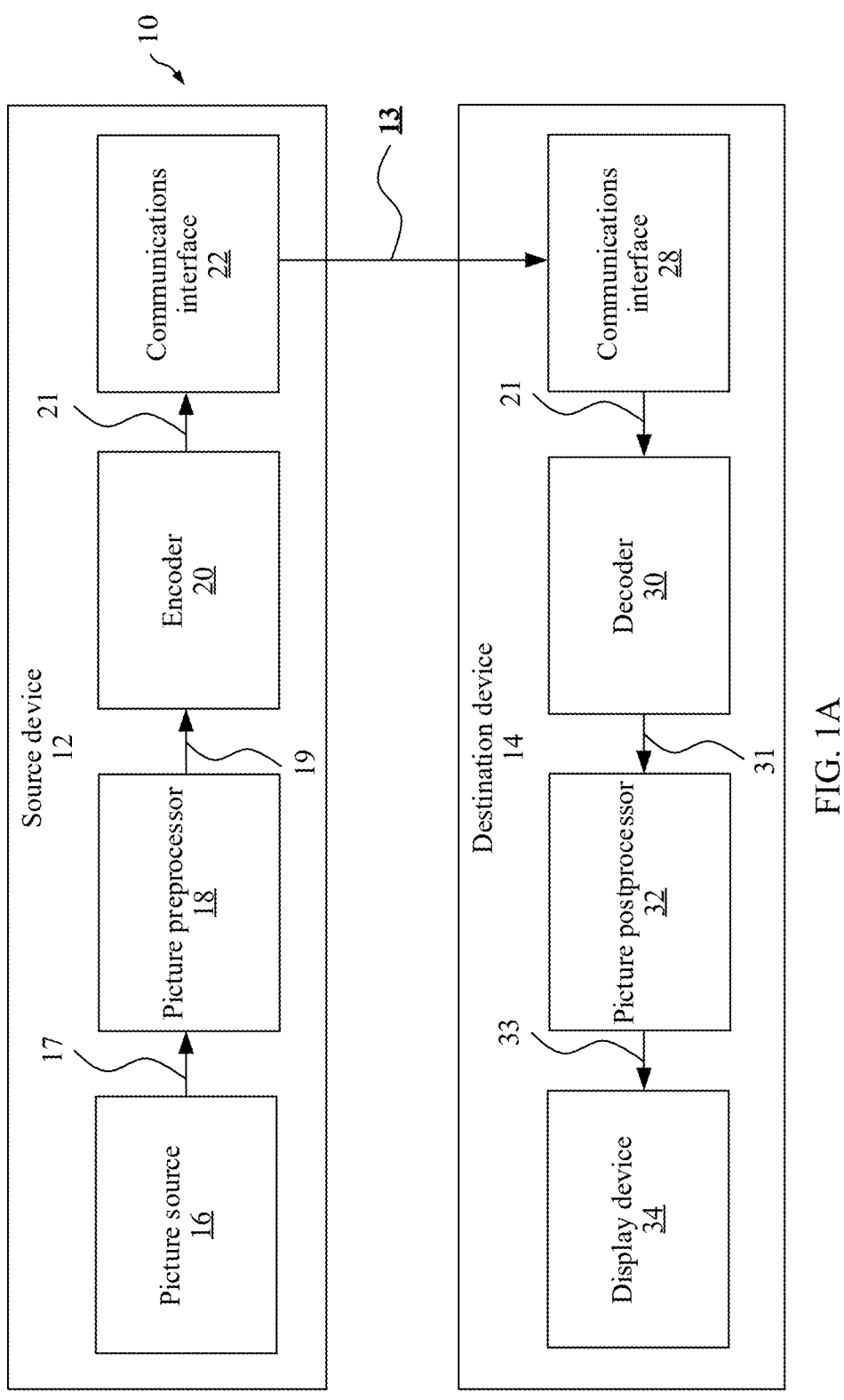
FIG. 1A is a block diagram of an example of a video coding system 10 according to an embodiment of this application.

The following describes the embodiments of this application with reference to the accompanying drawings in the embodiments of this application. In the following description, reference is made to the accompanying drawings that form a part of this disclosure and show, by way of illustration, specific aspects of the embodiments of the present disclosure or specific aspects in which the embodiments of the present disclosure may be used. It should be understood that the embodiments of the present disclosure may be used in other aspects, and may include structural or logical changes not depicted in the accompanying drawings. Therefore, the following detailed description shall not be construed as a limitation, and the scope of the present disclosure is defined by the appended claims. For example, it should be understood that disclosed content with reference to a described method may also be applied to a corresponding device or system configured to perform the method, and vice versa. For example, if one or more specific method operations are described, a corresponding device may include one or more units such as function units for performing the described one or more method operations (for example, one unit performing the one or more operations, or a plurality of units, each of which performs one or more of the plurality of operations), even if such one or more units are not explicitly described or illustrated in the accompanying drawings. In addition, for example, if a specific apparatus is described based on one or more units such as function units, a corresponding method may include one operation for performing functionality of the one or more units (for example, one operation for performing functionality of the one or more units, or a plurality of operations, each of which is used to perform functionality of one or more of the plurality of units), even if such one or more operations are not explicitly described or illustrated in the accompanying drawings. Further, it should be understood that features of the various example embodiments and/or aspects described in this specification may be combined with each other, unless specifically noted otherwise.

The technical solutions in the embodiments of this application may be not only applied to an existing video coding standard (for example, a standard such as H.264 or high efficiency video coding (high efficiency video coding, HEVC)), but also may be applied to a future video coding standard (for example, an H.266 standard). Terms used in the embodiments of this application are only used to explain specific embodiments of this application, and are not intended to limit this application. The following first briefly describes some related concepts in the embodiments of this application.

Video coding is usually processing a sequence of pictures that form a video or a video sequence. In the field of video coding, the terms "picture (picture)", "frame (frame)", and "image (image)" may be used as synonyms. Video coding used in this specification indicates video encoding or video decoding. Video encoding is performed on a source side, and usually includes processing (for example, through compression) an original video picture to reduce an amount of data required for representing the video picture (for more efficient storage and/or transmission). Video decoding is performed on a destination side, and usually includes inverse processing relative to an encoder to reconstruct a video picture. "Encoding" of a video picture in the embodiments should be understood as "encoding" or "decoding" related to a video sequence. A combination of encoding and decoding is also referred to as coding (encoding and decoding).

A video sequence includes a series of pictures (picture), a picture is further split into slices (slice), and a slice is further split into blocks (block). Video coding is performed by block. In some new video coding standards, a concept "block" is further expanded. For example, a macroblock (macroblock, MB) is introduced in the H.264 standard. The macroblock may be further split into a plurality of prediction blocks (partition) that can be used for predictive coding. In the HEVC standard, basic concepts such as a coding unit (coding unit, CU), a prediction unit (prediction unit, PU), and a transform unit (transform unit, TU) are used, a plurality of block units are functionally obtained through splitting, and a brand new tree-based structure is used for description. For example, a CU may be split into smaller CUs based on a quadtree, and the smaller CU may be further split, to generate a quadtree structure. The CU is a basic unit for splitting and coding a coded picture. APU and a TU also have similar tree structures. The PU may correspond to a prediction block, and is a basic unit for predictive coding. The CU is further split into a plurality of PUs based on a splitting pattern. The TU may correspond to a transform block, and is a basic unit for transforming a prediction residual. However, the CU, the PU, and the TU each are conceptually blocks (or picture blocks) in essence.

For example, in HEVC, a coding tree unit (coding tree unit, CTU) is split into a plurality of CUs by using a quadtree structure denoted as a coding tree. It is determined whether a picture region is coded through inter-picture (temporal) or intra-picture (spatial) prediction at a CU level. Each CU may be further split into one, two, or four PUs based on a PU splitting type. A same prediction process is applied within one PU, and related information is transmitted to a decoder based on the PU. After obtaining a residual block by applying the prediction process based on the PU splitting type, the CU may be partitioned into a transform unit (transform unit, TU) based on another quadtree structure similar to the coding tree used for the CU. In the latest development of video compression technologies, a frame is partitioned through quadtree plus binary tree (Quad-tree and binary tree, QTBT) to partition a coding block. In a QTBT block structure, a CU may be square or rectangular.

In this specification, for ease of description and understanding, a to-be-encoded picture block in a current coded picture may be referred to as a current block. For example, during encoding, the current block is a block that is being encoded, and during decoding, the current block is a block that is being decoded. A decoded picture block, in a reference picture, used to predict the current block is referred to as a reference block. In other words, the reference block is a block that provides a reference signal for the current block, and the reference signal represents a sample value in the picture block. A block that provides a prediction signal for the current block in the reference picture may be referred to as a prediction block, and the prediction signal represents a sample value, a sampling value, or a sampling signal in the prediction block. For example, after traversing a plurality of reference blocks, an optimal reference block is found, and the optimal reference block provides prediction for the current block, and this block is referred to as a prediction block.

In a case of lossless video coding, an original video picture can be reconstructed, that is, a reconstructed video picture has same quality as the original video picture (as-suming that no transmission loss or other data loss occurs during storage or transmission). In a case of lossy video coding, further compression is performed through quantization and the like, to reduce an amount of data required for representing a video picture, and a video picture cannot be completely reconstructed on a decoder side, that is, quality of a reconstructed video picture is poorer than that of the original video picture.

Several H.261 video coding standards relate to "lossy hybrid video coding" (that is, spatial and temporal prediction in a sample domain is combined with 2D transform coding for applying quantization in a transform domain). Each picture in a video sequence is usually partitioned into a set of non-overlapping blocks, and coding is usually performed at a block level. To be specific, on an encoder side, a video is usually processed, that is, encoded, at a block (video block) level. For example, a prediction block is generated through spatial (intra-picture) prediction and temporal (inter-picture) prediction, the prediction block is subtracted from a current block (a block that is being processed or to be processed) to obtain a residual block, and the residual block is transformed in transform domain and quantized to reduce an amount of data that is to be transmitted (compressed). On a decoder side, inverse processing relative to the encoder is applied to the encoded or compressed block to reconstruct the current block for representation. In addition, the encoder duplicates a processing loop of the decoder, so that the encoder and the decoder generate same prediction (for example, intra prediction and inter prediction) and/or reconstruction for processing, that is, encoding a subsequent block.

The following describes a system architecture to which the embodiments of this application are applied. FIG. 1A is a schematic block diagram of a video coding system 10 to which an embodiment of this application is applied. As shown in FIG. 1A, the video coding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source apparatus 12, the destination apparatus 14, or both the source apparatus 12 and the destination apparatus 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible to a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a "smart" phone, a television, a camera, a display apparatus, a digital media player, a video game console, a vehicle-mounted computer, a wireless communications device, or the like.

Although FIG. 1A depicts the source device 12 and the destination device 14 as separate devices, device embodiments may also include both the source device 12 and the destination device 14 or both a function of the source device 12 and a function of the destination device 14, that is, the source device 12 or the corresponding function and the destination device 14 or the corresponding function. In such embodiments, the source device 12 or the corresponding function and the destination device 14 or the corresponding function may be implemented by using same hardware and/or software, separate hardware and/or software, or any combination thereof.

A communication connection may be implemented between the source device 12 and the destination device 14 over a link 13, and the destination device 14 may receive encoded video data from the source device 12 over the link 13. The link 13 may include one or more media or apparatuses capable of moving the encoded video data from the source device 12 to the destination device 14. In an example, the link 13 may include one or more communication media that enable the source device 12 to transmit the encoded video data directly to the destination device 14 in real time. In this example, the source device 12 may modulate the encoded video data according to a communications standard (for example, a wireless communications protocol), and may transmit modulated video data to the destination device 14. The one or more communications media may include a wireless communication medium and/or a wired communication medium, for example, a radio frequency (RF) spectrum or one or more physical transmission cables. The one or more communication media may be a part of a packet-based network, and the packet-based network is, for example, a local area network, a wide area network, or a global network (for example, the internet). The one or more communication media may include a router, a switch, a base station, or another device that facilitates communication from the source device 12 to the destination device 14.

The source device 12 includes an encoder 20, and additionally or optionally, the source device 12 may further include a picture source 16, a picture preprocessor 18, and a communications interface 22. In a specific implementation form, the encoder 20, the picture source 16, the picture preprocessor 18, and the communications interface 22 may be hardware components in the source device 12, or may be software programs in the source device 12. Descriptions are separately provided as follows:

The picture source 16 may include or may be any type of picture capturing device configured to capture a real-world picture and the like, and/or any type of device for generating a picture or comment (for screen content encoding, some text on a screen is also considered as a part of a to-be-encoded picture or image), for example, a computer graphics processing unit configured to generate a computer animation picture, or any type of device configured to obtain and/or provide a real-world picture or a computer animation picture (for example, screen content or a virtual reality (virtual reality, VR) picture), and/or any combination thereof (for example, an augmented reality (augmented reality, AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or an integrated camera integrated into the source device. When the picture source 16 is a memory, the picture source 16 may be, for example, a local memory or an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface according to any proprietary or standardized interface protocol, for example, a wired or wireless interface or an optical interface.

A picture may be considered as a two-dimensional array or matrix of samples (picture element). The sample in the array may also be referred to as a sampling point. A quantity of sampling points in horizontal and vertical directions (or axes) of the array or the picture defines a size and/or a resolution of the picture. For representation of color, three color components are usually used, that is, the picture may be represented as or include three sample arrays. In RBG format or color space, a picture includes corresponding red, green, and blue sample arrays. However, in video coding, each sample is usually represented in a luminance/chrominance format or color space, for example, a picture in YCbCr format includes a luminance component indicated by Y (sometimes indicated by L) and two chrominance components indicated by Cb and Cr. The luminance (luma for short) component Y indicates luminance or gray level intensity (for example, the two are the same in a gray-scale picture), and the two chrominance (chroma for short) components Cb and Cr represent chrominance or color information components. Accordingly, the picture in YCbCr format includes a luminance sample array of luminance sample values (Y), and two chrominance sample arrays of chrominance values (Cb and Cr). A picture in RGB format may be converted or transformed into a picture in YCbCr format, and vice versa. This process is also referred to as color transformation or conversion. If a picture is monochrome, the picture may include only a luminance sample array. In this embodiment of this application, a picture transmitted by the picture source 16 to a picture preprocessor 18 may also be referred to as original picture data 17.

The picture preprocessor 18 is configured to receive the original picture data 17 and perform preprocessing on the original picture data 17 to obtain a preprocessed picture 19 or preprocessed picture data 19. For example, the preprocessing performed by the picture preprocessor 18 may include trimming, color format conversion (for example, from RGB to YUV), color correction, or noise reduction.

The encoder 20 (also referred to as a video encoder 20) is configured to receive the preprocessed picture data 19, and process the preprocessed picture data 19 by using a related prediction mode (such as a prediction mode in each embodiment of this specification), to provide encoded picture data 21 (structural details of the encoder 20 are further described below based on FIG. 2, FIG. 4, or FIG. 5). In some embodiments, the encoder 20 may be configured to perform each embodiment described below, to implement encoder-side application of the inter prediction method described in this application.

The communications interface 22 may be configured to receive the encoded picture data 21 and transmit the encoded picture data 21 to the destination device 14 or any other device (for example, a memory) over the link 13 for storage or direct reconstruction. The any other device may be any device used for decoding or storage. The communications interface 22 may be, for example, configured to encapsulate the encoded picture data 21 into a proper format, for example, a data packet, for transmission over the link 13.

The destination device 14 includes a decoder 30, and additionally or optionally, the destination device 14 may further include a communications interface 28, a picture postprocessor 32, and a display device 34. Descriptions are separately provided as follows:

The communications interface 28 may be configured to receive the encoded picture data 21 from the source device 12 or any other source. The any other source is, for example, a storage device, and the storage device is, for example, an encoded picture data storage device. The communications interface 28 may be configured to transmit or receive the encoded picture data 21 over the link 13 between the source device 12 and the destination device 14 or over any type of network. The link 13 is, for example, a direct wired or wireless connection, and the any type of network is, for example, a wired or wireless network or any combination thereof, or any type of private or public network or any combination thereof. The communications interface 28 may be, for example, configured to decapsulate the data packet transmitted through the communications interface 22, to obtain the encoded picture data 21.

Both the communications interface 22 and the communications interface 28 may be configured as unidirectional communications interfaces or bidirectional communications interfaces, and may be, for example, configured to send and receive a message to establish a connection, and confirm and exchange any other information related to a communications link and/or data transmission such as encoded picture data transmission.

The decoder 30 (also referred to as the decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform each embodiment described below, to implement decoder-side application of the interprediction method described in this application.

The picture postprocessor 32 is configured to postprocess the decoded picture data 31 (also referred to as reconstructed picture data), to obtain postprocessed picture data 33. The postprocessing performed by the picture postprocessor 32 may include color format conversion (for example, from YCbCr to RGB), color correction, trimming, resampling, or any other processing. The picture postprocessor 32 may be further configured to transmit the postprocessed picture data 33 to the display device 34.

The display device 34 is configured to receive the postprocessed picture data 33 to display the picture to a user, a viewer, or the like. The display device 34 may be or may include any type of display configured to present a reconstructed picture, for example, an integrated or external display or monitor. For example, the display may include a liquid crystal display (liquid crystal display, LCD), an organic light-emitting diode (organic light-emitting diode, OLED) display, a plasma display, a projector, a micro-LED display, a liquid crystal on silicon (liquid crystal on silicon, LCoS) display, a digital light processor (digital light processor, DLP), or any type of other display.

Although FIG. 1A depicts the source device 12 and the destination device 14 as separate devices, device embodiments may also include both the source device 12 and the destination device 14 or both a function of the source device 12 and a function of the destination device 14, that is, the source device 12 or the corresponding function and the destination device 14 or the corresponding function. In such embodiments, the source device 12 or the corresponding function and the destination device 14 or the corresponding function may be implemented by using same hardware and/or software, separate hardware and/or software, or any combination thereof.

Based on the descriptions, a person skilled in the art easily understands that existence and (accurate) division of functions of different units or functions/a function of the source device 12 and/or the destination device 14 shown in FIG. 1A may vary with an actual device and application. The source device 12 and the destination device 14 each may include any one of various devices, including any type of handheld or stationary device, for example, a notebook or laptop computer, a mobile phone, a smartphone, a tablet or a tablet computer, a video camera, a desktop computer, a set-top box, a television, a camera, a vehicle-mounted device, a display device, a digital media player, a video game console, a video streaming transmission device (such as a content service server or a content distribution server), a broadcast receiver device, or a broadcast transmitter device, and may use or may not use any type of operating system.

The encoder 20 and the decoder 30 each may be implemented as any one of various proper circuits, for example, one or more microprocessors, a digital signal processor (digital signal processor, DSP), an application-specific integrated circuit (application-specific integrated circuit, ASIC), a field-programmable gate array (field-programmable gate array, FPGA), discrete logic, hardware, or any combination thereof. If the technology is partially implemented in software, the device may store a software instruction in a proper non-transitory computer readable storage medium, and may execute the instruction in hardware by using one or more processors to perform the technologies in this disclosure. Any of the foregoing content (including hardware, software, a combination of hardware and software, and the like) may be considered as one or more processors.

In some cases, the video coding system 10 shown in FIG. 1A is merely an example, and the technologies in this application may be applied to a video coding setting (for example, video encoding or video decoding) that does not need to include any data communication between an encoding device and a decoding device. In other examples, data may be retrieved from a local memory, streamed over a network, or the like. A video encoding device may encode data and store the data in a memory, and/or a video decoding device may retrieve the data from the memory and decode the data. In some examples, encoding and decoding are performed by devices that do not communicate with each other but only encode data to a memory and/or retrieve the data from the memory and decode the data.

Figure 1B:
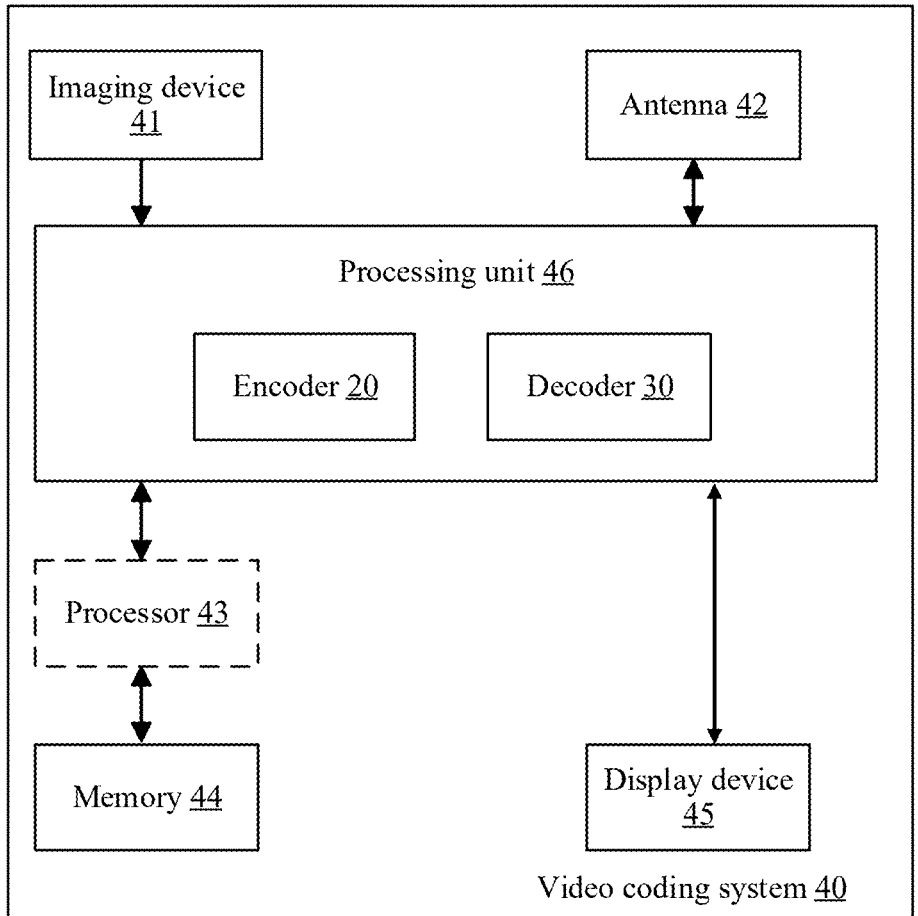
FIG. 1B is a block diagram of an example of a video coding system 40 according to an embodiment of this application.
Figure 2:
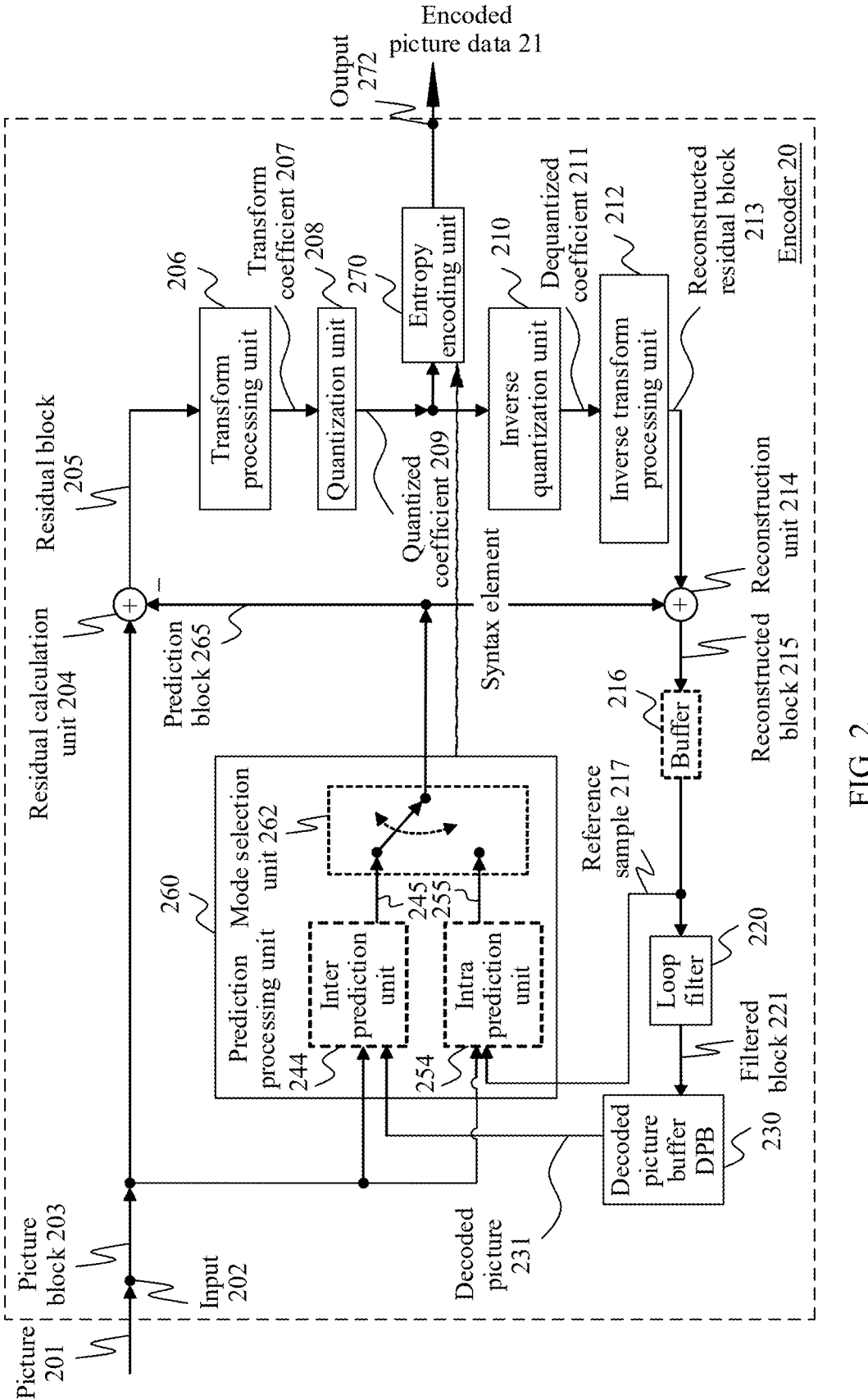
FIG. 2 is a block diagram of an example structure of an encoder 20 according to an embodiment of this application.
Figure 3:
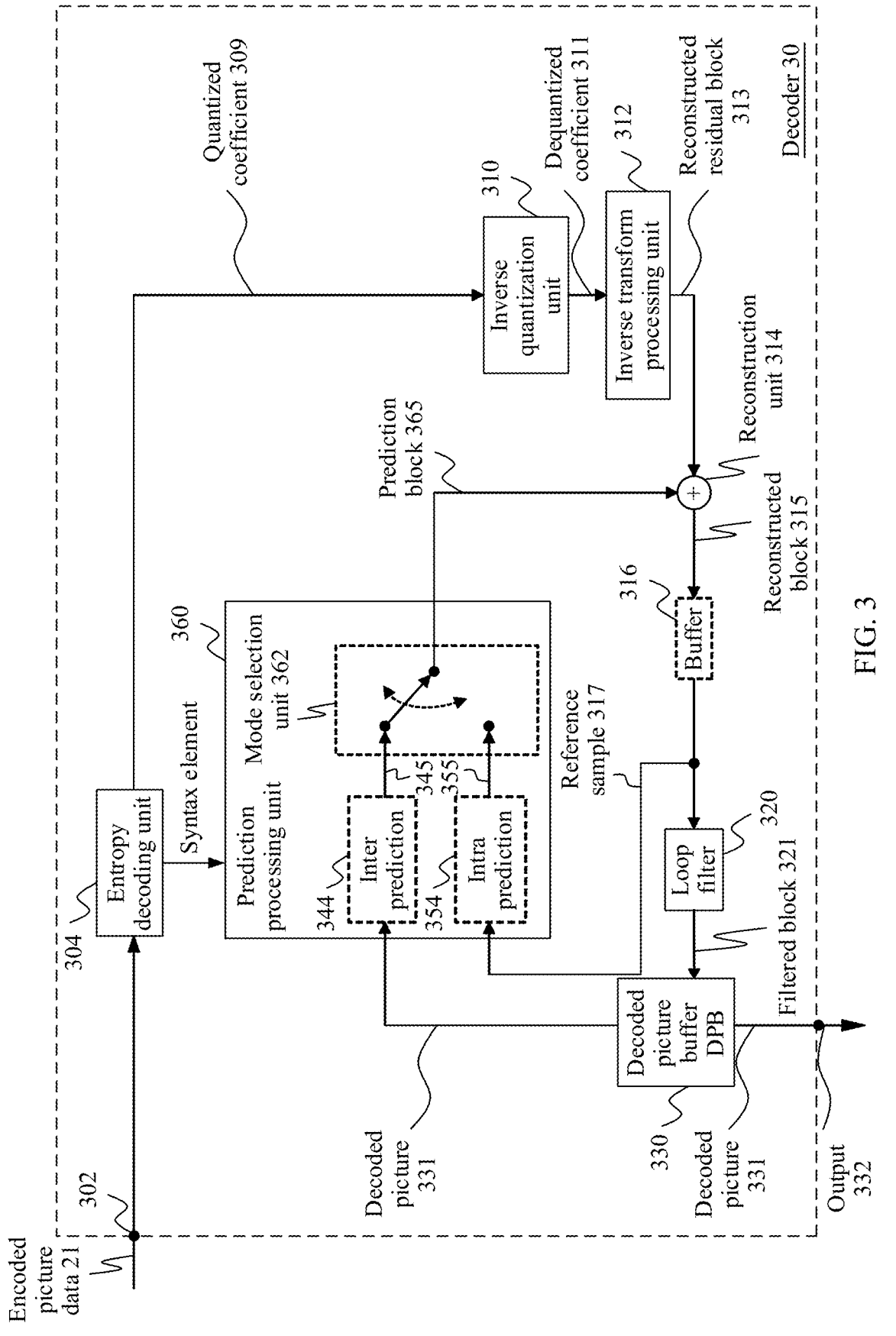
FIG. 3 is a block diagram of an example structure of a decoder 30 according to an embodiment of this application.

FIG. 1B is an illustrative diagram of an example of a video coding system 40 including the encoder 20 in FIG. 2 and/or the decoder 30 in FIG. 3 according to an example embodiment. The video coding system 40 can implement a combination of various technologies in the embodiments of this application. In the illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with both the encoder 20 and the decoder 30, the video coding system 40 may include only the encoder 20 or only the decoder 30 in different examples.

In some examples, the antenna 42 may be configured to transmit or receive an encoded bitstream of video data. Further, in some examples, the display device 45 may be configured to present the video data. In some examples, the logic circuit 47 may be implemented by the processing unit 46. The processing unit 46 may include application-specific integrated circuit (application-specific integrated circuit, ASIC) logic, a graphics processing unit, a general purpose processor, or the like. The video coding system 40 may also include the optional processor 43. The optional processor 43 may similarly include application-specific integrated circuit (application-specific integrated circuit, ASIC) logic, a graphics processing unit, a general purpose processor, or the like. In some examples, the logic circuit 47 may be implemented by hardware such as video encoding dedicated hardware, and the processor 43 may be implemented by universal software, an operating system, or the like. In addition, the memory 44 may be any type of memory, for example, a volatile memory (for example, a static random access memory (Static Random Access Memory, SRAM) or a dynamic random access memory (Dynamic Random Access Memory, DRAM)) or a nonvolatile memory (for example, a flash memory). In a non-limitative example, the memory 44 may be implemented by a cache memory. In some examples, the logic circuit 47 may access the memory 44 (for example, to implement a picture buffer). In other examples, the logic circuit 47 and/or the processing unit 46 may include a memory (for example, a cache) to implement a picture buffer or the like.

In some examples, the encoder 20 implemented by the logic circuit may include a picture buffer (for example, implemented by the processing unit 46 or the memory 44) and a graphics processing unit (for example, implemented by the processing unit 46). The graphics processing unit may be communicatively coupled to the picture buffer. The graphics processing unit may include the encoder 20 implemented by the logic circuit 47, to implement various modules that are described with reference to FIG. 2 and/or any other encoder system or subsystem described in this specification. The logic circuit may be configured to perform various operations described in this specification.

In some examples, the decoder 30 may be similarly implemented by the logic circuit 47, to implement various modules that are described with reference to the decoder 30 in FIG. 3 and/or any other decoder system or subsystem described in this specification. In some examples, the decoder 30 implemented by the logic circuit may include a picture buffer (for example, implemented by the processing unit 46 or the memory 44) and a graphics processing unit (for example, implemented by the processing unit 46). The graphics processing unit may be communicatively coupled to the picture buffer. The graphics processing unit may include the decoder 30 implemented by the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like that is related to video frame encoding described in this specification, for example, data related to encoding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, for the examples described with reference to the encoder 20 in this embodiment of this application, the decoder 30 may be configured to perform an inverse process. For a signaling syntax element, the decoder 30 may be configured to receive and parse the syntax element and decode related video data accordingly. In some examples, the encoder 20 may entropy-encode a syntax element into an encoded video bitstream. In such examples, the decoder 30 may parse the syntax element and decode related video data accordingly.

It should be noted that the method described in this embodiment of this application is mainly used in an inter prediction process. This process exists in both the encoder 20 and the decoder 30. The encoder 20 and the decoder 30 in this embodiment of this application each may be, for example, a corresponding encoder/decoder in a video standard protocol such as H.263, H.264, HEVV, MPEG-2, MPEG-4, VP8, or VP9, or a next-generation video standard protocol (such as H.266).

FIG. 2 is a schematic/conceptual block diagram of an example of an encoder 20 configured to implement an embodiment of this application. In the example of FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (decoded picture buffer, DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a hybrid video codec-based video encoder.

For example, the residual calculation unit 204, the transform processing unit 206, the quantization unit 208, the prediction processing unit 260, and the entropy encoding unit 270 form a forward signal path of the encoder 20, and the inverse quantization unit 210, the inverse transform processing unit 212, the reconstruction unit 214, the buffer 216, the loop filter 220, the decoded picture buffer (decoded picture buffer, DPB) 230, the prediction processing unit 260, and the like form a backward signal path of the encoder. The backward signal path of the encoder corresponds to a signal path of a decoder (refer to a decoder 30 in FIG. 3).

The encoder 20 receives a picture 201 or a picture block 203 of the picture 201 by using an input 202 or the like, for example, a picture in a sequence of pictures that form a video or a video sequence. The picture block 203 may also be referred to as a current picture block or a to-be-encoded picture block, and the picture 201 may be referred to as a current picture or a to-be-encoded picture (especially when the current picture is distinguished from another picture in video coding, other pictures, for example, in a same video sequence, also include previously encoded and/or decoded pictures in the video sequence of the current picture).

The embodiment of the encoder 20 may include a partitioning unit (not shown in FIG. 2), configured to partition the picture 201 into a plurality of non-overlapping blocks such as blocks 203. The partitioning unit may be configured to use a same block size for all pictures in the video sequence and a corresponding raster defining the block size, or may be configured to: change a block size between pictures, subsets, picture groups, and partition each picture into corresponding blocks.

In one example, the prediction processing unit 260 of the encoder 20 may be configured to perform any combination of the partitioning technologies described above.

Like the picture 201, the picture block 203 is also or may be also considered as a two-dimensional array or matrix of samples with sample values, although a size of the picture block 203 is smaller than that of the picture 201. In other words, the picture block 203 may include, for example, one sample array (for example, a luminance array in a case of a monochrome picture 201), three sample arrays (for example, one luminance array and two chrominance arrays in a case of a color picture), or any other quantity and/or type of arrays based on a used color format. A quantity of samples in horizontal and vertical directions (or axes) of the picture block 203 defines the size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (further details about the prediction block 265 are provided below), for example, obtain the residual block 205 in a sample domain by subtracting a sample value of the prediction block 265 from a sample value of the picture block 203 sample by sample.

The transform processing unit 206 is configured to apply transform such as discrete cosine transform (discrete cosine transform, DCT) or discrete sine transform (discrete sine transform, DST) to a sample value of the residual block 205, to obtain a transform coefficient 207 in a transform domain. The transform coefficient 207 may also be referred to as a residual transform coefficient, and indicates the residual block 205 in the transform domain.

The transform processing unit 206 may be configured to apply integer approximation of DCT/DST, for example, transform specified in HEVC/H.265. This integer approximation is usually scaled proportionally by a factor compared with orthogonal DCT transform. To maintain the norm of a residual block obtained through forward transform and inverse transform, an additional scale factor is applied as a part of the transform process. The scale factor is usually selected based on some constraint conditions, for example, is a power of 2, a bit depth of a transform coefficient, or a trade-off between accuracy and implementation costs that is used for a shift operation. For example, a specific scale factor is specified for inverse transform on a decoder 30 side by using the inverse transform processing unit 212 (and correspondingly, for inverse transform an encoder 20 side by using the inverse transform processing unit 212 or the like), and correspondingly, a corresponding scale factor may be specified for forward transform on an encoder 20 side by using the transform processing unit 206.

The quantization unit 208 is configured to quantize the transform coefficient 207 by applying scalar quantization, vector quantization, or the like, to obtain a quantized transform coefficient 209. The quantized transform coefficient 209 may also be referred to as a quantized residual coefficient 209. The quantization process may reduce a bit depth related to some or all transform coefficients 207. For example, an n-bit transform coefficient may be rounded down to an m-bit transform coefficient during quantization, where n is greater than m. A quantization degree may be modified by adjusting a quantization parameter (quantization parameter, QP). For example, for scale quantization, different scales may be applied to achieve finer or coarser quantization. A smaller quantization step corresponds to finer quantization, and a larger quantization step corresponds to coarser quantization. A proper quantization step may be indicated by a quantization parameter (quantization parameter, QP). For example, the quantization parameter may be an index to a predefined set of proper quantization steps. For example, a smaller quantization parameter may correspond to finer quantization (a smaller quantization step) and a larger quantization parameter may correspond to coarser quantization (a larger quantization step), or vice versa. The quantization may include division by a quantization step and corresponding quantization or inverse quantization performed by the inverse quantization unit 210 or the like, or may include multiplication by a quantization step. In embodiments according to some standards such as HEVC, a quantization parameter may be used to determine a quantization step. Generally, the quantization step may be calculated based on the quantization parameter through fixed point approximation of an equation including division. Additional scale factors may be introduced for quantization and dequantization, to restore the norm that is of a residual block and that may be modified because of a scale used in the fixed point approximation of the equation used for the quantization step and the quantization parameter. In an example implementation, a scale of inverse transform may be combined with a scale of dequantization. Alternatively, a customized quantization table may be used and signaled from an encoder to a decoder, for example, in a bitstream. The quantization is a lossy operation, and a larger quantization step indicates a larger loss.

The inverse quantization unit 210 is configured to apply inverse quantization of the quantization applied by the quantization unit 208 to a quantized coefficient to obtain a dequantized coefficient 211, for example, apply, based on or by using a same quantization step as the quantization unit 208, an inverse quantization scheme of the quantization scheme applied by the quantization unit 208. The dequantized coefficient 211 may also be referred to as a dequantized residual coefficient 211, and correspond to the transform coefficient 207, although a loss caused by quantization is usually different from the transform coefficient.

The inverse transform processing unit 212 is configured to apply inverse transform of the transform applied by the transform processing unit 206, for example, inverse discrete cosine transform (discrete cosine transform, DCT) or inverse discrete sine transform (discrete sine transform, DST), to obtain an inverse transform block 213 in a sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, a reconstructed residual block 213) to the prediction block 265 to obtain a reconstructed block 215 in the sample domain, for example, by adding a sample value of the reconstructed residual block 213 and a sample value of the prediction block 265.

In one embodiment, the buffer unit 216 (or the "buffer" 216 for short) such as a line buffer 216 is configured to buffer or store the reconstructed block 215 and a corresponding sample value for intra prediction and the like. In other embodiments, an encoder may be configured to use an unfiltered reconstructed block and/or a corresponding sample value that are/is stored in the buffer unit 216 for any type of estimation and/or prediction such as intra prediction.

For example, the embodiment of the encoder 20 may be configured, so that the buffer unit 216 is not only configured to store the reconstructed block 215 for intra prediction, but also configured to store the filtered block 221 of the loop filter unit 220 (not shown in FIG. 2), and/or the buffer unit 216 and the decoded picture buffer unit 230 form one buffer. Other embodiments may be used to use a filtered block 221 and/or a block or a sample from the decoded picture buffer 230 (not shown in FIG. 2) as an input or a basis for intra prediction.

The loop filter unit 220 (or the "loop filter" 220 for short) is configured to perform filtering on the reconstructed block 215 to obtain the filtered block 221, so as to smoothly perform sample transformation or improve video quality. The loop filter unit 220 is intended to represent one or more loop filters, for example, a de-blocking filter, a sample-adaptive offset (sample-adaptive offset, SAO) filter, or another filter such as a bilateral filter, an adaptive loop filter (adaptive loop filter, ALF), a sharpening or smoothing filter, or a cooperative filter. Although the loop filter unit 220 is shown in FIG. 2 as an in-loop filter, the loop filter unit 220 may be implemented as a post-loop filter in other configurations. The filtered block 221 may also be referred to as a filtered reconstructed block 221. The decoded picture buffer 230 may store the reconstructed coding block after the loop filter unit 220 performs a filtering operation on the reconstructed coding block.

The embodiment of the encoder 20 (correspondingly, the loop filter unit 220) may be used to output a loop filter parameter (for example, sample adaptive offset information), for example, directly output a loop filter parameter or output a loop filter parameter after the entropy encoding unit 270 or any other entropy encoding unit performs entropy encoding, so that the decoder 30 can receive and apply a same loop filter parameter for decoding, and the like.

The decoded picture buffer (decoded picture buffer, DPB) 230 may be a reference picture memory that stores reference picture data for the video encoder 20 to encode video data. The DPB 230 may be any one of a plurality of memories, for example, a dynamic random access memory (dynamic random access memory, DRAM) (including a synchronous DRAM (synchronous DRAM, SDRAM), a magnetoresistive RAM (magnetoresistive RAM, MRAM), or a resistive RAM (resistive RAM, RRAM)), or another type of memory. The DPB 230 and the buffer 216 may be provided by a same memory or separate memories. In an example, the decoded picture buffer (decoded picture buffer, DPB) 230 is configured to store the filtered block 221. The decoded picture buffer 230 may be further configured to store other previous filtered blocks such as previous reconstructed and filtered blocks 221 of a same current picture or different pictures such as previous reconstructed pictures, and may provide a complete previous reconstructed, that is, decoded picture (and a corresponding reference block and a corresponding sample) and/or a partially reconstructed current picture (and a corresponding reference block and a corresponding sample) for inter prediction and the like. In an example, if the reconstructed block 215 is reconstructed without in-loop filtering, the decoded picture buffer (decoded picture buffer, DPB) 230 is configured to store the reconstructed block 215.

The prediction processing unit 260 is also referred to as a block prediction processing unit 260, and is configured to: receive or obtain the block 203 (the current block 203 of the current picture 201) and reconstructed picture data, for example, a reference sample from a same (current) picture in the buffer 216 and/or reference picture data 231 from one or more previous decoded pictures in the decoded picture buffer 230, and process such data for prediction, that is, provide a prediction block 265 that may be an inter prediction block 245 or an intra prediction block 255.

The mode selection unit 262 may be configured to select a prediction mode (for example, an intra or inter prediction mode) and/or a corresponding prediction block 245 or 255 as the prediction block 265, to calculate the residual block 205 and reconstruct the reconstructed block 215.

The embodiment of the mode selection unit 262 may be used to select a prediction mode (for example, from prediction modes supported by the prediction processing unit 260). The prediction mode provides a best match or a minimum residual (the minimum residual means better compression in transmission or storage), or provides minimum signaling overheads (the minimum signaling overheads mean better compression in transmission or storage), or considers or balances the two. The mode selection unit 262 may be configured to determine a prediction mode based on rate distortion optimization (rate distortion optimization, RDO), that is, select a prediction mode that provides minimum rate distortion optimization, or select a prediction mode in which related rate distortion at least meets a prediction mode selection criterion.

The prediction processing (for example, by using the prediction processing unit 260) and the mode selection (for example, by using the mode selection unit 262) performed by an example of the encoder 20 are described in detail below.

As described above, the encoder 20 is configured to determine or select a best or optimal prediction mode from a (predetermined) prediction mode set. The prediction mode set may include, for example, an intra prediction mode and/or an inter prediction mode.

The intra prediction mode set may include 35 different intra prediction modes, for example, non-directional modes such as a DC (or mean) mode and a planar mode, or directional modes defined in H.265, or may include 67 different intra prediction modes, for example, non-directional mode such as a DC (or mean) mode and a planar mode, or developing directional modes defined in H.266.

In an embodiment, an inter prediction mode set depends on an available reference picture (for example, at least a part of the decoded picture stored in the DBP 230) and other inter prediction parameters, for example, depends on whether the entire reference picture is used or only a part of the reference picture is used, for example, a search window region surrounding a region of a current block is searched for a best matched reference block, and/or depends on whether sample interpolation such as half-sample and/or quarter-sample interpolation is applied. The inter prediction mode set may include, for example, an advanced motion vector prediction (Advanced Motion Vector Prediction, AMVP) mode and a merge (merge) mode. During specific implementation, the inter prediction mode set may include a control point-based AMVP mode and a control point-based merge mode that are improved in this embodiment of this application. In an example, the intra prediction unit 254 may be configured to perform any combination of inter prediction technologies described below.

In addition to the foregoing prediction modes, a skip mode and/or a direct mode may also be applied in this embodiment of this application.

The prediction processing unit 260 may be further configured to: partition the picture block 203 into smaller block partitions or subblocks, for example, by iteratively using quad-tree (quad-tree, QT) partitioning, binary-tree (binary-tree, BT) partitioning, triple-tree (triple-tree, TT) partitioning, or any combination thereof, and perform prediction and the like on each of the block partitions or the subblocks. The mode selection includes selecting a tree structure of the partitioned picture block 203 and selecting a prediction mode applied to each of the block partitions or the sub-blocks.

The inter prediction unit 244 may include a motion estimation (motion estimation, ME) unit (not shown in FIG. 2) and a motion compensation (motion compensation, MC) unit (not shown in FIG. 2). The motion estimation unit is configured to receive or obtain the picture block 203 (the current picture block 203 of the current picture 201) and the decoded picture 31, or at least one or more previous reconstructed blocks, for example, one or more other reconstructed blocks different from the previous decoded picture 231, to perform motion estimation. For example, a video sequence may include the current picture and the previous decoded picture 31. In other words, the current picture and the previous decoded picture 31 may be a part of a sequence of pictures that form the video sequence, or form the picture sequence.

For example, the encoder 20 may be configured to: select a reference block from a plurality of reference blocks of a same picture or different pictures in a plurality of other pictures, and provide a reference picture and/or an offset (a spatial offset) between a location (X-Y coordinates) of the reference block and a location of the current block as an inter prediction parameter to the motion estimation unit (not shown in FIG. 2). This offset is also referred to as a motion vector (motion vector, MV).

The motion compensation unit is configured to: obtain an inter prediction parameter, and perform inter prediction based on or by using the inter prediction parameter to obtain the inter prediction block 245. The motion compensation performed by the motion compensation unit (not shown in FIG. 2) may include fetching or generating the prediction block based on a motion/block vector determined through motion estimation (possibly performing interpolation on sub-sample precision). During interpolation filtering, an additional sample may be generated from known samples, thereby potentially increasing a quantity of candidate prediction blocks that may be used to encode a picture block. Once a motion vector used for a PU of a current picture block is received, the motion compensation unit 246 may locate a prediction block to which the motion vector points in a reference picture list. The motion compensation unit 246 may further generate a syntax element associated with a block and a video slice, so that the video decoder 30 uses the syntax element when decoding a picture block of the video slice.

Specifically, the inter prediction unit 244 may transmit a syntax element to the entropy encoding unit 270, and the syntax element includes the inter prediction parameter (such as indication information for selecting an inter prediction mode used for prediction of the current block after a plurality of inter prediction modes are traversed). In a possible application scenario, if there is only one inter prediction mode, the inter prediction parameter may be alternatively not carried in the syntax element. In this case, the decoder 30 may directly perform decoding in a default prediction mode. It can be understood that the inter prediction unit 244 may be configured to perform any combination of inter prediction technologies.

The intra prediction unit 254 is configured to obtain, for example, receive a picture block 203 (a current picture block) of the same picture and one or more previous reconstructed blocks such as reconstructed neighboring blocks, to perform intra estimation. For example, the encoder 20 may be configured to select an intra prediction mode from a plurality of (predetermined) intra prediction modes.

The embodiment of the encoder 20 may be configured to select an intra prediction mode based on an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on an intra prediction parameter of the selected intra prediction mode. In any case, after selecting the intra prediction mode used for a block, the intra prediction unit 254 is further configured to provide the intra prediction parameter to the entropy encoding unit 270, that is, provide information for indicating the selected intra prediction mode used for a block. In an example, the intra prediction unit 254 may be configured to perform any combination of the following intra prediction technologies.

Specifically, the intra prediction unit 254 may transmit a syntax element to the entropy encoding unit 270, and the syntax element includes the intra prediction parameter (such as indication information for selecting an intra prediction mode used for prediction of the current block after a plurality of intra prediction modes are traversed). In a possible application scenario, if there is only one intra prediction mode, the intra prediction parameter may be alternatively not carried in the syntax element. In this case, the decoder 30 may directly perform decoding in a default prediction mode.

The entropy encoding unit 270 is configured to apply an entropy encoding algorithm or scheme (for example, a variable length coding (variable length coding, VLC) scheme, a context adaptive VLC (context adaptive VLC, CAVLC) scheme, an arithmetic coding scheme, a context adaptive binary arithmetic coding (context adaptive binary arithmetic coding, CABAC) scheme, a syntax-based context-adaptive binary arithmetic coding (syntax-based context-adaptive binary arithmetic coding, SBAC) scheme, a probability interval partitioning entropy (probability interval partitioning entropy, PIPE) coding scheme, or another entropy encoding method or technology) to one or more (or none) of the quantized residual coefficient 209, the inter prediction parameter, the intra prediction parameter, and/or the loop filter parameter, to obtain the encoded picture data 21 that can be output by using an output 272, for example, in a form of an encoded bitstream. The encoded bitstream may be transmitted to the video decoder 30, or may be archived for later transmission or retrieval by the video decoder 30. The entropy encoding unit 270 may be further configured to perform entropy encoding on another syntax element of the current video slice that is being encoded.

Another structural variant of the video encoder 20 may be configured to encode a video stream. For example, the non-transform-based encoder 20 may directly quantize a residual signal without the transform processing unit 206 for some blocks or frames. In another implementation, the encoder 20 may have the quantization unit 208 and the inverse quantization unit 210 that are combined into one unit.

Specifically, in this embodiment of this application, the encoder 20 may be configured to implement an inter prediction method described in the following embodiment.

It should be understood that another structural variant of the video encoder 20 may be configured to encode a video stream. For example, for some picture blocks or picture frames, the video encoder 20 may directly quantize the residual signal without a need for the transform processing unit 206 to perform processing, and correspondingly, without a need for the inverse transform processing unit 212 to perform processing. Alternatively, for some picture blocks or picture frames, the video encoder 20 does not generate residual data, and correspondingly, there is no need for the transform processing unit 206, the quantization unit 208, the inverse quantization unit 210, and the inverse transform processing unit 212 to perform processing. Alternatively, the video encoder 20 may directly store a reconstructed picture block as a reference block without a need for the filter 220 to perform processing. Alternatively, the quantization unit 208 and the inverse quantization unit 210 in the video encoder 20 may be combined together. The loop filter 220 is optional, and in a case of lossless compression encoding, the transform processing unit 206, the quantization unit 208, the inverse quantization unit 210, and the inverse transform processing unit 212 are optional. It should be understood that, in different application scenarios, the inter prediction unit 244 and intra prediction unit 254 may be used selectively.

FIG. 3 is a schematic/conceptual block diagram of an example of a decoder 30 configured to implement an embodiment of this application. The video decoder 30 is configured to receive encoded picture data (for example, an encoded bitstream) 21 encoded by the encoder 20 or the like, to obtain a decoded picture 231. In a decoding process, the video decoder 30 receives video data from the video encoder 20, for example, an encoded video bitstream that indicates a picture block of an encoded video slice and an associated syntax element.

In the example of FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform decoding traversal generally reverse to the encoding traversal described with reference to the video encoder 20 in FIG. 2.

The entropy decoding unit 304 is configured to perform entropy decoding on the encoded picture data 21, to obtain a quantized coefficient 309, a decoded coding parameter (not shown in FIG. 3), and/or the like, for example, any one or all of an inter prediction parameter, an intra prediction parameter, a loop filter parameter, and/or another syntax element (decoded). The entropy decoding unit 304 is further configured to forward the inter prediction parameter, the intra prediction parameter, and/or the another syntax element to the prediction processing unit 360. The video decoder 30 may receive a syntax element at a video slice level and/or a syntax element at a video block level.

The inverse quantization unit 310 may have a same function as the inverse quantization unit 110, the inverse transform processing unit 312 may have a same function as the inverse transform processing unit 212, the reconstruction unit 314 may have a same function as the reconstruction unit 214, the buffer 316 may have a same function same as the buffer 216, the loop filter 320 may have a same function as the loop filter 220, and the decoded picture buffer 330 may have a same function as the decoded picture buffer 230.

The prediction processing unit 360 may include the inter prediction unit 344 and the intra prediction unit 354. The inter prediction unit 344 may have a function similar to that of the inter prediction unit 244, and the intra prediction unit 354 may have a function similar to that of the intra prediction unit 254. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 used for a picture block of the current video slice based on a signaled intra prediction mode and data from a previous decoded block of a current frame or picture. When a video frame is encoded as an inter-coded (that is, B or P) slice, the inter prediction unit 344 (for example, a motion compensation unit) of the prediction processing unit 360 is configured to generate the prediction block 365 used for a video block of the current video slice based on a motion vector and another syntax element received from the entropy decoding unit 304. For inter prediction, a prediction block may be generated from one of reference pictures in one reference picture list. The video decoder 30 may construct reference frame lists: a list 0 and a list 1 by using a default construction technology based on a reference picture stored in the DPB 330.

The prediction processing unit 360 is configured to: determine prediction information used for the video block of the current video slice by parsing the motion vector and the another syntax element, and use the prediction information to generate the prediction block used for the current video block that is being decoded. For example, the prediction processing unit 360 determines, by using some received syntax elements, a prediction mode (for example, intra or inter prediction) used to encode a video block of a video slice, an inter prediction slice type (for example, a B slice, a P slice, or a GPB slice), construction information of one or more of pictures in a reference picture list used for a slice, a motion vector of each inter-encoded video block used for a slice, an inter prediction state of each inter-encoded video block used for a slice, and other information, to decode the video block of the current video slice. In another example of this disclosure, the syntax element received by the video decoder 30 from the bitstream includes syntax elements in one or more of an adaptive parameter set (adaptive parameter set, APS), a sequence parameter set (sequence parameter set, SPS), a picture parameter set (picture parameter set, PPS), or a slice header.

The inverse quantization unit 310 may be configured to perform inverse quantization (that is, dequantization) on a quantized transform coefficient provided in the bitstream and decoded by the entropy decoding unit 304. The inverse quantization process may include: using a quantization parameter calculated by the video encoder 20 for each video block in the video slice, to determine a quantization degree that should be applied and determine an inverse quantization degree that should be applied.

The inverse transform processing unit 312 is configured to apply inverse transform (for example, inverse DCT, inverse integer transform, or a conceptually similar inverse transform process) to the transform coefficient, to generate a residual block in a sample domain.

The reconstruction unit 314 (for example, the summator 314) is configured to add an inverse transform block 313 (that is, a reconstructed residual block 313) to the prediction block 365, to obtain a reconstructed block 315 in a sample domain, for example, by adding a sample value of the reconstructed residual block 313 to a sample value of the prediction block 365.

The loop filter unit 320 (in an encoding loop or after an encoding loop) is configured to filter the reconstructed block 315 to obtain a filtered block 321, so as to smoothly perform sample transformation or improve video quality. In an example, the loop filter unit 320 may be configured to perform any combination of the following filtering technologies. The loop filter unit 320 is intended to represent one or more loop filters, for example, a de-blocking filter, a sample-adaptive offset (sample-adaptive offset, SAO) filter, or another filter such as a bilateral filter, an adaptive loop filter (adaptive loop filter, ALF), a sharpening or smoothing filter, or a collaborative filter. Although the loop filter unit 320 is shown in FIG. 3 as an in-loop filter, the loop filter unit 320 may be implemented as a post-loop filter in other configurations.

The decoded video block 321 in a given frame or picture is then stored in the decoded picture buffer 330 that stores a reference picture used for subsequent motion compensation.

The decoder 30 is configured to output the decoded picture 31 by using an output 332, and the like, to present the decoded picture 31 to the user or provide the decoded picture 31 for the user to view.

Another variation of the video decoder 30 may be configured to decode a compressed bitstream. For example, the decoder 30 may generate an output video stream without the loop filter unit 320. For example, the non-transform-based decoder 30 may directly dequantize a residual signal without the inverse transform processing unit 312 for some blocks or frames. In another implementation, the video decoder 30 may have the inverse quantization unit 310 and the inverse transform processing unit 312 that are combined into one unit.

Specifically, in this embodiment of the present disclosure, the decoder 30 is configured to implement an inter prediction method described in the following embodiment.

It should be understood that another structural variant of the video decoder 30 may be configured to decode the encoded video bitstream. For example, the video decoder 30 may generate an output video stream without a need for the filter 320 to perform processing. Alternatively, for some picture blocks or picture frames, the entropy decoding unit 304 of the video decoder 30 does not obtain a quantized coefficient through decoding, and correspondingly, there is no need for the inverse quantization unit 310 and the inverse transform processing unit 312 to perform processing. The loop filter 320 is optional, and in a case of lossless compression, the inverse quantization unit 310 and the inverse transform processing unit 312 are optional. It should be understood that, in different application scenarios, the inter prediction unit and the intra prediction unit may be used selectively.

It should be understood that, in the encoder 20 and the decoder 30 in this application, a processing result for a procedure may be output to a next procedure after being further processed. For example, after a procedure such as interpolation filtering, motion vector derivation, or loop filtering, an operation such as clip or shift is further performed on a processing result of a corresponding procedure.

For example, a motion vector of a control point of a current picture block or a motion vector of a subblock of a current picture block that is derived from a motion vector of a neighboring affine coding block may be further processed. This is not limited in this application. For example, a value of a motion vector is constrained to be within a specific bit width range. Assuming that an allowed bit width of the motion vector is bitDepth, the value of the motion vector ranges from $-2\hat{\ }(\text{bitDepth}-1)$ to $2\hat{\ }(\text{bitDepth}-1)-1$, where the symbol """ represents exponentiation. If bitDepth is 16, the value ranges from $-32768$ to $32767$. If bitDepth is 18, the value ranges from $-131072$ to $131071$. For another example, a value of a motion vector (for example, motion vectors MVs of four 4×4 subblocks in one 8×8 picture block) is constrained, so that a maximum difference between integer parts of the MVs of the four 4×4 subblocks does not exceed N samples, for example, does not exceed one sample.

The following two manners may be used to constrain a value of a motion vector to be within a specific bit width range:

Manner 1: An overflow most significant bit of the motion vector is removed:

$$ux = \left(vx + 2^{bitDepth}\right) \% 2^{bitDepth}$$

$$vx = \left(ux \geq 2^{bitDepth-1}\right) ? \left(ux - 2^{bitDepth}\right) : ux$$

$$uy = \left(vy + 2^{bitDepth}\right) \% 2^{bitDepth}$$

$$vy = \left(uy \geq 2^{bitDepth-1}\right) ? \left(uy - 2^{bitDepth}\right) : uy$$

Herein, vx is a horizontal component of a motion vector of a picture block or a subblock of the picture block, vy is a vertical component of the motion vector of the picture block or the subblock of the picture block, ux and uy are intermediate values, and bitDepth represents a bit width.

For example, a value of vx is $-32769$, and is $32767$ obtained according to the foregoing formulas. A value is stored in a computer in a form of a binary supplemental code, a binary supplemental code of $-32769$ is $1,0111,1111,$ $1111,1111$ (17 bits), and the computer discards a most significant bit when overflow occurs. Therefore, the value of vx is $0111,1111,1111,1111$, that is, $32767$, which is consistent with the result obtained according to the formulas.

Manner 2: Clipping is performed on the motion vector, as shown in the following formulas:

$$vx = Clip3\left(-2^{bitDepth-1}, 2^{bitDepth-1} - 1, vx\right)$$

$$vy = Clip3\left(-2^{bitDepth-1}, 2^{bitDepth-1} - 1, vy\right)$$

Herein, vx is a horizontal component of a motion vector of a picture block or a subblock of the picture block, vy is a vertical component of the motion vector of the picture block or the subblock of the picture block, x, y, and z correspond to three input values of an MV clamping process Clip3, and Clip3 represents clipping a value of z to a range [x, y].

$$Clip3(x, y, z) = \begin{cases} x; & z < x \\ y; & z > y \\ z; & \text{otherwise} \end{cases}$$

Figure 4:
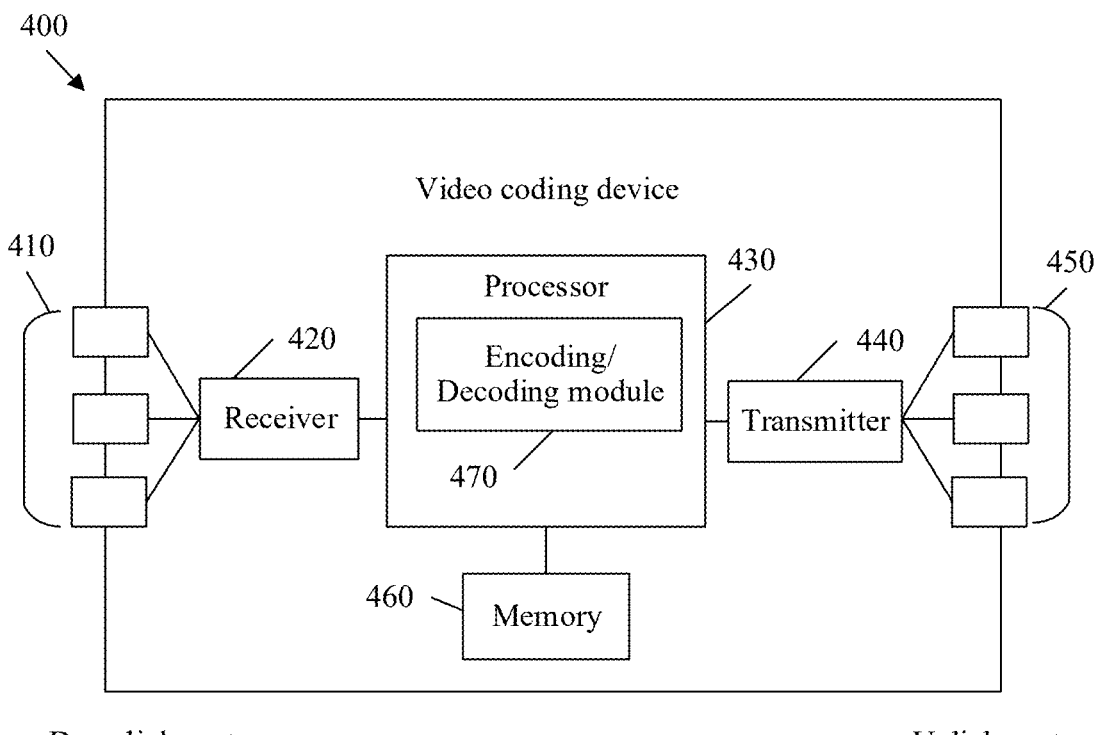
FIG. 4 is a block diagram of an example of a video coding device 400 according to an embodiment of this application.

FIG. 4 is a schematic structural diagram of a video coding device 400 (for example, a video encoding device 400 or a video decoding device 400) according to an embodiment of this application. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: an ingress port 410 and a receiver unit (Rx) 420 that are configured to receive data; a processor, a logic unit, or a central processing unit (CPU) 430 that is configured to process data; a transmitter unit (Tx) 440 and an egress port 450 that are configured to transmit data; and a memory 460 configured to store the data. The video coding device 400 may further include an optical-to-electrical component and an electrical-to-optical (EO) component coupled to the ingress port 410, the receiver unit 420, the transmitter unit 440, and the egress port 450 for egress or ingress of an optical signal or an electrical signal.

The processor 430 is implemented by hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement a chroma block prediction method provided in the embodiments of this application. For example, the encoding/decoding module 470 performs, processes, or provides various coding operations. Therefore, the encoding/decoding module 470 substantially expands functions of the video coding device 400, and affects switching of the video coding device 400 between different states. Alternatively, the encoding/decoding module 470 is implemented as an instruction stored in the memory 460 and executed by the processor 430.

The memory 460 includes one or more disks, tape drives, and solid-state drives, and may be used as an overflow data storage device, to store programs when these programs are selected for execution, and to store instructions and data that are read during program execution. The memory 460 may be volatile and/or nonvolatile, and may be a read-only memory (ROM), a random access memory (RAM), a ternary content-addressable memory (ternary content-addressable memory, TCAM), and/or a static random access memory (SRAM).

Figure 5:
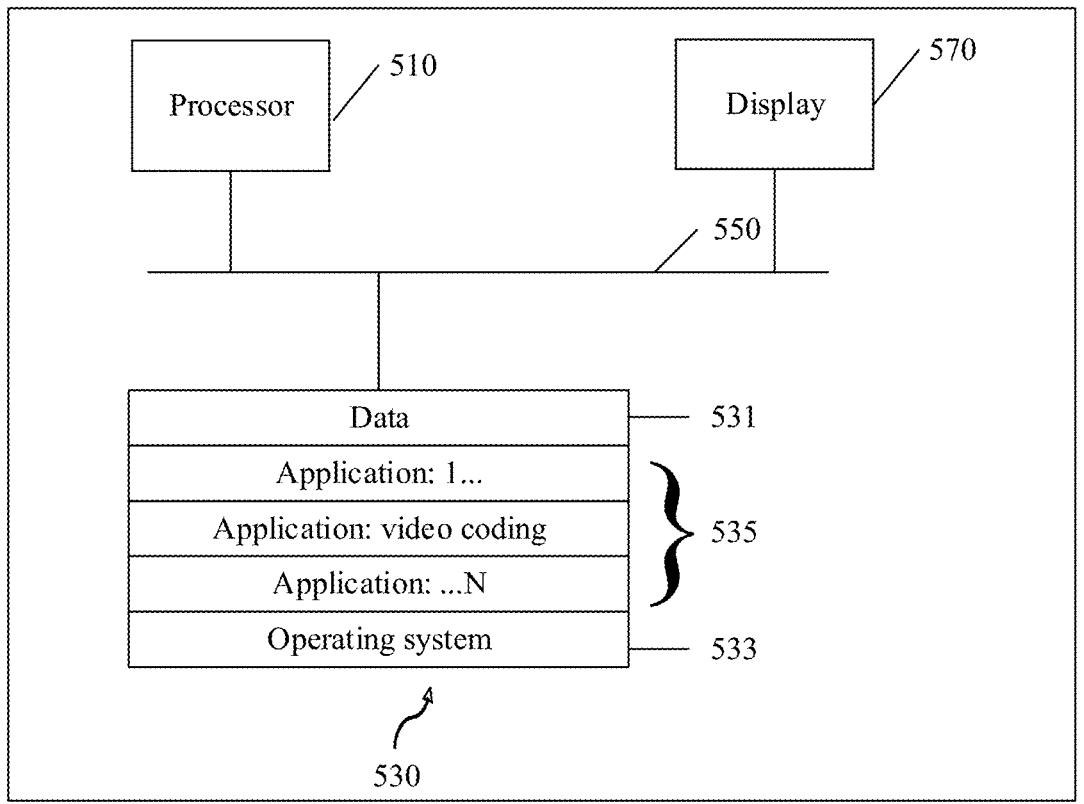
FIG. 5 is a block diagram of another example of an encoding apparatus or a decoding apparatus according to an embodiment of this application.

FIG. 5 is a simplified block diagram of an apparatus 500 that may be used as either or both of the source device 12 and the destination device 14 in FIG. 1A according to an example embodiment. The apparatus 500 may implement the technologies of this application. In other words, FIG. 5 is a schematic block diagram of an implementation of an encoding device or a decoding device (a coding device 500 for short) according to an embodiment of this application. The coding device 500 may include a processor 510, a memory 530, and a bus system 550. The processor and the memory are connected through the bus system. The memory is configured to store an instruction. The processor is configured to execute the instruction stored in the memory. The memory of the coding device stores program code, and the processor of the coding device may invoke the program code stored in the memory, to perform the video encoding or decoding method described in this application. To avoid repetition, details are not described herein.

In this embodiment of this application, the processor 510 may be a central processing unit (Central Processing Unit, "CPU" for short). Alternatively, the processor 510 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, any conventional processor, or the like.

The memory 530 may include a read-only memory (ROM) or a random access memory (RAM). Any other proper type of storage device may be used as the memory 530. The memory 530 may include code and data 531 accessed by the processor 510 through the bus 550. The memory 530 may further include an operating system 533 and an application program 535. The application program 535 includes at least one program that allows the processor 510 to perform the video encoding or decoding method (in particular, the inter prediction method described in this application) described in this application. For example, the application program 535 may include applications 1 to N, and further includes a video encoding or decoding application (a video coding application for short) for performing the video encoding or decoding method described in this application.

In addition to a data bus, the bus system 550 may further include a power bus, a control bus, a status signal bus, and the like. However, for clear description, various types of buses in the figure are marked as the bus system 550.

Optionally, the coding device 500 may further include one or more output devices, for example, a display 570. In an example, the display 570 may be a touch sensitive display that combines a display and a touch sensitive element that is operable to sense a touch input. The display 570 may be connected to the processor 510 through the bus 550.

The following describes in detail the solutions in the embodiments of this application.

Video encoding mainly includes processes such as intra prediction (Intra Prediction), inter prediction (Inter Prediction), transform (Transform), quantization (Quantization), entropy encoding (Entropy encode), and in-loop filtering (in-loop filtering) (mainly de-blocking filtering, de-blocking filtering). After a picture is partitioned into coding blocks, intra prediction or inter prediction is performed. Then, after a residual is obtained, transform and quantization are performed. Finally, entropy encoding is performed and a bitstream is output. Herein, a coding block is an M×N array including samples (M may be equal to N, or may not equal to N). In addition, a sample value of each sample location is known.

Intra prediction is to predict a sample value of a sample in a current coding block by using a sample value of a sample in a reconstructed region in a current picture.

Inter prediction is to search a reconstructed picture for a matched reference block for a current coding block in a current picture, to obtain motion information of the current coding block, and then calculate prediction information or a predictor (the information and the value are not distinguished in the following) of a sample value of a sample in the current coding block based on the motion information. A process of calculating motion information is referred to as motion estimation (Motion estimation, ME), and a process of calculating a predictor of a sample value of a sample in a current coding block is referred to as motion compensation (Motion compensation, MC).

It should be noted that the motion information of the current coding block includes prediction direction indication information (generally forward prediction, backward prediction, or bidirectional prediction), one or two motion vectors (Motion vector, MV) pointing to a reference block, and indication information (generally marked as a reference index Reference index) of a picture in which the reference block is located.

Forward prediction is to select a reference picture from a forward reference picture set for a current coding block, to obtain a reference block. Backward prediction is to select a reference picture from a backward reference picture set for a current coding block, to obtain a reference block. Bidirectional prediction is to select a reference picture from a forward reference picture set and a reference picture from a backward reference picture set, to obtain a reference block. When bidirectional prediction is performed, there are two reference blocks for a current coding block. Each reference block needs to be indicated by using a motion vector and a reference frame index. Then, a predictor of a sample value of a sample in the current block is determined based on sample values of samples in the two reference blocks.

During motion estimation, a plurality of reference blocks need to be tried for the current coding block in the reference picture, and a specific reference block finally used for prediction is determined through rate-distortion optimization (rate-distortion optimization, RDO) or other methods.

After the prediction information is obtained through intra prediction or inter prediction, residual information is obtained by subtracting the corresponding prediction information from the sample value of the sample in the current coding block. Then, the residual information is transformed by using a discrete cosine transform (discrete cosine transformation, DCT) method or the like, and a bitstream is obtained through quantization and entropy encoding. After a prediction signal is combined with a reconstructed residual signal, filtering needs to be performed to obtain a reconstructed signal. The reconstructed signal is used as a reference signal for subsequent encoding.

Decoding is an inverse process of encoding. For example, residual information is first obtained through entropy decoding, inverse quantization, and inverse transform, and a bitstream is decoded to determine whether intra prediction or inter prediction is performed on a current coding block. If intra prediction is performed, prediction information is constructed based on a sample value of a sample in a reconstructed region around the current coding block by using the intra prediction method. If inter prediction is performed, motion information needs to be obtained through parsing, a reference block is determined in a reconstructed picture based on the motion information obtained through parsing, and the sample value of the sample in the block is used as the prediction information. This process is referred to as motion compensation (Motion compensation, MC). Reconstructed information can be obtained by combining the prediction information and the residual information and performing a filtering operation.

In HEVC, two inter prediction modes are used: an advanced motion vector prediction (Advanced Motion Vector Prediction, AMVP) mode and a merge (Merge) mode.

In the AMVP mode, a candidate motion vector list is constructed based on motion information of a spatially neighboring coding block or a temporally neighboring coding block of a current coding block. Then, an optimal motion vector is determined in the candidate motion vector list and is used as a motion vector predictor (Motion vector predictor, MVP) of the current coding block. A rate-distortion cost is calculated according to a formula $J=SAD+\lambda$, where J is the rate-distortion cost RD Cost, SAD is a sum of absolute differences (Sum of Absolute Differences, SAD) between an original sample value and a predicted sample value obtained through motion estimation by using the candidate motion vector predictor, R is a bit rate, and $\lambda$ is a Lagrange multiplier. An encoder side transfers an index value of the selected motion vector predictor in the candidate motion vector list and an index value of a reference frame to a decoder side. Further, motion search is performed in a neighborhood centered on the MVP, to obtain an actual motion vector of the current coding block. The encoder side transfers a difference (motion vector difference) between the MVP and the actual motion vector to the decoder side.

Figure 6:
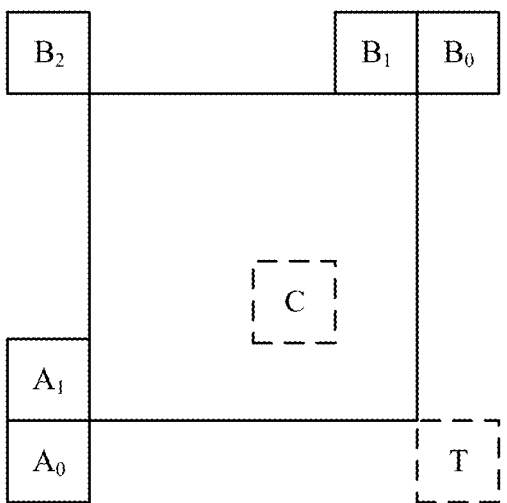
FIG. 6 is a schematic diagram of a motion information candidate location according to an embodiment of this application.

In the merge mode, a candidate motion information list is constructed based on motion information of a spatially neighboring coding block or a temporally neighboring coding block of a current coding block. Then, optimal motion information is determined in the candidate motion information list based on a rate-distortion cost and is used as motion information of the current coding block. Next, an index value (denoted as a merge index below) of a location of the optimal motion information in the candidate motion information list is transferred to a decoder side. Spatial candidate motion information and temporal candidate motion information of the current coding block are shown in FIG. 6. The spatial candidate motion information is from five spatially neighboring blocks (A0, A1, B0, B1, and B2). If a neighboring block is unavailable or an inter prediction mode is used, motion information of the neighboring block is not added to the candidate motion information list. The temporal candidate motion information of the current coding block is obtained by scaling an MV of a block at a corresponding location in a reference frame based on picture order counts (picture order count, POC) of the reference frame and a current frame. Whether a block at a T location in the reference frame is available is first determined. If the block is unavailable, a block at a C location is selected.

In inter prediction in HEVC, all samples in a coding block have same motion information, and then motion compensation is performed based on the motion information, to obtain predictors of the samples in the coding block.

Figure 7:
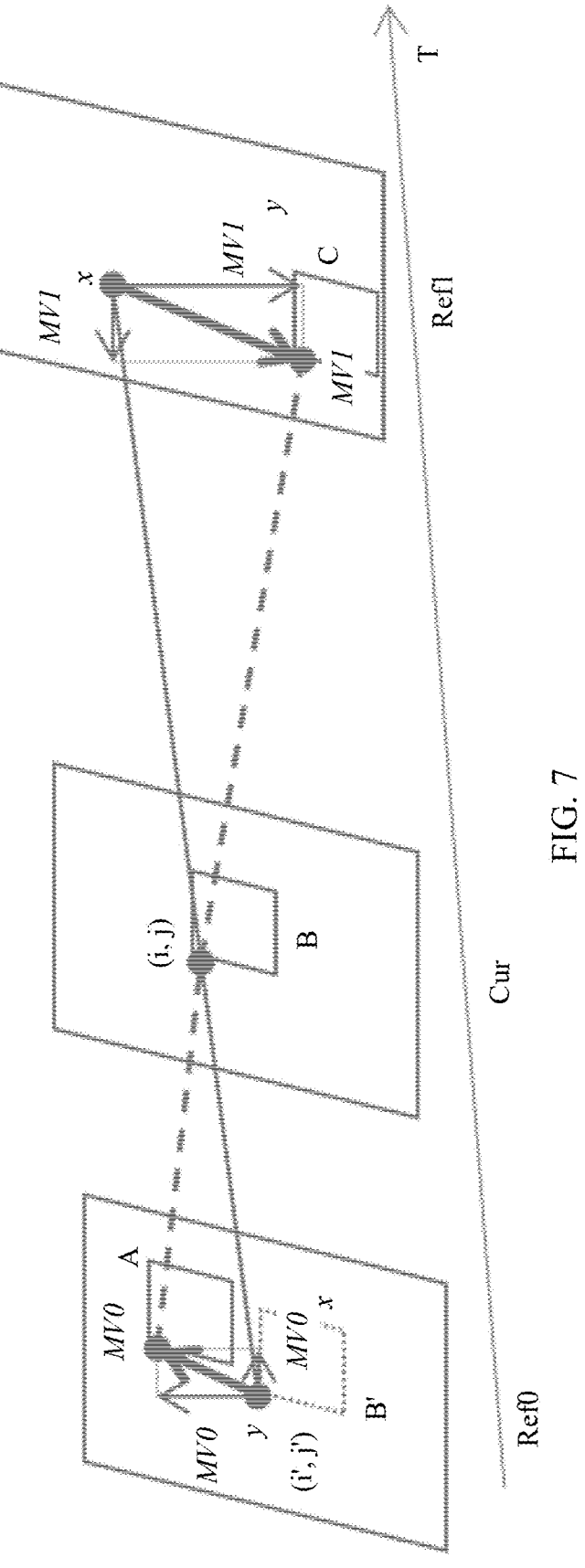
FIG. 7 is a schematic diagram in which motion information is used for inter prediction according to an embodiment of this application.

A video sequence includes a specific quantity of pictures, which are usually referred to as frames (Frame). Neighboring pictures are usually similar, that is, there are many redundancies. Motion compensation is performed to increase a compression ratio by eliminating a redundancy between neighboring frames. Motion compensation is a method for describing a difference between neighboring frames ("neighboring" herein indicates that two frames are neighboring in terms of an encoding relationship, but are not necessarily neighboring in terms of a playback sequence), and is a part of an inter prediction process. Before motion compensation is performed, motion information of a coding block has been obtained through motion estimation or bitstream decoding. The motion information mainly includes: (1) a prediction direction of the coding block, including forward prediction, backward prediction, and bidirectional prediction, where the forward prediction indicates that the coding block is predicted by using a previous encoded frame, the backward prediction indicates that the coding block is predicted by using a subsequent encoded frame, and the bidirectional prediction indicates that the coding block is predicted by using both forward and backward encoded frames; (2) a reference frame index of the coding block, which indicates a frame in which a reference block of the current coding block is located; and (3) a motion vector MV of the coding block, which indicates a motion displacement of the coding block relative to the reference block, where the MV includes a horizontal component (denoted as $MV_x$) and a vertical component (denoted as $MV_y$), which respectively indicate a motion displacement of the coding block relative to the reference block in a horizontal direction and a motion displacement of the coding block relative to the reference block in a vertical direction. When forward prediction or backward prediction is performed on the coding block, there is only one MV. When bidirectional prediction is performed on the coding block, there are two MVs. FIG. 7 shows descriptions of the foregoing motion information. In FIG. 7 and the following descriptions about motion information and prediction information, 0 indicates "forward", and 1 indicates "backward". For example, Ref0 represents a forward reference frame, Ref1 represents a backward reference frame, MV0 represents a forward motion vector, and MV1 represents a backward motion vector. A, B, and C respectively represent a forward reference block, a current coding block, and a backward reference block respectively. Cur indicates a current coding frame, and a dashed line indicates a motion track of B. Motion compensation is a process of finding a reference block based on motion information, and processing the reference block to obtain a prediction block of a coding block.

A basic motion compensation process of forward prediction is as follows: As shown in FIG. 7, a current coding block is a block B, and a width and a height of B are respectively W and H. In this case, it is learned, based on motion information, that a forward reference frame of the current coding block B is a Ref0 frame, and a forward motion vector of the current coding block B is $MV0=(MV0_x, MV0_y)$. When the coding block B in the Cur frame is encoded, a same coordinate point is first found in the Ref0 frame based on coordinates (i,j) of the top-left corner of B in the Cur frame, and a block B' in Ref0 may be obtained based on the width and the height of the block B. Then, the block B' is moved to a block A based on the MV0 of B'. Finally, interpolation processing is performed on the block A to obtain a prediction block of the current coding block B. A sample value of each sample in the prediction block of the current coding block B is referred to as a predictor of a corresponding sample in the block B. A motion compensation process of backward prediction is the same as that of forward prediction, and a difference only lies in a reference direction. It should be noted that the prediction blocks obtained through backward prediction motion compensation and forward prediction motion compensation are respectively referred to as a forward prediction block and a backward prediction block. When bidirectional prediction is not performed on the coding block, the obtained forward prediction block and the obtained backward prediction block are prediction blocks of the current coding block.

For bidirectional prediction, a forward prediction block and a backward prediction block are obtained respectively during forward prediction motion compensation and backward prediction motion compensation based on motion information, and then a prediction block of the coding block B is obtained through weighted prediction and bi-directional optical flow (Bi-directional optical flow, BIO or BDOF) on sample values at a same location in the forward prediction block and the backward prediction block.

In the weighted prediction method, when the predictor of the current coding block is calculated, only weighted summation needs to be sequentially performed on the sample value of the forward prediction block and the isotropic sample value of the backward prediction block, that is, $$PredB(i, j) = \omega_0 PredA(i, j) + \omega_1 PredC(i, j) \qquad (1)$$

In the formula (1), PredB(i,j), PredA(i,j), and PredC(i,j) are respectively predictors of the prediction block, the forward prediction block, and the backward prediction block of the current coding block at coordinates (i,j), and $\omega_0$ and $\omega_1$ ($0\leq\omega_0\leq1$, $0\leq\omega_1\leq1$, and $\omega_0+\omega_1=1$) are weighting coefficients, and values of $\omega_0$ and $\omega_1$ may vary with an encoder. Generally, $\omega_0$ and $\omega_1$ are both ½.

Figures 8, 9:
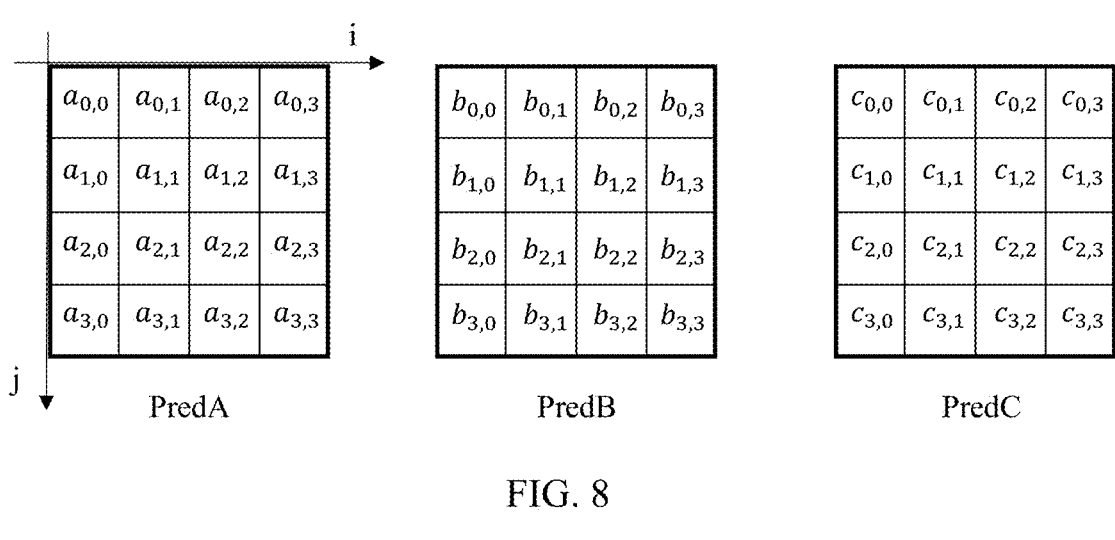
FIG. 8 is a schematic diagram of bi-directional weighted prediction according to an embodiment of this application.
FIG. 9 is a schematic diagram of CU boundary padding according to an embodiment of this application.

FIG. 8 shows an example of obtaining a prediction block of a current coding block through weighted summation. In FIG. 8, PredB, PredA, and PredC are respectively a prediction block, a forward prediction block, and a backward prediction block of a current coding block, and have a size of 4×4. A value of a small block in the prediction block is a predictor of a point, and a coordinate system is established for PredB, PredA, and PredC with a top-left corner as an origin. For example, a predictor of PredB at coordinates (0,0) is:

$$PredB(0, 0) = \omega_0 PredA(0, 0) + \omega_1 PredC(0, 0) = \omega_0 a_{0,0} + \omega_1 c_{0,0}$$

A predictor of PredB at coordinates (0,1) is:

$$PredB(0, 1) = \omega_0 PredA(0, 1) + \omega_1 PredC(0, 1) = \omega_0 a_{0,1} + \omega_1 c_{0,1}$$

Other points are sequentially calculated, and details are not described.

It can be learned that the bidirectional prediction weighted prediction technology is simple in calculation, but such block-based motion compensation method is very rough, which achieves a poor prediction effect especially for a picture with complex texture, and achieves low compression efficiency.

In BIO, bidirectional prediction motion compensation is performed on a current CU to obtain a forward prediction block and a backward prediction block, then a refined motion vector of each 4×4 subblock in the current CU is derived based on a forward predictor and a backward predictor, and finally, compensation is performed again on each sample in the current coding block, to finally obtain a prediction block of the current CU.

The refined motion vector $(v_x, v_y)$ of each 4×4 subblock is obtained by applying BIO to a 6×6 window $\Omega$ around the subblock to minimize predictors of L0 and L1. Specifically, $(v_x, v_y)$ is derived according to a formula.

$$v_x = S_1 > 0? \; clip3 \left(-th'_{BIO}, th'_{BIO}, -\left(\left(S_3 \cdot 2^3\right) \gg \lfloor \log_2 S_1 \rfloor\right)\right):0 \qquad (2)$$

$$v_y = S_5 > 0? \; clip3$$

-continued $$\left(-th'_{BIO}, th'_{BIO}, -\left(\left(S_6 \cdot 2^3 - \left((v_x S_{2,m}) \ll 12 + v_x S_{2,s}\right)/2\right) \gg \lfloor \log_2 S_5 \rfloor\right)\right):0$$

Herein, $\lfloor \bullet \rfloor$ is a floor function (floor(A) represents a maximum integer not greater than A); $th'_{BIO} = 2^{13-BD}$, and is a threshold for preventing mistransfer caused by an excessively large refined motion vector; $S_{2,m} = S_2 \gg 12$, and $S_{2,s} = S_2 \& (2^{12}-1)$; BD is a current sample bit width; the operation ? indicates that, if $S_1 > 0$, $v_x = \text{clip3}(-th'_{BIO}, -th'_{BIO}, -((S_3 \cdot 2^3) \gg \lfloor \log_2 S_5 \rfloor))$, and otherwise, $v_x = 0$; and & is a bit AND operation.

$S_1$, $S_2$, $S_3$, $S_5$, and $S_6$ are calculated according to the following formula:

$$S_1 = \sum_{(i,j)\in\Omega} \psi_x(i, j) \cdot \psi_x(i, j) \tag{3}$$

$$S_3 = \sum_{(i,j)\in\Omega} \theta(i, j) \cdot \psi_x(i, j)$$

$$S_2 = \sum_{(i,j)\in\Omega} \psi_x(i, j) \cdot \psi_y(i, j)$$

$$S_5 = \sum_{(i,j)\in\Omega} \psi_y(i, j) \cdot \psi_y(i, j)$$

$$S_6 = \sum_{(i,j)\in\Omega} \theta(i, j) \cdot \psi_y(i, j)$$

In the formula, $$\psi_x(i, j) = \left(\frac{\partial I^{(1)}}{\partial x}(i, j) + \frac{\partial I^{(0)}}{\partial x}(i, j)\right) \gg 3 \tag{4}$$

$$\psi_y(i, j) = \left(\frac{\partial I^{(1)}}{\partial y}(i, j) + \frac{\partial I^{(0)}}{\partial y}(i, j)\right) \gg 3$$

$$\theta(i, j) = \left(I^{(1)}(i, j) \gg 6\right) - \left(I^{(0)}(i, j) \gg 6\right)$$

Herein, $I^{(k)}(i,j)$ is a predictor of a sample location (i,j) in the current CU (k is equal to 0 or 1, 0 indicates "forward", and 1 indicates "backward", which is the same below), and $$\frac{\partial I^{(k)}}{\partial x}(i, j) \text{ and } \frac{\partial I^{(k)}}{\partial y}(i, j)$$

are respectively a horizontal gradient and a vertical gradient of a sample location (i,j), and are obtained according to the following formula:

$$\frac{\partial I^{(k)}}{\partial x}(i, j) = \left(I^{(k)}(i+1, j) - I^{(k)}(i-1, j)\right) \gg 4 \tag{5}$$

$$\frac{\partial I^{(k)}}{\partial y}(i, j) = \left(I^{(k)}(i, j+1) - I^{(k)}(i, j-1)\right) \gg 4$$

After the refined motion vector is obtained according to the formula (2), a final predictor of each sample in the current block is determined according to the following formula:

$$\begin{cases} b = rnd\left(\left(v_x\left(\frac{\partial I^{(1)}}{\partial x}(i, j) - \frac{\partial I^{(0)}}{\partial x}(i, j)\right)\right)/2\right) + \\ rnd\left(\left(v_y\left(\frac{\partial I^{(1)}}{\partial y}(i, j) - \frac{\partial I^{(0)}}{\partial y}(i, j)\right)\right)/2\right) \\ pred_{BIO}(i, j) = \left(I^{(0)}(i, j) + I^{(1)}(i, j) + b + o_{offset}\right) \gg shift \end{cases} \tag{6}$$

shift and $o_{offset}$ are 15−BD and $1 \ll (14-BD) + 2 \cdot (1 \ll 13)$, and rnd(.) is a rounding function (rounding off).

The refined motion vector of the 4×4 subblock needs to be calculated by using the forward and backward predictors $I^{(k)}(x, y)$ and the forward and backward horizontal and vertical gradients $$\frac{\partial I^{(k)}}{\partial x}(i, j) \text{ and } \frac{\partial I^{(k)}}{\partial y}(i, j)$$

of the 6×6 region in which the 4×4 subblock is located, and the gradient of the 6×6 region needs to be calculated by using a predictor of an 8×8 region. Therefore, when forward and backward predictors are obtained by using an interpolation filter, expansion needs to be performed around by two rows and two columns respectively to obtain a prediction sample block with a size of (W+4)*(H+4), so as to calculate a gradient of (W+2)*(H+2), where W is a width of the current CU, and H is a height of the current CU.

To reduce complexity of BIO, special processing is performed on a boundary of a CU in the prior art.

First, a predictor of a W*H region is obtained by using an 8-tap filter, and expansion is performed around by only one row and one column. A predictor of an expanded region is obtained by using a bilinear filter, so as to obtain a predicted sample value of a (W+2)*(H+2) region.

Then, a gradient of the W*H region may be calculated based on the predicted sample value of the (W+2)*(H+2) region and the formula (5).

Finally, according to a padding method, expansion is performed on the gradient of the W*H region around to obtain a gradient of the (W+2)*(H+2) region, and expansion is performed on the predictor of the W*H region around to obtain a predictor of the (W+2)*(H+2) region. Padding is shown in FIG. 9, that is, a sample value of an edge is assigned to an expanded region.

A specific implementation process of BIO is as follows:

Operation 1: Determine motion information of a current CU.

The motion information of the current CU may be determined by using a merge mode, an AMVP mode (refer to the descriptions in the background), or another mode. This is not limited herein.

It should be noted that another method for determining motion information may also be applied to this application. Details are not described herein.

Operation 2: Determine whether the current CU meets a use condition of BIO.

If bidirectional prediction is performed on the current CU, and a relationship between a forward reference frame number POC_L0, a backward reference frame number POC_L1, and a current frame number POC_Cur meets the following formula, the current CU meets the use condition of BIO:

$$(\text{POC\_L0} - \text{POC\_Cur}) * (\text{POC\_L1} - \text{POC\_Cur}) < 0$$

It should be noted that, whether BIO is used may also be determined by determining whether a size of the current CU is greater than a preset threshold. For example, BIO can be used only when a height H of the current CU is greater than or equal to 8 and a width W of the current CU is greater than or equal to 8.

It should be noted that another use condition of BIO may also be applied to this application. Details are not described herein.

If the current CU meets the use condition of BIO, operation 3 is performed, and otherwise, motion compensation is performed in another manner.

Operation 3: Calculate forward and backward predictors of the current CU.

Motion compensation is performed by using the motion information, to obtain forward and backward predictors $I^{(k)}(i,j)$, where i=−1 . . . cuW, and j=−1 . . . cuH (a prediction matrix of (cuW+2)*(cuH+2) is obtained).

In $I^{(k)}(i,j)$, i=0 . . . cuW−1, and j=0 . . . cuH−1, which are obtained by performing interpolation by using an 8-tap interpolation filter, and a predictor of another location (expansion by one row and one column is performed) is obtained by performing interpolation by using a bilinear interpolation filter.

It should be noted that the predictor of the expanded region may also be obtained by using another method, for example, by using an 8-tap interpolation filter, or by directly using a reference sample at an integer sample location. This is not limited herein.

It should be noted that a SAD between forward and backward predictors is calculated, to determine whether the SAD is less than a threshold TH_CU, and if the SAD is less than the threshold TH_CU, BIO is not performed, or otherwise, BIO is performed. Another determining method may also be applied to this application, and details are not described herein.

A formula for calculating the SAD is as follows:

$$SAD = \sum_{j=0..cuH-1} \sum_{i=0..cuW-1} \text{abs}\left(I^{(1)}(i,j) - I^{(0)}(i,j)\right) \quad (7)$$

The threshold TH_CU may be set to (1<<(BD−8+shift))*cuW*cuH, and shift may be set to Max(2, 14-BD).

Operation 4: Calculate horizontal and vertical gradients based on the forward and backward predictors of the current CU.

The horizontal and vertical gradients $$\frac{\partial I^{(k)}}{\partial x}(i,j) \text{ and } \frac{\partial I^{(k)}}{\partial y}(i,j)$$

(i,j) and (i,j are calculated based on the forward and backward predictors according to the formula (4), where i=0 . . . cuW−1, and j=0 . . . cuH−1 (a prediction matrix of cuW*cuH is obtained).

Operation 5: Perform padding on the forward and backward predictors of the current CU and the horizontal and vertical gradients.

Padding is performed by using the method in FIG. 9, to obtain $I^{(k)}(i,j)$, $$\frac{\partial I^{(k)}}{\partial x}(i,j), \text{ and } \frac{\partial I^{(k)}}{\partial y}(i,j),$$

where i=−1 . . . cuW, and j=−1 . . . cuH (the prediction matrix of (cuW+2)*(cuH+2), a horizontal gradient matrix, and a vertical gradient matrix are obtained).

Operation 6: Derive a refined motion vector of each 4×4 subblock, and then perform weighting.

For each 4×4 subblock, vx and vy are obtained according to the formula (2). Finally, weighting is performed according to the formula (6) to obtain a predictor of each 4×4 subblock.

It should be noted that a SAD between forward and backward predictors of each 4×4 subblock may be calculated to determine whether the SAD is less than a threshold TH_SCU. If the SAD is less than the threshold TH_SCU, weighted averaging is directly performed, or otherwise, vx and vy are obtained according to the formula (2), and then weighting is performed according to the formula (6). Another determining method may also be applied to this application, and details are not described herein. TU_SCU may be set to 1<<(BD−3+shift).

A virtual pipeline data unit (VPDUs, Virtual pipeline data units) is a non-overlapping M×M luma/N×N chroma processing unit. For a hardware decoder, consecutive VPDUs are processed simultaneously in different pipeline levels. Different VPDUs are processed simultaneously in different pipeline levels.

A VPDU split principle is as follows:
(1) If the VPDU includes one or more CUs, the CU is completely included in the VPDU.
(2) If the CU includes one or more VPDUs, the VPDU is completely included in the CU.

Figure 10:
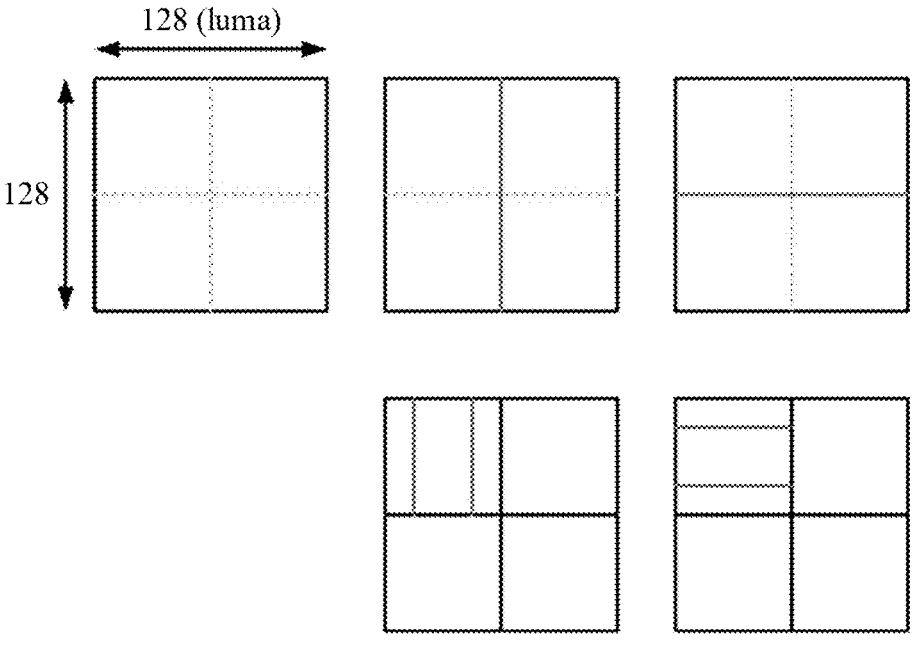
FIG. 10 is a schematic diagram of VPDU split according to an embodiment of this application.
Figure 11:
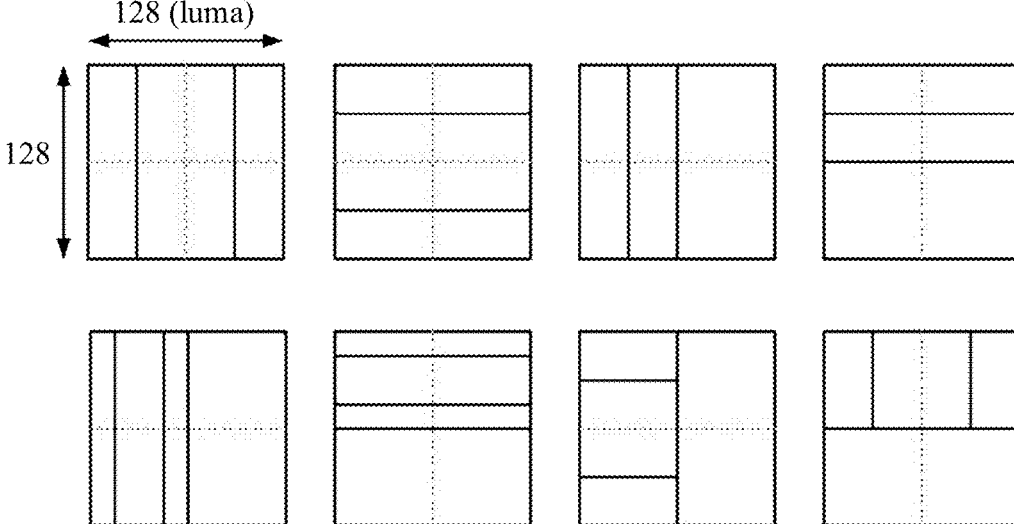
FIG. 11 is a schematic diagram of invalid VPDU split according to an embodiment of this application.

In the prior art, a size of a VPDU is 64×64. As shown in FIG. 10, a dashed line represents a boundary of a VPDU, and a solid line represents a boundary of a CU. FIG. 11 shows invalid CU split.

When the CU includes a plurality of VPDUs, the hardware decoder splits the VPDUs into consecutive VPDUs for processing. For example, if a size of the CU is 128×128 and a size of the VPDU is 64×64, four consecutive VPDUs are processed.

A technical problem to be resolved in this application is that when motion compensation is performed on a CU through BIO, a manner of processing a boundary sample of the CU is different from a manner of processing an internal sample of the CU. If there is a VPDU split boundary in the CU, during BIO prediction, to ensure that a result of VPDU processing is consistent with that of CU processing, the boundary needs to be processed in a manner of the internal sample of the CU, and consequently implementation complexity is increased.

Referring to FIG. 12, an embodiment of this application provides an inter prediction method. The method may be applied to the inter prediction unit 244 in the encoder shown in FIG. 2 or the inter prediction unit 344 in the decoder shown in FIG. 3. The method may be a bidirectional inter prediction method, and includes the following operations.

Operation 101: Select a smaller width in a preset picture split width Width and a width cuW of a to-be-processed picture block, where the smaller width is denoted as blkW and is used as a width of a first picture block, and select a smaller height in a preset picture split height Height and a height cuH of the to-be-processed picture block, where the smaller height is denoted as blkH, and is used as a height of the first picture block.

When the method in this embodiment is applied to an encoder, when encoding a picture, the encoder splits the picture into to-be-processed picture blocks. In this operation, the to-be-processed picture block is obtained, and then the smaller width blkW=min (Width, cuW) is selected and the smaller width blkW is used as the width of the first picture block, and the smaller height blkH=min (Height, cuH) is selected and the smaller height blkH is used as the height of the first picture block.

When the method in this embodiment is applied to a decoder, the decoder receives a video bitstream from an encoder, and the video bitstream includes a to-be-processed picture block. In this operation, the to-be-processed picture block is extracted from the video bitstream, and then the smaller width blkW=min (Width, cuW) is selected and the smaller width blkW is used as the width of the first picture block, and the smaller height blkH=min (Height, cuH) is selected and the smaller height blkH is used as the height of the first picture block.

The preset picture split width Width and the preset picture split height Height may be respectively equal to a width and a height of a VPDU. Alternatively, the preset picture split width Width is a value such as 64, 32, or 16, and the preset picture split height Height is a value such as 64, 32, or 16. For example, Width=64 and Height=64, or Width=32 and Height=32, or Width=16 and Height=16, or Width=64 and Height=32, or Width=32 and Height=64, or Width=64 and Height=16, or Width=16 and Height=64, or Width=32 and Height=16, or Width=16 and Height=32.

Operation 102: Determine a plurality of first picture blocks in the to-be-processed picture block based on the width blkW and the height blkH of the first picture block.

It should be understood that, in a feasible implementation, the width and the height of the to-be-processed picture block are respectively the same as the width and the height of the first picture block, that is, the to-be-processed picture block includes only one first picture block. Obtaining a predictor of the first picture block is obtaining a predictor of the to-be-processed picture block.

A predictor of any first picture block is obtained according to operations in the following operations 103 to 107.

Operation 103: Obtain a first prediction block of the first picture block based on motion information of the to-be-processed picture block, where a width of the first prediction block is greater than the width of the first picture block, and a height of the first prediction block is greater than the height of the first picture block.

The motion information of the to-be-processed picture block includes motion information of the first picture block, and the motion information of the first picture block includes information such as a reference picture and a motion vector. In this embodiment, an optical flow—based bidirectional prediction manner (that is, the foregoing BIO or BDOF related technology) is used for inter prediction. Therefore, the motion information of the first picture block includes information such as a forward reference picture, a backward reference picture, a forward motion vector, and a backward motion vector.

When the method in this embodiment is applied to an encoder, the encoder may determine motion information of a to-be-processed picture block in a merge mode, an AMVP mode, or another mode, and the motion information of the to-be-processed picture block includes motion information of each first picture block in the to-be-processed picture block. In this operation, the motion information of the to-be-processed picture block that is determined by the encoder is obtained, and the motion information of the first picture block is obtained from the motion information of the to-be-processed picture block.

When the method in this embodiment is applied to a decoder, a video bitstream received by the decoder from an encoder includes motion information of a to-be-processed picture block, and the motion information of the to-be-processed picture block includes motion information of each first picture block in the to-be-processed picture block. In this operation, the motion information of the to-be-processed picture block is extracted from the video bitstream, and the motion information of the first picture block is obtained from the motion information of the to-be-processed picture block.

The first prediction block of the first picture block includes a first forward prediction block and a first backward prediction block. In this operation, the first forward prediction block and the first backward prediction block of the first picture block may be obtained in the following operations (1) to (8). The operations (1) to (8) may be as follows:

(1): Determine a first forward region in a forward reference picture based on a first location of the first picture block in the to-be-processed picture block and the motion information of the first picture block, where a width of the first forward region is blkW+2, and a height of the first forward region is blkH+2.

Figure 13:
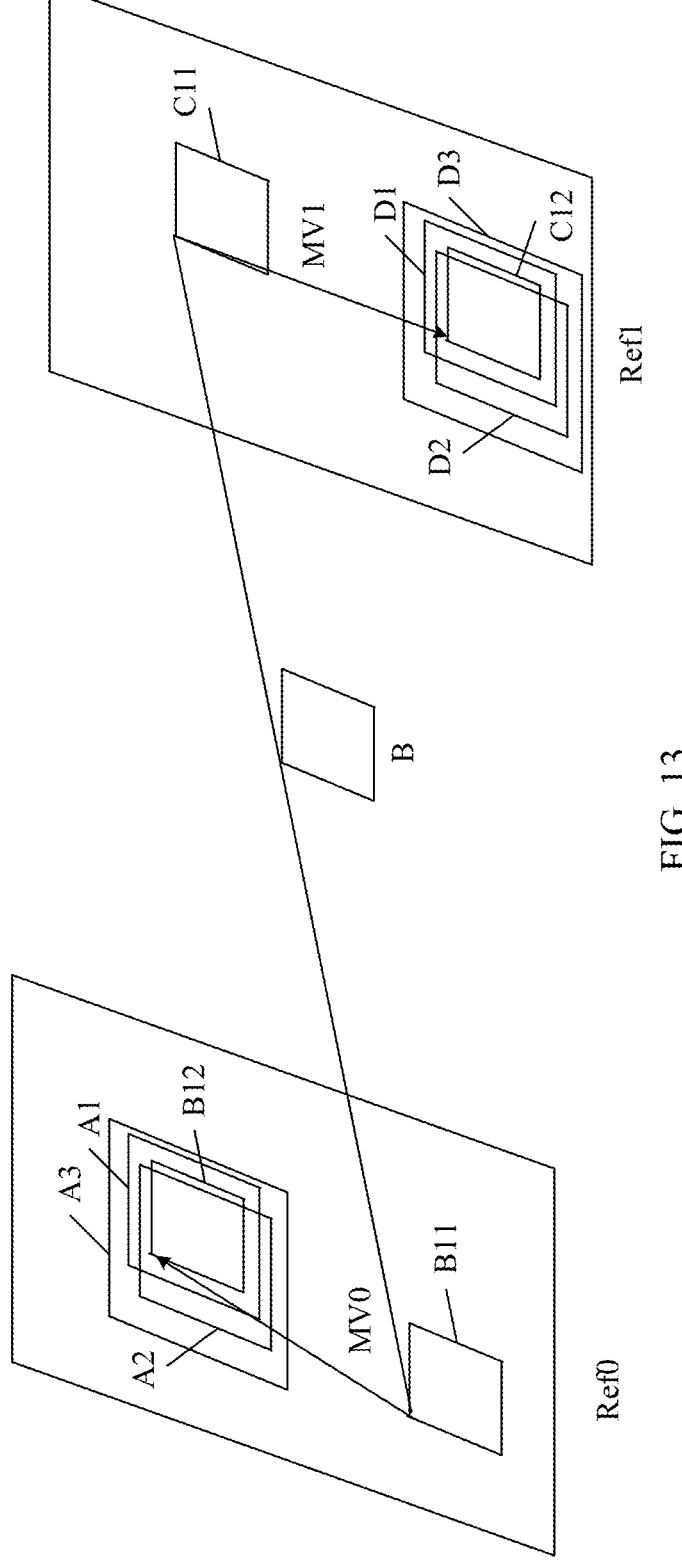
FIG. 13 is another schematic diagram in which motion information is used for inter prediction according to an embodiment of this application.

For example, referring to FIG. 13, motion information of a first picture block B includes a forward reference picture Ref0, a backward reference picture Ref1, a forward motion vector MV0, and a backward motion vector MV1. A second forward region B11 is determined in the forward reference picture Ref0 based on a first location of the first picture block B, where a width of the second forward region B11 is blkW, and a height of the second forward region B11 is blkH. A third forward region B12 is determined based on the forward motion vector MV0 and a location of the second forward region B11, where a width of the third forward region B12 is blkW, and a height of the third forward region B12 is blkH. A first forward region A1 including the third forward region B12 is determined, where a width of the first forward region A1 is blkW+2, a height of the first forward region A1 is blkH+2, and a center of the third forward region B12 coincides with a center of the first forward region A1.

(2): Determine whether a corner location of the first forward region coincides with a sample location in the forward reference picture in the forward reference picture; and if the corner location of the first forward region coincides with the sample location in the forward reference picture, obtain a picture block in the first forward region from the forward reference picture to serve as the first forward prediction block of the first picture block; or if the corner location of the first forward region does not coincide with the sample location in the forward reference picture, perform operation (3).

For example, referring to FIG. 13, a top-left corner of the first forward region A1 is used as an example. Assuming that a corner location of the top-left corner of the first forward region A1 is (15, 16) in the forward reference picture Ref0, the corner location of the top-left corner coincides with a sample location in the forward reference picture Ref0, and the sample location in the forward reference picture Ref0 is (15, 16). For another example, assuming that a corner location of the top-left corner of the first forward region A1 is (15.3, 16.2) in the forward reference picture Ref0, the corner location of the top-left corner coincides with no sample location in the forward reference picture Ref0, that is, there is no sample at a location (15.3, 16.2) in the forward reference picture Ref0.

(3): Determine a sample closest to the corner location of the first forward region in the forward reference picture, and determine a fourth forward region by using the sample as a corner, where a width of the fourth forward region is blkW+2, and a height of the fourth forward region is blkH+2.

For any corner location of the first forward region, it is assumed that a top-left corner location of the first forward region is used as an example. A sample closest to the top-left corner location is determined in the forward reference picture, and a fourth forward region is determined by using the sample as a top-left corner. A width of the fourth forward region is blkW+2, and a height of the fourth forward region is blkH+2.

For example, referring to FIG. 13, a corner location of a top-left corner of the first forward region A1 is (15.3, 16.2), and a location of a sample closest to the corner location (15.3, 16.2) is determined as (15, 16) in the forward reference picture Ref0. A fourth forward region A2 is determined by using the sample at the location (15, 16) as a top-left corner. A width of the fourth forward region A2 is blkW+2, and a height of the fourth forward region A2 is blkH+2.

(4): Determine a fifth forward region including the fourth forward region, where a center of the fourth forward region coincides with a center of the fifth forward region, a width of the fifth forward region is blkW+n+1, and a height of the fifth forward region is blkH+n+1; and obtain a picture block in the fifth forward region from the forward reference picture, and perform interpolation filtering on the picture block by using an interpolation filter, to obtain the first forward prediction block of the first picture block, where a width of the first forward prediction block is blkW+2, a height of the first forward prediction block is blkH+2, and n is a quantity of taps of the interpolation filter.

For example, an 8-tap interpolation filter is used as an example. Referring to FIG. 13, a fifth forward region A3 including the fourth forward region A2 is determined. A center of the fourth forward region A2 coincides with a center of the fifth forward region A3, a width of the fifth forward region A3 is blkW+9, and a height of the fifth forward region A3 is blkH+9. A picture block in the fifth forward region A3 is obtained from the forward reference picture Ref0, and interpolation filtering is performed on the picture block by using an interpolation filter, to obtain a first forward prediction block of the first picture block B. A width of the first forward prediction block is blkW+2, and a height of the first forward prediction block is blkH+2.

(5): Determine a first backward region in a backward reference picture based on the first location and the motion information of the first picture block, where a width of the first backward region is blkW+2, and a height of the first backward region is blkH+2.

For example, referring to FIG. 13, a second backward region C11 is determined in the backward reference picture Ref1 based on the first location of the first picture block B, where a width of the second backward region C11 is blkW, and a height of the second backward region C11 is blkH. A third backward region C12 is determined based on the backward motion vector MV1 and a location of the second backward region C11, where a width of the third backward region C12 is blkW, and a height of the third backward region C12 is blkH. A first backward region D1 including the third backward region C12 is determined, where a width of the first backward region D1 is blkW+2, a height of the first backward region D1 is blkH+2, and a center of the third backward region C12 may coincide with the center of the first backward region D1.

(6): Determine whether a corner location of the first backward region coincides with a sample location in the backward reference picture in the backward reference picture; and if the corner location of the first backward region coincides with the sample location in the backward reference picture, obtain a picture block in the first backward region from the backward reference picture to serve as the first backward prediction block of the first picture block; or if the corner location of the first backward region does not coincide with the sample location in the backward reference picture, perform operation (7).

For example, referring to FIG. 13, a top-left corner of the first backward region A1 is used as an example. Assuming that a corner location of the top-left corner of the first backward region D1 is (5, 6) in the backward reference picture Ref1, the corner location of the top-left corner coincides with a sample location in the backward reference picture Ref0, and the sample location in the backward reference picture Ref0 is (5, 6). For another example, assuming that a corner location of the top-left corner of the first backward region D1 is (5.3, 6.2) in the backward reference picture Ref0, the corner location of the top-left corner coincides with no sample location in the backward reference picture Ref0, that is, there is no sample at a location (5.3, 6.2) in the backward reference picture Ref0.

(7): Determine a sample closest to the corner location of the first backward region in the backward reference picture, and determine a fourth backward region by using the sample as a corner, where a width of the fourth backward region is blkW+2, and a height of the fourth backward region is blkH+2.

For any corner location of the first backward region, it is assumed that a top-left corner location of the first backward region is used as an example. A sample closest to the top-left corner location is determined in the backward reference picture, and a fourth backward region is determined by using the sample as a top-left corner. A width of the fourth backward region is blkW+2, and a height of the fourth backward region is blkH+2.

For example, referring to FIG. 13, a corner location of a top-left corner of the first backward region D1 is (5.3, 6.2), and a location of a sample closest to the corner location (5.3, 6.2) is determined as (5, 6) in the backward reference picture Ref1. A fourth backward region D2 is determined by using the sample at the location (5, 6) as a top-left corner. A width of the fourth backward region D2 is blkW+2, and a height of the fourth backward region D2 is blkH+2.

(8): Determine a fifth backward region including the fourth backward region, where a center of the fourth backward region coincides with a center of the fifth backward region, a width of the fifth backward region is blkW+n+1, and a height of the fifth backward region is blkH+n+1; and obtain a picture block in the fifth backward region from the backward reference picture, and perform interpolation filtering on the picture block by using an interpolation filter, to obtain the first backward prediction block of the first picture block, where a width of the first backward prediction block is blkW+2, and a height of the first backward prediction block is blkH+2.

For example, an 8-tap interpolation filter is used as an example. Referring to FIG. 13, a fifth backward region D3 including the fourth backward region D2 is determined. A center of the fourth backward region D2 coincides with a center of the fifth backward region D3, a width of the fifth backward region D3 is blkW+9, and a height of the fifth backward region D3 is blkH+9. A picture block in the fifth backward region D3 is obtained from the backward reference picture Ref1, and interpolation filtering is performed on the picture block by using an interpolation filter, to obtain a first backward prediction block of the first picture block B.

A width of the first backward prediction block is blkW+2, and a height of the first backward prediction block is blkH+2.

A quantity n of taps of the interpolation filter may be a value such as 6, 8, or 10.

When this operation is performed, it may be further determined, based on the motion information of the to-be-processed picture block, whether inter prediction is performed through BIO, and when it is determined that inter prediction is performed through BIO, this operation is performed. The determining process may be as follows:

It is determined whether a frame number of the to-be-processed picture block, a frame number of the forward reference picture, and a frame number of the backward reference picture meet a preset BIO use condition. If the preset BIO use condition is met, it is determined that inter prediction is performed through BIO, and this operation is performed. If the preset BIO use condition is not met, it is determined that inter prediction is performed in a manner other than BIO. An implementation process of the another manner is not described in detail herein.

The preset BIO use condition may be a condition shown in the following first formula.

The first formula is (POC_L0−POC_Cur)*(POC_L1−POC_Cur)<0.

In the first formula, POC_L0 is the frame number of the forward reference picture, POC_Cur is the frame number of the to-be-processed picture block, POC_L1 is the frame number of the backward reference picture, and * is a multiplication operation.

In this operation, it may be further determined, based on the first forward prediction block and the first backward prediction block of the first picture block, whether inter prediction is performed through BIO, and when it is determined that inter prediction is performed through BIO, operation 104 is performed. The determining process may be as follows:

A SAD is calculated based on the first forward prediction block and the first backward prediction block of the first picture block according to the following second formula. If the SAD exceeds a preset threshold TH_CU, it is determined that inter prediction is performed through BIO, and operation 104 is performed. If the SAD does not exceed the preset threshold TH_CU, it is determined that inter prediction is performed in a manner other than BIO. An implementation process of the another manner is not described in detail herein.

The second formula is $$SAD = \sum_{j=0,1...cuH-1} \sum_{i=0,1...cuW-1} abs\left(I^{(1)}(i, j) - I^{(0)}(i, j)\right).$$

In the second formula, $I^{(1)}(i,j)$ is a predictor of a sample in the $i^{th}$ row and the $j^{th}$ column of the first backward prediction block, and $I^{(0)}(i,j)$ is a predictor of a sample in the $i^{th}$ row and the $j^{th}$ column of the first forward prediction block.

TH_CU=(1<<(BD−8+shift))*blkW*blkH, shift=Max(2, 14−BD), where BD indicates a current sample bit width, abs( ) indicates an operation of obtaining an absolute value, and << indicates a left shifting operation.

Operation 104: Perform a gradient operation on the first prediction block of the first picture block to obtain a first gradient matrix of the first picture block, where a width of the first gradient matrix is blkW, and a height of the first gradient matrix is blkH.

The first gradient matrix includes a first forward horizontal gradient matrix, a first forward vertical gradient matrix, a first backward horizontal gradient matrix, and a first backward vertical gradient matrix.

In this operation, a horizontal gradient and a vertical gradient are calculated based on a predictor of each sample included in the first prediction block according to the following third formula: Each calculated horizontal gradient corresponds to one row number and one column number, and each calculated vertical gradient corresponds to one row number and one column number. A first horizontal gradient matrix of the first picture block is formed by the calculated horizontal gradients based on the row numbers and the column numbers corresponding to the calculated horizontal gradients, and a first vertical gradient matrix of the first picture block is formed by the calculated vertical gradients based on the row numbers and the column numbers corresponding to the calculated vertical gradients.

When a gradient of a row or a column in a gradient matrix is calculated, predictors of two samples are obtained from the first prediction block based on the row number and the column number, and a horizontal gradient or a vertical gradient is calculated based on the predictors of the two samples according to the following third formula. The horizontal gradient separately corresponds to the row number and the column number, or the vertical gradient separately corresponds to the row number and the column number.

The first prediction block includes the first forward prediction block and the first backward prediction block. A forward horizontal gradient and a forward vertical gradient are calculated based on the first forward prediction block according to the following third formula. Each calculated forward horizontal gradient corresponds to one row number and one column number, and each calculated forward vertical gradient corresponds to one row number and one column number. A first forward horizontal gradient matrix of the first picture block is formed by the calculated forward horizontal gradients based on the row numbers and the column numbers corresponding to the calculated forward horizontal gradients, and a first forward vertical gradient matrix of the first picture block is formed by the calculated forward vertical gradients based on the row numbers and the column numbers corresponding to the calculated forward vertical gradients.

A backward horizontal gradient and a backward vertical gradient are calculated based on the first backward prediction block according to the following third formula. Each calculated backward horizontal gradient corresponds to one row number and one column number, and each calculated backward vertical gradient corresponds to one row number and one column number. A first backward horizontal gradient matrix of the first picture block is formed by the calculated backward horizontal gradients based on the row numbers and the column numbers corresponding to the calculated backward horizontal gradients, and a first backward vertical gradient matrix of the first picture block is formed by the calculated backward vertical gradients based on the row numbers and the column numbers corresponding to the calculated backward vertical gradients.

The third formula is $$
\begin{cases}
\dfrac{\partial I^{(k)}}{\partial x}(i, j) = \left(I^{(k)}(i+1, j) - I^{(k)}(i-1, j)\right) \gg 4 \\[2mm]
\dfrac{\partial I^{(k)}}{\partial y}(i, j) = \left(I^{(k)}(i, j+1) - I^{(k)}(i, j-1)\right) \gg 4
\end{cases}.
$$

In the third formula, a value of k may be 0 or 1, where 0 indicates "forward", and 1 indicates "backward";

$$
\frac{\partial I^{(k)}}{\partial x}(i, j)
$$

is a horizontal gradient of the $i^{th}$ row and the $j^{th}$ column, where when k=0, $$
\frac{\partial I^{(k)}}{\partial x}(i, j)
$$

is a forward horizontal gradient of the $i^{th}$ row and the $j^{th}$ column, and when k=1, $$
\frac{\partial I^{(k)}}{\partial x}(i, j)
$$

is a backward horizontal gradient of the $i^{th}$ row and the $j^{th}$ column; and $\gg$ is a right shifting operation.

$I^{(k)}(i+1, j)$ is a predictor of a sample in the $(i+1)^{th}$ row and the $j^{th}$ column of the first prediction block, where when k=0, $I^{(k)}(i+1, j)$ is a predictor of a sample in the $(i+1)^{th}$ row and the $j^{th}$ column of the first forward prediction block, and when k=1, $I^{(k)}(i+1, j)$ is a predictor of a sample in the $(i+1)^{th}$ row and the $j^{th}$ column of the first backward prediction block; and $I^{(k)}(i-1, j)$ is a predictor of a sample in the $(i-1)^{th}$ row and the $j^{th}$ column of the first prediction block, where when k=0, $I^{(k)}(i-1, j)$ is a predictor of a sample in the $(i-1)^{th}$ row and the $j^{th}$ column of the first forward prediction block, and when k=1, $I^{(k)}(i-1, j)$ is a predictor of a sample in the $(i-1)^{th}$ row and the $j^{th}$ column of the first backward prediction block.

$I^{(k)}(i, j+1)$ is a predictor of a sample in the $i^{th}$ row and the $(j+1)^{th}$ column of the first prediction block, where when k=0, $I^{(k)}(i, j+1)$ is a predictor of a sample in the $i^{th}$ row and the $(j+1)^{th}$ column of the first forward prediction block, and when k=1, $I^{(k)}(i, j+1)$ is a predictor of a sample in the $i^{th}$ row and the $(j+1)^{th}$ column in the first backward prediction block; and $I^{(k)}(i, j-1)$ is a predictor of a sample in the $i^{th}$ row and the $(j-1)^{th}$ column of the first prediction block, where when k=0, $I^{(k)}(i, j-1)$ is a predictor of a sample in the $i^{th}$ row and the $(j-1)^{th}$ column of the first forward prediction block, and when k=1, $I^{(k)}(i, j-1)$ is a predictor value of a sample in the $i^{th}$ row and the $(j-1)^{th}$ column in the first backward prediction block.

It should be noted that, for a first prediction block with a width of blkW+2 and a height of blkH+2, a first gradient matrix with a width of blkW and a height of blkH may be obtained based on the first prediction block according to the foregoing third formula. The first gradient matrix includes a first horizontal gradient matrix with a width of blkW and a height of blkH and a first vertical gradient matrix with a width of blkW and a height of blkH. That is, for a first forward prediction block with a width of blkW+2 and a height of blkH+2, a first forward horizontal gradient matrix with a width of blkW and a height of blkH and a first forward vertical gradient matrix with a width of blkW and a height of blkH may be obtained based on the first forward prediction block according to the foregoing third formula. For a first backward prediction block with a width of blkW+2 and a height of blkH+2, a first backward horizontal gradient matrix with a width of blkW and a height of blkH and a first backward vertical gradient matrix with a width of blkW and a height of blkH may be obtained based on the first backward prediction block according to the foregoing third formula.

Operation 105: Perform first expansion on the width and the height of the first gradient matrix based on a gradient at a matrix edge location of the first gradient matrix, so that a width and a height of a first gradient matrix obtained after the first expansion are respectively two samples greater than the width and the height of the first picture block.

The width and the height of the first gradient matrix obtained after the first expansion are respectively equal to the width and the height of the first prediction block. The width of the first prediction block is blkW+2, and the height of the first prediction block is blkH+2. The width of the first gradient matrix is also blkW+2, and the height of the first gradient matrix is also blkH+2.

In this operation, first expansion is separately performed on a width and a height of the first forward horizontal gradient matrix, a width and a height of the first forward vertical gradient matrix, a width and a height of the first backward horizontal gradient matrix, and a width and a height of the first backward vertical gradient matrix, so that widths of a first forward horizontal gradient matrix, a first forward vertical gradient matrix, a first backward horizontal gradient matrix, and a first backward vertical gradient matrix obtained after the first expansion are all blkW+2, and heights of the first forward horizontal gradient matrix, the first forward vertical gradient matrix, the first backward horizontal gradient matrix, and the first backward vertical gradient matrix obtained after the first expansion are all blkH+2.

In this operation, the first gradient matrix includes four edges. For gradients at the left matrix edge of the first gradient matrix, one column of gradients is obtained by performing expansion on the left of the first gradient matrix based on the gradients at the left matrix edge. For gradients at the right matrix edge of the first gradient matrix, one column of gradients is obtained by performing expansion on the right of the first gradient matrix based on the gradients at the right matrix edge location. For gradients at the top matrix edge of the first gradient matrix, one row of gradients is obtained by performing expansion on the top of the first gradient matrix based on the gradients at the top matrix edge. For gradients at the bottom matrix edge of the first gradient matrix, one row of gradients is obtained by performing expansion on the bottom of the first gradient matrix based on the gradients at the bottom matrix edge. Therefore, the width and the height of the first gradient matrix obtained after the first expansion are respectively two samples greater than the width and the height of the first picture block.

Operation 106: Calculate a motion information refinement value of each basic processing unit in the first picture block based on the first prediction block and the first gradient matrix.

A width of the basic processing unit may be M, and a height of the basic processing unit may also be M, that is, the basic processing unit is a picture block including M*M samples. A value of M may be a value such as 2, 3, or 4.

The motion information refinement value of the basic processing unit includes a horizontal motion information refinement value and a vertical motion information refinement value.

This operation may be implemented by 1061 to 1064, and 1061 to 1064 may be as follows:

Operation 1061: Split the first picture block to obtain each basic processing unit included in the first picture block, where each basic processing unit is a picture block with a size of M*M.

Operation 1062: Determine a basic prediction block of any basic processing unit in the first prediction block based on a location of the basic processing unit, where a width of the basic prediction block is M+2, and a height of the basic prediction block is M+2.

Assuming that the basic processing unit covers the $1^{st}$ to the $M^{th}$ rows and the $1^{st}$ to the $M^{th}$ columns of the first picture block, a picture block covering the $0^{th}$ to the $(M+1)^{th}$ rows and the $0^{th}$ to the $(M+1)^{th}$ columns of the first prediction block is used as the basic prediction block of the basic processing unit.

The basic prediction block of the basic processing unit includes a forward basic prediction block and a backward basic prediction block. To be specific, a picture block covering the $0^{th}$ to the $(M+1)^{th}$ rows and the $0^{th}$ to the $(M+1)^{th}$ columns in the first forward prediction block is used as the forward prediction block of the basic processing unit, and a picture block covering the $0^{th}$ to the $(M+1)^{th}$ rows and the $0^{th}$ to the $(M+1)^{th}$ columns in the first backward prediction block is used as the backward basic prediction block of the basic processing unit.

Operation 1063: Determine a basic gradient matrix of the basic processing unit in the first gradient matrix based on the location of the basic processing unit, where a width of the basic gradient matrix is M+2, and a height of the basic gradient matrix is M+2.

Assuming that the basic processing unit covers the $1^{st}$ to the $M^{th}$ rows and the $1^{st}$ to the $M^{th}$ columns of the first picture block, a matrix covering the $0^{th}$ to the $(M+1)^{th}$ rows and the $0^{th}$ to the $(M+1)^{th}$ columns in the first gradient matrix is used as the basic gradient matrix of the basic processing unit.

The basic gradient matrix of the basic processing unit includes a forward horizontal basic gradient matrix, a forward vertical basic gradient matrix, a backward horizontal basic gradient matrix, and a backward vertical basic gradient matrix. To be specific, a matrix covering the $0^{th}$ to the $(M+1)^{th}$ rows and the $0^{th}$ to the $(M+1)^{th}$ columns in the first forward horizontal gradient matrix is used as the forward horizontal basic gradient matrix of the basic processing unit, a matrix covering the 0th to the $(M+1)^{th}$ rows and the $0^{th}$ to the $(M+1)^{th}$ columns in the first forward vertical gradient matrix is used as a forward vertical basic gradient matrix of the basic processing unit, a matrix covering the $0^{th}$ to the $(M+1)^{th}$ rows and the $0^{th}$ to the $(M+1)^{th}$ columns in the first backward horizontal gradient matrix is used as a backward horizontal basic gradient matrix of the basic processing unit, and a matrix covering the $0^{th}$ to the $(M+1)^{th}$ rows and the $0^{th}$ to the $(M+1)^{th}$ columns in the first backward vertical gradient matrix is used as a backward vertical basic gradient matrix of the basic processing unit.

Operation 1064. Calculate a motion information refinement value of the basic processing unit based on the basic prediction block and the basic gradient matrix of the basic processing unit.

In operation 1064, a horizontal motion information refinement value and a vertical motion information refinement value of the basic processing unit are calculated according to the following fourth formula and fifth formula based on the forward basic prediction block, the backward basic prediction block, the forward horizontal basic gradient matrix, the forward vertical basic gradient matrix, the backward horizontal basic gradient matrix, and the backward vertical basic gradient matrix of the basic processing unit.

The fourth formula is $$
\begin{cases}
\psi_x(i,j) = \left(\dfrac{\partial I^{(1)}}{\partial x}(i,j) + \dfrac{\partial I^{(0)}}{\partial x}(i,j)\right) \gg 3 \\[2mm]
\psi_y(i,j) = \left(\dfrac{\partial I^{(1)}}{\partial y}(i,j) + \dfrac{\partial I^{(0)}}{\partial y}(i,j)\right) \gg 3 \\[2mm]
\theta(i,j) = \left(I^{(1)}(i,j) \gg 6\right) - \left(I^{(0)}(i,j) \gg 6\right) \\[2mm]
S_1 = \sum_{(i,j)\in\Omega} \psi_x(i,j) \cdot \psi_x(i,j) \\[2mm]
S_3 = \sum_{(i,j)\in\Omega} \theta(i,j) \cdot \psi_x(i,j) \\[2mm]
S_2 = \sum_{(i,j)\in\Omega} \psi_x(i,j) \cdot \psi_y(i,j) \\[2mm]
S_5 = \sum_{(i,j)\in\Omega} \psi_y(i,j) \cdot \psi_y(i,j) \\[2mm]
S_6 = \sum_{(i,j)\in\Omega} \theta(i,j) \cdot \psi_y(i,j)
\end{cases}
$$

The fifth formula is $$
\begin{cases}
v_x = S_1 > 0\,?\,clip3\left(-th'_{BIO}, th'_{BIO}, -\left((S_3 \cdot 2^3) \gg \lfloor \log_2 S_5 \rfloor\right)\right):0 \\[2mm]
v_y = S_5 > 0\,?\,clip3\left(-th'_{BIO}, th'_{BIO}, -\left((S_6 \cdot 2^3) -\right.\right. \\
\qquad \left.\left.((v_x S_{2,m}) \ll 12 + v_x S_{2,S})/2 \gg \lfloor \log_2 S_5 \rfloor\right)\right):0
\end{cases}
$$

In the foregoing fourth formula, $(i,j)\in\Omega$ indicates that i=0, 1, . . . , and M+1, and j=0, 1, . . . , and M+1. In the foregoing fifth formula, $v_x$ is the horizontal motion information refinement value of the basic processing unit; $v_y$ is the vertical motion information refinement value of the basic processing unit; $th_{BIO}'=2^{13-BD}$; $\lfloor \bullet \rfloor$ is a floor function (floor(A) represents a maximum BIO integer not greater than A); and $S_{2,m}=S_{2,m}=S_2\gg 12$, and $S_{2,s}=S_2\&(2^{12}-1)$.

Motion information refinement value of each basic processing unit included in the first picture block may be obtained by repeatedly performing operations 1062 to 1064.

Operation 107: Obtain a predictor of the first picture block based on the motion information refinement value of each basic processing unit included in the first picture block.

The predictor of the first picture block includes a predictor of each sample in each basic processing unit in the first picture block.

A predictor of each sample included in any basic processing unit included in the first picture block is calculated according to the following sixth formula based on a forward basic prediction block, a backward basic prediction block, a forward horizontal basic gradient matrix, a forward vertical basic gradient matrix, a backward horizontal basic gradient matrix, and a backward vertical basic gradient matrix of the basic processing unit.

49 50

The sixth formula is:

$$
\begin{cases}
b = rnd \left( (v_X \left[ \dfrac{\partial I^{(1)}}{\partial x}(i,\,j) - \dfrac{\partial I^{(0)}}{\partial x}(i,\,j) \right) )/2 \right) + \\[2ex]
rnd \left( (v_y \left[ \dfrac{\partial I^{(1)}}{\partial y}(i,\,j) - \dfrac{\partial I^{(1)}}{\partial y}(i,\,j) \right) )/2 \right) \\[2ex]
pred_{BIO}(i,\,j) = \left( I^{(0)}(i,\,j) + I^{(1)}(i,\,j) + b + o_{offset} \right) \gg shift
\end{cases}
$$

In the sixth formula, $pred_{BIO}(i,j)$ is a predictor of a sample in the $i^{th}$ row and the $j^{th}$ column in the basic processing unit, shift=15−BD, $0_{offset}$=1<<(14−BD)+2·(1<<13), and rnd( ) is rounding off.

A predictor of each first picture block in the to-be-processed picture block is obtained by repeatedly performing operations 103 to 107.

Operation 108: obtain a predictor of the to-be-processed picture block with a combination of the predictors of the plurality of first picture blocks included in the to-be-processed picture block.

The inter prediction method shown in FIG. 12 may be summarized as operations 1 to 6, and operations 1 to 6 may be as follows:

Operation 1: Determine motion information of a current CU.

The motion information of the current CU may be determined by using a merge mode, an AMVP mode (refer to the descriptions in the background), or another mode. This is not limited herein.

It should be noted that another method for determining motion information may also be applied to this application. Details are not described herein.

Operation 2: Determine whether the current CU meets a use condition of BIO.

If bidirectional prediction is performed on the current CU, and a relationship between a forward reference frame number POC_L0, a backward reference frame number POC_L1, and a current frame number POC_Cur meets the following formula, the current CU meets the use condition of BIO:

$$(POC\_L0 - POC\_Cur) * (POC\_L1 - POC\_Cur) < 0$$

It should be noted that, whether BIO is used may also be determined by determining whether a size of the current CU is greater than a preset threshold. For example, BIO can be used only when a height H of the current CU is greater than or equal to 8 and a width W of the current CU is greater than or equal to 8.

It should be noted that another use condition of BIO may also be applied to this application. Details are not described herein.

If the current CU meets the use condition of BIO, operation 3 is performed, or otherwise, motion compensation is performed in another manner.

A VPDU size is obtained: VPDU_X and VPDU_Y, and parameters blkW and blkH are set.

blkW=Min(cuW,VPDU_X)

blkH=Min(cuH,VPDU_Y)

The Min function indicates that a minimum value is selected.

For example, if the CU size is 128×128 and the VPDU size is 64×64, blkW is 64 and blkH is 64.

For example, if the CU size is 128×128 and the VPDU size is 128×32, blkW is 128 and blkH is 32.

For example, if the CU size is 128×128 and the VPDU size is 32×128, blkW is 32 and blkH is 128.

In one embodiment, if a size of a maximum inter prediction processing unit is less than the VPDU size, blkW and blkH may be set according to the following formulas:

blkW=Min(cuW,MAX_MC_X)

blkH=Min(cuH,MAX_MC_Y)

For example, if the CU size is 128×128 and the size of the maximum inter prediction processing unit is 32×32, blkW is 32 and blkH is 32.

Each CU is split based on blkW and blkH to execute BIO.

Operation 3: Calculate forward and backward predictors of the current CU.

Motion compensation is performed by using the motion information, to obtain forward and backward predictors $I^{(k)}(i,j)$, where i=−1 . . . blkW, and j=−1 . . . blkH (a prediction matrix of (blkW+2)*(blkH+2) is obtained).

In $I^{(k)}(i,j)$, i=0 . . . blkW−1, and j=0 . . . blkH, which are obtained by performing interpolation by using an 8-tap interpolation filter, and a predictor of another location (expansion by one row and one column is performed) is obtained by performing interpolation by using a bilinear interpolation filter.

It should be understood that the predictor may be obtained by using the VPDU as a minimum predictor obtaining unit, or the predictor may be obtained by using a block smaller than the VPDU as a minimum predictor obtaining unit. This is not limited.

It should be noted that the predictor of the expanded region may also be obtained by using another method, for example, by using an 8-tap interpolation filter, or by directly using a reference sample at an integer sample location. This is not limited herein.

It should be noted that a SAD between forward and backward predictors is calculated, to determine whether the SAD is less than a threshold TH_CU, and if the SAD is less than the threshold TH_CU, BIO is not performed, or otherwise, BIO is performed. Another determining method may also be applied to this application, and details are not described herein.

A formula for calculating the SAD is as follows:

$$ SAD = \sum_{j=0..blkW-1} \sum_{i=0..blkH-1} abs\left( I^{(1)}(i,\,j) - I^{(0)}(i,\,j) \right) \qquad (8) $$

The threshold TH_CU may be set to (1<<(BD−8+shift)) *blkW*blkH, and shift may be set to Max(2, 14-BD).

Operation 4: Calculate horizontal and vertical gradients based on the forward and backward predictors of the current CU.

The horizontal and vertical gradients $$ \frac{\partial I^{(k)}}{\partial x}(i,\,j) \text{ and } \frac{\partial I^{(k)}}{\partial y}(i,\,j) $$

are calculated based on the forward and backward predictors according to the formula (4), where i=0 . . . blkW−1, and j=0 . . . blkH−1 (a gradient matrix of blkW*blkH is obtained).

Operation 5: Perform padding on the forward and backward predictors of the current CU and the horizontal and vertical gradients.

Padding is performed by using the method shown in FIG. 9, to obtain $I^{(k)}(i,j)$, $$\frac{\partial I^{(k)}}{\partial x}(i,\ j),\ \text{and}\ \frac{\partial I^{(k)}}{\partial y}(i,\ j),$$

where i=−1 . . . blkW, and j=−1 . . . blkH (the prediction matrix of (blkW+2)*(blkH+2), a horizontal gradient matrix, and a vertical gradient matrix are obtained).

Operation 6: Derive a refined motion vector of each 4×4 subblock, and then perform weighting.

For each 4×4 sub-block, vx and vy are obtained according to the formula (2). Finally, weighting is performed according to the formula (6) to obtain a predictor of each 4×4 subblock.

It should be noted that a SAD between forward and the backward predictors of each 4×4 subblock may be calculated to determine whether the SAD is less than the threshold TH_SCU. If the SAD is less than the threshold TH_SCU, weighted averaging is directly performed, or otherwise, vx and vy are obtained according to the formula (2), and then weighting is performed according to the formula (6). Another determining method may also be applied to this application, and details are not described herein. TU_SCU may be set to 1<<(BD−3+shift).

In this embodiment of this application, a smaller width is selected in the preset picture split width Width and the width cuW of the to-be-processed picture block and is denoted as blkW, a smaller height is selected in the preset picture split height Height and the height cuH of the to-be-processed picture block and is denoted as blkH, and the first picture block included in the to-be-processed picture block is determined based on blkW and blkH. Therefore, an area of each determined first picture block is not very large, so that fewer hardware resources such as memory space resources are consumed when inter prediction processing is performed on each first picture block, thereby reducing implementation complexity, and improving inter prediction processing efficiency.

Referring to FIG. 14, an embodiment of this application provides an inter prediction method. The method may be applied to the inter prediction unit 244 in the encoder shown in FIG. 2 or the inter prediction unit 344 in the decoder shown in FIG. 3. The method may be a bidirectional inter prediction method, and includes the following operations.

Operations S201 and S202 are the same as operations 101 and 102 respectively, and details are not described herein again.

Operation S203: Obtain a first prediction block of the first picture block based on motion information of the to-be-processed picture block, where a width of the first prediction block is equal to the width of the first picture block, and a height of the first prediction block is equal to the height of the first picture block.

The motion information of the first picture block includes information such as a reference picture and a motion vector. In this embodiment, an optical flow-based bidirectional prediction manner is used for inter prediction. Therefore, the motion information of the first picture block includes information such as a forward reference picture, a backward reference picture, a forward motion vector, and a backward motion vector.

When the method in this embodiment is applied to an encoder, the encoder may determine motion information of a to-be-processed picture block in a merge mode, an AMVP mode, or another mode, and the motion information of the to-be-processed picture block includes motion information of each first picture block in the to-be-processed picture block. In this operation, the motion information of the to-be-processed picture block that is determined by the encoder is obtained, and the motion information of the first picture block is obtained from the motion information of the to-be-processed picture block.

When the method in this embodiment is applied to a decoder, a video bitstream received by the decoder from an encoder includes motion information of a to-be-processed picture block, and the motion information of the to-be-processed picture block includes motion information of each first picture block in the to-be-processed picture block. In this operation, the motion information of the to-be-processed picture block is extracted from the video bitstream, and the motion information of the first picture block is obtained from the motion information of the to-be-processed picture block.

The first prediction block of the first picture block includes a first forward prediction block and a first backward prediction block. In this operation, the first forward prediction block and the first backward prediction block of the first picture block may be obtained in the following operations (1) to (8). The operations (1) to (8) may be as follows:

(1): Determine a first forward region in a forward reference picture based on a first location of the first picture block and the motion information of the first picture block, where a width of the first forward region is blkW, and a height of the first forward region is blkH.

Figure 15:
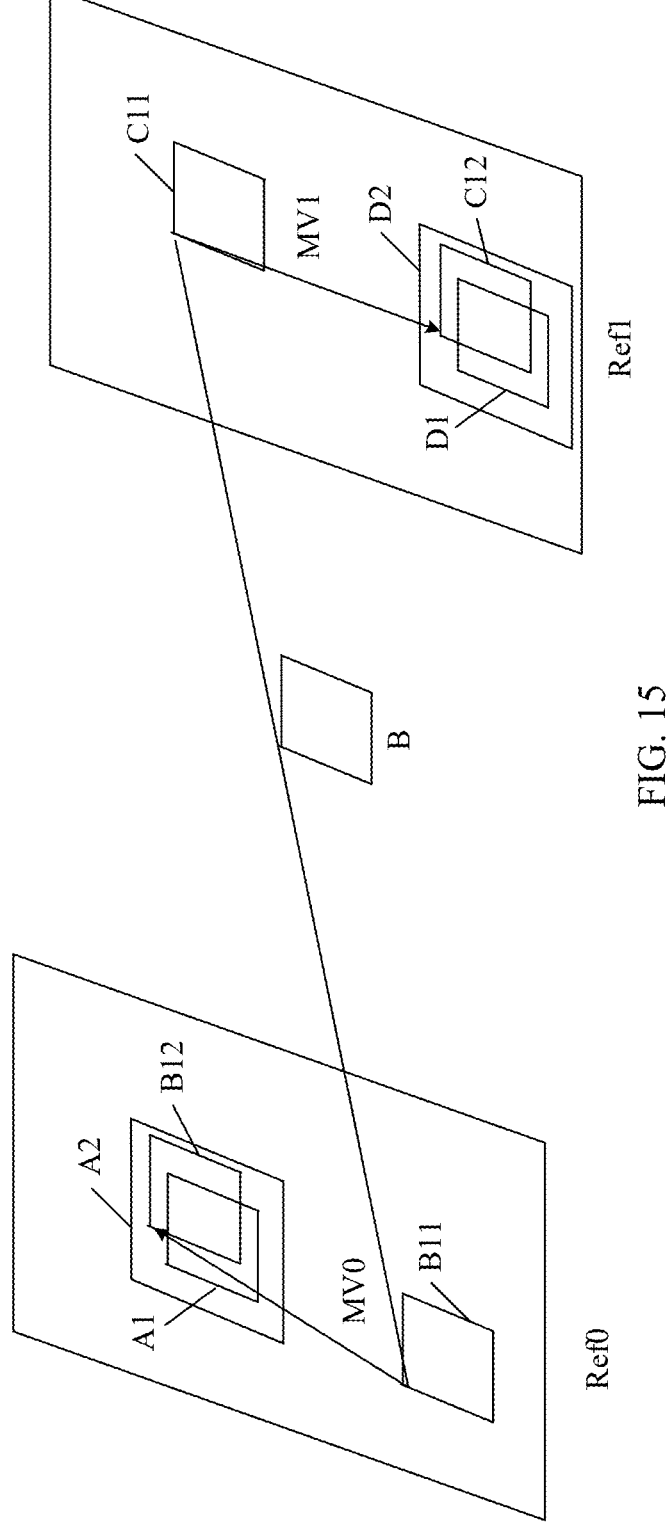
FIG. 15 is another schematic diagram in which motion information is used for inter prediction according to an embodiment of this application.

For example, referring to FIG. 15, motion information of a first picture block B includes a forward reference picture Ref0, a backward reference picture Ref1, a forward motion vector MV0, and a backward motion vector MV1. A second forward region B11 is determined in the forward reference picture Ref0 based on a first location of the first picture block B, where a width of the second forward region B11 is blkW, and a height of the second forward region B11 is blkH. A first forward region B12 is determined based on the forward motion vector MV0 and a location of the second forward region B11, where a width of the first forward region B12 is blkW, and a height of the first forward region B12 is blkH.

(2): Determine whether a corner location of the first forward region coincides with a sample location in the forward reference picture in the forward reference picture; and if the corner location of the first forward region coincides with the sample location in the forward reference picture, obtain a picture block in the first forward region from the forward reference picture to serve as the first forward prediction block of the first picture block; or if the corner location of the first forward region does not coincide with the sample location in the forward reference picture, perform operation (3).

For example, referring to FIG. 15, a top-left corner of the first forward region B12 is used as an example. Assuming that a corner location of the top-left corner of the first forward region B12 is (15, 16) in the forward reference picture Ref0, the corner location of the top-left corner coincides with a sample location in the forward reference picture Ref0, and the sample location in the forward reference picture Ref0 is (15, 16). For another example, assuming that a corner location of the top-left corner of the first forward region B12 is (15.3, 16.2) in the forward reference picture Ref0, the corner location of the top-left corner coincides with no sample location in the forward reference picture Ref0, that is, there is no sample at a location (15.3, 16.2) in the forward reference picture Ref0.

(3): Determine a sample closest to the corner location of the first forward region in the forward reference picture, and determine a third forward region by using the sample as a corner, where a width of the third forward region is blkW, and a height of the third forward region is blkH.

For any corner location of the first forward region, it is assumed that a top-left corner location of the first forward region is used as an example. A sample closest to the top-left corner location is determined in the forward reference picture, and a third forward region is determined by using the sample as a top-left corner. A width of the third forward region is blkW, and a height of the third forward region is blkH.

For example, referring to FIG. 15, a corner location of a top-left corner of the first forward region B12 is (15.3, 16.2), and a location of a sample closest to the corner location (15.3, 16.2) is determined as (15, 16) in the forward reference picture Ref0. A third forward region A1 is determined by using the sample at the location (15, 16) as a top-left corner. A width of the third forward region A1 is blkW, and a height of the third forward region A1 is blkH.

(4): Determine a fourth forward region including the third forward region, where a center of the third forward region coincides with a center of the fourth forward region, a width of the fourth forward region is blkW+n−1, and a height of the fourth forward region is blkH+n−1; and obtain a picture block in the fourth forward region from the forward reference picture, and perform interpolation filtering on the picture block by using an interpolation filter, to obtain the first forward prediction block of the first picture block, where a width of the first forward prediction block is blkW, a height of the first forward prediction block is blkH, and n is a quantity of taps of the interpolation filter.

For example, an 8-tap interpolation filter is used as an example. Referring to FIG. 15, a fourth forward region A2 including the third forward region A1 is determined. A center of the third forward region A1 coincides with a center of the fourth forward region A2, and a width of the fourth forward region A2 is blkW+7, and a height of the fourth forward region A2 is blkH+7. A picture block in the fourth forward region A2 is obtained from the forward reference picture Ref0, and interpolation filtering is performed on the picture block by using an interpolation filter, to obtain a first forward prediction block of the first picture block B. A width of the first forward prediction block is blkW, and a height of the first forward prediction block is blkH.

(5): Determine a first backward region in a backward reference picture based on the first location and the motion information of the first picture block, where a width of the first backward region is blkW, and a height of the first backward region is blkH.

For example, referring to FIG. 15, a second backward region C11 is determined in the backward reference picture Ref1 based on the first location of the first picture block B, where a width of the second backward region C11 is blkW, and a height of the second backward region C11 is blkH. A first backward region C12 is determined based on the backward motion vector MV1 and a location of the second backward region C12, where a width of the first backward region C12 is blkW, and a height of the first backward region C12 is blkH.

(6): Determine whether a corner location of the first backward region coincides with a sample location in the backward reference picture in the backward reference picture; and if the corner location of the first backward region coincides with the sample location in the backward reference picture, obtain a picture block in the first backward region from the backward reference picture to serve as the first backward prediction block of the first picture block; or if the corner location of the first backward region does not coincide with the sample location in the backward reference picture, perform operation (7).

For example, referring to FIG. 15, a top-left corner of the first backward region C12 is used as an example. Assuming that a corner location of the top-left corner of the first backward region C12 is (5, 6) in the backward reference picture Ref1, the corner location of the top-left corner coincides with a sample location in the backward reference picture Ref1, and the sample location in the backward reference picture Ref1 is (5, 6). For another example, assuming that a corner location of the top-left corner of the first backward region C12 is (5.3, 6.2) in the backward reference picture Ref1, the corner location of the top-left corner coincides with no sample location in the backward reference picture Ref0, that is, there is no sample at a location (5.3, 6.2) in the backward reference picture Ref0.

(7): Determine a sample closest to the corner location of the first backward region in the backward reference picture, and determine a third backward region by using the sample as a corner, where a width of the third backward region is blkW, and a height of the third backward region is blkH.

For any corner location of the first backward region, it is assumed that a top-left corner location of the first backward region is used as an example. A sample closest to the top-left corner location is determined in the backward reference picture, and a third backward region is determined by using the sample as a top-left corner. A width of the third backward region is blkW, and a height of the third backward region is blkH.

For example, referring to FIG. 15, a corner location of a top-left corner of the first backward region C12 is (5.3, 6.2), and a location of a sample closest to the corner location (5.3, 6.2) is determined as (5, 6) in the backward reference picture Ref1. A third backward region D1 is determined by using the sample at the location (5, 6) as a top-left corner. A width of the third backward region D1 is blkW, and a height of the third backward region D1 is blkH.

(8): Determine a fourth backward region including the third backward region, where a center of the third backward region coincides with a center of the fourth backward region, a width of the fourth backward region is blkW+n−1, and a height of the fourth backward region is blkH+n−1; and obtain a picture block in the fourth backward region from the backward reference picture, and perform interpolation filtering on the picture block by using an interpolation filter, to obtain the first backward prediction block of the first picture block, where a width of the first backward prediction block is blkW, and a height of the first backward prediction block is blkH.

For example, an 8-tap interpolation filter is used as an example. Referring to FIG. 15, a fourth backward region D2 including the third backward region D1 is determined. A center of the third backward region D1 coincides with a center of the fourth backward region D2, a width of the fourth backward region D2 is blkW+7, and a height of the fourth backward region D2 is blkH+7. A picture block in the fourth backward region D2 is obtained from the backward reference picture Ref1, and interpolation filtering is performed on the picture block by using an interpolation filter, to obtain a first backward prediction block of the first picture block B. A width of the first backward prediction block is blkW, and a height of the first backward prediction block is blkH.

When this operation is performed, it may be further determined, based on the motion information of the to-be-processed picture block, whether inter prediction is performed through BIO, and when it is determined that inter prediction is performed through BIO, this operation is performed. For the determining process, refer to related content in operation 103 in the embodiment shown in FIG. 12. Details are not described herein again.

In this operation, it may be further determined, based on the first forward prediction block and the first backward prediction block of the first picture block, whether inter prediction is performed through BIO, and when it is determined that inter prediction is performed through BIO, operation S204 is performed. For the determining process, refer to related content in operation 103 in the embodiment shown in FIG. 12. Details are not described herein again.

Operation S204: Perform a gradient operation on the first prediction block of the first picture block to obtain a first gradient matrix of the first picture block, where a width of the first gradient matrix is blkW−2, and a height of the first gradient matrix is blkH−2.

The first gradient matrix includes a first forward horizontal gradient matrix, a first forward vertical gradient matrix, a first backward horizontal gradient matrix, and a first backward vertical gradient matrix.

A width of the first forward horizontal gradient matrix, a width of the first forward vertical gradient matrix, a width of the first backward horizontal gradient matrix, and a width of the first backward vertical gradient matrix all may be blkW−2, and a height of the first forward horizontal gradient matrix, a height of the first forward vertical gradient matrix, a height of the first backward horizontal gradient matrix, and a height of the first backward vertical gradient matrix all may be blkH−2.

In this operation, for a detailed implementation process of performing the gradient operation on the first prediction block of the first picture block, refer to related content in operation 104 in the embodiment shown in FIG. 12. Details are not described herein again.

Operation S205: Perform first expansion on the width and the height of the first gradient matrix based on a gradient at a matrix edge location of the first gradient matrix, so that a width and a height of a first gradient matrix obtained after the first expansion are respectively two samples greater than the width and the height of the first picture block.

The width and the height of the first gradient matrix obtained after the first expansion are respectively equal to the width blkW+2 and the height blkH+2 of the first prediction block.

In this operation, first expansion is separately performed on a width and a height of the first forward horizontal gradient matrix, a width and a height of the first forward vertical gradient matrix, a width and a height of the first backward horizontal gradient matrix, and a width and a height of the first backward vertical gradient matrix, so that widths of a first expanded forward horizontal gradient matrix, a first forward vertical gradient matrix, a first backward horizontal gradient matrix, and a first backward vertical gradient matrix obtained after the first expansion are all blkW+2, and heights of the first forward horizontal gradient matrix, the first forward vertical gradient matrix, the first backward horizontal gradient matrix, and the first backward vertical gradient matrix obtained after the first expansion are all blkH+2.

For a manner of performing first expansion on the first gradient matrix, refer to related content in operation S205 in the embodiment shown in FIG. 12. Details are not described herein again.

Operation S206: Replicate a sample value at a block edge location of the first prediction block, to perform second expansion on the width and the height of the first prediction block, where a width and a height of a first prediction block obtained after the second expansion are blkW+2 and blkH+2.

In this operation, a sample value at the block edge location of the first forward prediction block is replicated, and a sample value at a block edge location of the first backward prediction block is replicated, to perform second expansion on the width and the height of the first forward prediction block, and perform second expansion on the width and the height of the first backward prediction block. That is, in this operation, a width and a height of a first forward prediction block obtained after the second expansion are respectively blkW+2 and blkH+2, and a width and a height of a first backward prediction block obtained after the second expansion are respectively blkW+2 and blkH+2.

In this operation, interpolation filtering may be further performed on sample values of a block edge region of the first prediction block, to perform second expansion on the width and the height of the first prediction block.

In one embodiment, in operation 203, it is assumed that a picture block with a width of blkW and a height of blkH in the reference picture is directly used as the first prediction block of the first picture block, that is, referring to FIG. 15, a picture block in the first forward region B12 is used as the first forward prediction block in the forward reference diagram Ref0, and a picture block in the first backward region C12 is used as the first backward prediction block in the backward reference diagram Ref1. In this case, the first prediction block is a picture block in the reference picture. In this case, a circle of samples surrounding the first prediction block and closest to the first prediction block are selected from the reference picture, and the selected circle of samples and the first prediction block form a first prediction block with a width of blkW+2 and a height of blkH+2 obtained after the second expansion.

In one embodiment, in operation 203, the first prediction block of the first picture block is obtained by using an interpolation filter. In this case, the first prediction block is not a picture block in the reference picture. For a sample on any edge of the first prediction block (for ease of description, the edge is referred to as a first edge), a second location of each sample included in a second edge is obtained based on a first location of each sample on the first edge in the reference picture. The second edge is located outside the first prediction block, and a distance between the second edge and the first edge is one sample. The second edge includes blkW+2 samples or blkH+2 samples. For each sample on the second edge, a second location of the sample in the reference picture is located between two neighboring samples or between four neighboring samples, and interpolation filtering is performed on the two neighboring samples or the four neighboring samples by using an interpolation filter, to obtain the sample. A second edge corresponding to each edge of the first prediction block is obtained in the foregoing manner, and each obtained second edge and the first prediction block form a first prediction block with a width of blkW+2 and a height of blkH+2 obtained after the second expansion.

Operation S206 may alternatively be performed before operation S204. In this way, when the first prediction block obtained after the second expansion is obtained, a gradient operation may be performed on the first prediction block obtained after the second expansion, to obtain the first gradient matrix of the first picture block. Because the width of the first prediction block obtained after the second expansion is blkW+2, and the height of the first prediction block obtained after the second expansion is blkH+2, a width of the obtained first gradient matrix is blkW, and a height of the obtained first gradient matrix is blkH. Then, first expansion is performed on the width and the height of the first gradient matrix based on a gradient at a matrix edge location of the first gradient matrix, so that a width and a height of the first gradient matrix obtained after the first expansion are respectively two samples greater than the width and the height of the first picture block.

Operations S207 to S209 are the same as operations 106 to 108 respectively, and details are not described herein again.

The inter prediction method shown in FIG. 16A and FIG. 16B may be summarized as operations 1 to 6, and operations 1 to 6 may be as follows:

Operation 1: Determine motion information of a current CU.

The motion information of the current CU may be determined by using a merge mode, an AMVP mode (refer to the descriptions in the background), or another mode. This is not limited herein.

It should be noted that another method for determining motion information may also be applied to this application. Details are not described herein.

Operation 2: Determine whether the current CU meets a use condition of BIO.

If bidirectional prediction is performed on the current CU, and a relationship between a forward reference frame number POC_L0, a backward reference frame number POC_L1, and a current frame number POC_Cur meets the following formula, the current CU meets the use condition of BIO:

$$(POC\_L0 - POC\_Cur) * (POC\_L1 - POC\_Cur) < 0$$

It should be noted that, whether BIO is used may also be determined by determining whether a size of the current CU is greater than a preset threshold. For example, BIO can be used only when a height H of the current CU is greater than or equal to 8 and a width W of the current CU is greater than or equal to 8.

It should be noted that another use condition of BIO may also be applied to this application. Details are not described herein.

If the current CU meets the use conditions of BIO, operation 3 is performed, or otherwise, motion compensation is performed in another manner.

A VPDU size is obtained: VPDU_X, and VPDU_Y, and parameters blkW and blkH are set.

$$blkW=Min(cuW,VPDU\_X)$$

$$blkH=Min(cuH,VPDU\_Y)$$

For example, if the CU size is 128×128 and the VPDU size is 64×64, blkW is 64 and blkH is 64.

For example, if the CU size is 128×128 and the VPDU size is 128×32, blkW is 128 and blkH is 32.

For example, if the CU size is 128×128 and the VPDU size is 32×128, blkW is 32 and blkH is 128.

In one embodiment, if a size of a maximum inter prediction processing unit is less than the VPDU size, blkW and blkH may be set according to the following formulas:

$$blkW=Min(cuW,MAX\_MC\_X)$$

$$blkH=Min(cuH,MAX\_MC\_Y)$$

For example, if the CU size is 128×128 and the size of the maximum inter prediction processing unit is 32×32, blkW is 32 and blkH is 32.

Each CU is split based on blkW and blkH to execute BIO.

Operation 3: Calculate forward and backward predictors of the current CU.

Motion compensation is performed by using the motion information, to obtain forward and backward predictors $I^{(k)}(i,j)$, where i=0 . . . blkW−1, and j=0 . . . blkH−1 (a prediction matrix of blkW*blkH is obtained).

It should be understood that the predictor may be obtained by using the VPDU as a minimum predictor obtaining unit, or the predictor may be obtained by using a block smaller than the VPDU as a minimum predictor obtaining unit. This is not limited.

Operation 4: Calculate horizontal and vertical gradients based on the forward and backward predictors of the current CU.

The horizontal and vertical gradients $$\frac{\partial I^{(k)}}{\partial x}(i, j) \text{ and } \frac{\partial I^{(k)}}{\partial y}(i, j)$$

are calculated based on the forward and backward predictors according to the formula (4), where i=1 . . . blkW−2, and j=1 . . . blkH−2 (a gradient matrix of (blkW−2)*(blkH−2) is obtained).

Operation 5: Perform padding on the forward and backward predictors of the current CU and the horizontal and vertical gradients.

Padding is performed by using the method shown in FIG. 9, to obtain $I^{(k)}(i,j)$ $$\frac{\partial I^{(k)}}{\partial x}(i, j), \text{ and } \frac{\partial I^{(k)}}{\partial y}(i, j),$$

where i=−1 . . . blkW, and j=−1 . . . blkH (padding is performed on the matrix of (blkW−2)*(blkH−2) around by two rows and two columns, to obtain a prediction matrix of (blkW+2)*(blkH+2), a horizontal gradient matrix, and a vertical gradient matrix).

Operation 6: Derive a refined motion vector of each 4×4 subblock, and then perform weighting.

For each 4×4 subblock, vx and vy are obtained according to the formula (2). Finally, weighting is performed according to the formula (6) to obtain a predictor of each 4×4 subblock.

In this embodiment of this application, a smaller width is selected in the preset picture split width Width and the width cuW of the to-be-processed picture block and is denoted as blkW, a smaller height is selected in the preset picture split height Height and the height cuH of the to-be-processed picture block and is denoted as blkH, and the first picture block included in the to-be-processed picture block is determined based on blkW and blkH. Therefore, an area of each determined first picture block is not very large, so that less memory space is consumed when inter prediction processing is performed on each first picture block. In addition, the first prediction block of the first picture block is obtained based on the motion information of the first picture block. The width of the first prediction block is equal to the width of the first picture block, and the height of the first prediction block is equal to the height of the first picture block. Therefore, the first prediction block may be relatively small, so that fewer hardware resources such as CPU resources and memory resources are consumed for obtaining the first prediction block, thereby reducing implementation complexity, and improving processing efficiency.

Referring to FIG. 16A and FIG. 16B, an embodiment of this application provides an inter prediction method. The method may be applied to the inter prediction unit 244 in the encoder shown in FIG. 2 or the inter prediction unit 344 in the decoder shown in FIG. 3. The method may be a bidirectional inter prediction method, and includes the following operations.

Operation S301: Compare a width cuW of a first picture block with a preset picture split width Width, and compare a height cuH of the first picture block with a preset picture split height Height; and when cuW is greater than or equal to Width and/or when cuH is greater than or equal to Height, perform operation S302, or when cuW is less than Width and cuH is less than Height, perform operation S305.

When the method in this embodiment is applied to an encoder, when encoding a picture, the encoder splits the picture into first picture blocks. Before this operation, the first picture block is obtained from the encoder.

When the method in this embodiment is applied to a decoder, the decoder receives a video bitstream from an encoder, and the video bitstream includes a first picture block. Before this operation, the first picture block is extracted from the video bitstream.

When this operation is performed, it may be further determined, based on motion information of the first picture block, whether inter prediction is performed through BIO, and when it is determined that inter prediction is performed through BIO, this operation is performed. For a detailed implementation process, refer to related content in operation 103 in the embodiment shown in FIG. 12. Details are not described herein again.

Operation S302: Obtain a second prediction block of the first picture block based on the motion information of the first picture block, where a width of the second prediction block is cuW+4, and a height of the second prediction block is cuH+4.

The motion information of the first picture block includes information such as a reference picture and a motion vector. In this embodiment, an optical flow-based bidirectional prediction manner is used for inter prediction. Therefore, the motion information of the first picture block includes information such as a forward reference picture, a backward reference picture, a forward motion vector, and a backward motion vector.

When the method in this embodiment is applied to an encoder, the encoder may determine motion information of a first picture block in a merge mode, an AMVP mode, or another mode. In this operation, the motion information of the first picture block that is determined by the encoder is obtained.

When the method in this embodiment is applied to a decoder, a video bitstream received by the decoder from an encoder includes motion information of a first picture block. In this operation, the motion information of the first picture block is extracted from the video bitstream.

The second prediction block of the first picture block includes a second forward prediction block and a second backward prediction block. In this operation, the second forward prediction block and the second backward prediction block of the first picture block may be obtained in the following operations (1) to (8). The operations (1) to (8) may be as follows:

(1): Determine a first forward region in a forward reference picture based on a first location of the first picture block in the to-be-processed picture block and the motion information of the first picture block, where a width of the first forward region is blkW+4, and a height of the first forward region is blkH+4.

For example, referring to FIG. 13, motion information of s first picture block B includes a forward reference picture Ref0, a backward reference picture Ref1, a forward motion vector MV0, and a backward motion vector MV1. A second forward region B11 is determined in the forward reference picture Ref0 based on a first location of the first picture block B, where a width of the second forward region B11 is blkW, and a height of the second forward region B11 is blkH. A third forward region B12 is determined based on the forward motion vector MV0 and a location of the second forward region B11, where a width of the third forward region B12 is blkW, and a height of the third forward region B12 is blkH. A first forward region A1 including the third forward region B12 is determined, where a width of the first forward region A1 is blkW+4, a height of the first forward region A1 is blkH+4, and a center of the third forward region B12 coincides with a center of the first forward region A1.

(2): Determine whether a corner location of the first forward region coincides with a sample location in the forward reference picture in the forward reference picture; and if the corner location of the first forward region coincides with the sample location in the forward reference picture, obtain a picture block in the first forward region from the forward reference picture to serve as the second forward prediction block of the first picture block; or if the corner location of the first forward region does not coincide with the sample location in the forward reference picture, perform operation (3).

For example, referring to FIG. 13, a top-left corner of the first forward region A1 is used as an example. Assuming that a corner location of the top-left corner of the first forward region A1 is (15, 16) in the forward reference picture Ref0, the corner location of the top-left corner coincides with a sample location in the forward reference picture Ref0, and the sample location in the forward reference picture Ref0 is (15, 16). For another example, assuming that a corner location of the top-left corner of the first forward region A1 is (15.3, 16.2) in the forward reference picture Ref0, the corner location of the top-left corner coincides with no sample location in the forward reference picture Ref0, that is, there is no sample at a location (15.3, 16.2) in the forward reference picture Ref0.

(3): Determine a sample closest to the corner location of the first forward region in the forward reference picture, and determine a fourth forward region by using the sample as a corner, where a width of the fourth forward region is blkW+4, and a height of the fourth forward region is blkH+4.

For any corner location of the first forward region, it is assumed that a top-left corner location of the first forward region is used as an example. A sample closest to the top-left corner location is determined in the forward reference picture, and a fourth forward region is determined by using the sample as a top-left corner. A width of the fourth forward region is blkW+4, and a height of the fourth forward region is blkH+4.

For example, referring to FIG. 13, a corner location of a top-left corner of the first forward region A1 is (15.3, 16.2), and a location of a sample closest to the corner location (15.3, 16.2) is determined as (15, 16) in the forward reference picture Ref0. A fourth forward region A2 is determined by using the sample at the location (15, 16) as a top-left corner. A width of the fourth forward region A2 is blkW+4, and a height of the fourth forward region A2 is blkH+4.

(4): Determine a fifth forward region including the fourth forward region, where a center of the fourth forward region coincides with a center of the fifth forward region, a width of the fifth forward region is blkW+n+3, and a height of the fifth forward region is blkH+n+3; and obtain a picture block in the fifth forward region from the forward reference picture, and perform interpolation filtering on the picture block by using an interpolation filter, to obtain the second forward prediction block of the first picture block, where a width of the second forward prediction block is blkW+4, a height of the second forward prediction block is blkH+4, and n is a quantity of taps of the interpolation filter.

For example, an 8-tap interpolation filter is used as an example. Referring to FIG. 13, a fifth forward region A3 including the fourth forward region A2 is determined. A center of the fourth forward region A2 coincides with a center of the fifth forward region A3, and a width of the fifth forward region A3 is blkW+11, and a height of the fifth forward region A3 is blkH+11. A picture block in the fifth forward region A3 is obtained from the forward reference picture Ref0, and interpolation filtering is performed on the picture block by using an interpolation filter, to obtain a second forward prediction block of the first picture block B. A width of the second forward prediction block is blkW+4, and a height of the second forward prediction block is blkH+4.

(5): Determine a first backward region in a backward reference picture based on the first location and the motion information of the first picture block, where a width of the first backward region is blkW+4, and a height of the first backward region is blkH+4.

For example, referring to FIG. 13, a second backward region C11 is determined in the backward reference picture Ref1 based on the first location of the first picture block B, where a width of the second backward region C11 is blkW, and a height of the second backward region C11 is blkH. A third backward region C12 is determined based on the backward motion vector MV1 and a location of the second backward region C11, where a width of the third backward region C12 is blkW, and a height of the third backward region C12 is blkH. A first backward region D1 including the third backward region C12 is determined, where a width of the first backward region D1 is blkW+4, a height of the first backward region D1 is blkH+4, and a center of the third backward region C12 may coincide with a center of the first backward region D1.

(6): Determine whether a corner location of the first backward region coincides with a sample location in the backward reference picture in the backward reference picture; and if the corner location of the first backward region coincides with the sample location in the backward reference picture, obtain a picture block in the first region from the backward backward reference picture to serve as the second backward prediction block of the first picture block; or if the corner location of the first backward region does not coincide with the sample location in the backward reference picture, perform operation (7).

For example, referring to FIG. 13, a top-left corner of the first backward region A1 is used as an example. Assuming that a corner location of the top-left corner of the first backward region A1 is (5, 6) in the backward reference picture Ref0, the corner location of the top-left corner coincides with a sample location in the backward reference picture Ref0, and the sample location in the backward reference picture Ref0 (5, 6). For another example, assuming that a corner location of the top-left corner of the first backward region D1 is (5.3, 6.2) in the backward reference picture Ref0, the corner location of the top-left corner coincides with no sample location in the backward reference picture Ref0, that is, there is no sample at a location (5.3, 6.2) in the backward reference picture Ref0.

(7): Determine a sample closest to the corner location of the first backward region in the backward reference picture, and determine a fourth backward region by using the sample as a corner, where a width of the fourth backward region is blkW+4, and a height of the fourth backward region is blkH+4.

For any corner location of the first backward region, it is assumed that a top-left corner location of the first backward region is used as an example. A sample closest to the top-left corner location is determined in the backward reference picture, and a fourth backward region is determined by using the sample as a top-left corner. A width of the fourth backward region is blkW+4, and a height of the fourth backward region is blkH+4.

For example, referring to FIG. 13, a corner location of a top-left corner of the first backward region D1 is (5.3, 6.2), and a location of a sample closest to the corner location (5.3, 6.2) is determined as (5, 6) in the backward reference picture Ref1. A fourth backward region D2 is determined by using the sample at the location (5, 6) as a top-left corner. A width of the fourth backward region D2 is blkW+4, and a height of the fourth backward region D2 is blkH+4.

(8): Determine a fifth backward region including the fourth backward region, where a center of the fourth backward region coincides with a center of the fifth backward region, a width of the fifth backward region is blkW+n+3, and a height of the fifth backward region is blkH+n+3; and obtain a picture block in the fifth backward region from the backward reference picture, and perform interpolation filtering on the picture block by using an interpolation filter, to obtain the second backward prediction block of the first picture block, where a width of the second backward prediction block is blkW+4, and a height of the second backward prediction block is blkH+4.

For example, an 8-tap interpolation filter is used as an example. Referring to FIG. 13, a fifth backward region D3 including the fourth backward region D2 is determined. A center of the fourth backward region D2 coincides with a center of the fifth backward region D3, a width of the fifth backward region D3 is blkW+11, and a height of the fifth backward region D3 is blkH+11. A picture block in the fifth backward region D3 is obtained from the backward reference picture Ref1, and interpolation filtering is performed on the picture block by using an interpolation filter, to obtain a second backward prediction block of the first picture block B. A width of the second backward prediction block is blkW+4, a height of the second backward prediction block is blkH+4, and n is a quantity of taps of the interpolation filter.

Operation S303: Perform a gradient operation on the second prediction block of the first picture block to obtain a first gradient matrix of the first picture block, where a width of the first gradient matrix is cuW+2, and a height of the first gradient matrix is cuH+2.

The first gradient matrix includes a first forward horizontal gradient matrix, a first forward vertical gradient matrix, a first backward horizontal gradient matrix, and a first backward vertical gradient matrix.

In this operation, for a detailed implementation process of performing the gradient operation on the second prediction block of the first picture block to obtain the first gradient matrix, refer to the detailed process of obtaining the first gradient matrix in operation 104 in the embodiment shown in FIG. 12. Details are not described herein again.

The first prediction block includes a second forward prediction block and a second backward prediction block. A second forward horizontal gradient matrix with a width of cuW+2 and a height of cuH+2 and a second forward vertical gradient matrix with a width of cuW+2 and a height of cuH+2 may be obtained based on the second forward prediction block. A second backward horizontal gradient matrix with a width of cuW+2 and a height of cuH+2 and a second backward vertical gradient matrix with a width of cuW+2 and a height of cuH+2 may be obtained based on the second backward prediction block.

Operation S304: Determine a first prediction block of the first picture block in the second prediction block, where a width of the first prediction block is cuW+2, and a height of the first prediction block is cuH+2;

A center of the first prediction block coincides with a center of the second prediction block.

The first prediction block includes a first forward prediction block and a first backward prediction block.

In this operation, the first forward prediction block with a width of cuW+2 and a height of cuH+2 of the first picture block is determined in the second forward prediction block, and the first backward prediction block with a width of cuW+2 and a height of cuH+2 of the first picture block is determined in the second backward prediction block.

Operation S305: Obtain the first prediction block of the first picture block based on the motion information of the first picture block, where the width of the first prediction block is cuW+2, and the height of the first prediction block is cuH+2.

In this operation, for a detailed process of obtaining the first prediction block, refer to related content in operation 103 in the embodiment shown in FIG. 12. Details are not described herein again.

Operation S306: Perform a gradient operation on the first prediction block of the first picture block to obtain a first gradient matrix of the first picture block, where a width of the first gradient matrix is cuW, and a height of the first gradient matrix is cuH.

The first gradient matrix includes a first forward horizontal gradient matrix, a first forward vertical gradient matrix, a first backward horizontal gradient matrix, and a first backward vertical gradient matrix.

For a detailed implementation process of this operation, refer to related content in operation 104 in the embodiment shown in FIG. 12. Details are not described herein again.

Operation S307: Perform first expansion on the width and the height of the first gradient matrix based on a gradient at a matrix edge location of the first gradient matrix, so that a width and a height of a first gradient matrix obtained after the first expansion are respectively two samples greater than the width and the height of the first picture block.

For a detailed implementation process of this operation, refer to related content in operation 105 in the embodiment shown in FIG. 12. Details are not described herein again.

Operations S308 to S310 are the same as operations 106 to 108 respectively, and details are not described herein again.

The inter prediction method shown in FIG. 15 may be summarized as operations 1 to 6, and operations 1 to 6 may be as follows:

Operation 1: Determine motion information of a current CU.

The motion information of the current CU may be determined by using a merge mode, an AMVP mode (refer to the descriptions in the background), or another mode. This is not limited herein.

It should be noted that another method for determining motion information may also be applied to this application. Details are not described herein.

Operation 2: Determine whether the current CU meets a use condition of BIO.

If bidirectional prediction is performed on the current CU, and a relationship between a forward reference frame number POC_L0, a backward reference frame number POC_L1, and a current frame number POC_Cur meets the following formula, the current CU meets the use condition of BIO:

$$(POC\_L0 - POC\_Cur) * (POC\_L1 - POC\_Cur) < 0$$

It should be noted that another use condition of BIO may also be applied to this application. Details are not described herein.

If the current CU meets the use condition of BIO, operation 3 is performed, or otherwise, motion compensation is performed in another manner.

Operation 3: Calculate forward and backward predictors of the current CU.

If cuW is greater than or equal to VPDU_X or cuH is greater than or equal to VPDU_Y, motion compensation is performed by using the motion information, to obtain the forward and backward predictors $I^{(k)}(i,j)$, where i=−2 . . . cuW+1, and j=−2 . . . cuH+1 (a prediction matrix of (cuW+4)*(cuH+4) is obtained by using a same interpolation filter).

If cuW is less than VPDU_X or cuH is less than VPDU_Y, motion compensation is performed by using the motion information, to obtain the forward and backward predictors $I^{(k)}(i,j)$, where i=−1 . . . cuW, and j=−1 . . . cuH (a prediction matrix of (cuW+2)*(cuH+2) is obtained).

In $I^{(k)}(i,j)$, i=0 . . . cuW−1, and j=0 . . . cuH−1, which are obtained by performing interpolation by using an 8-tap interpolation filter, and a predictor of another location (expansion by one row and one column is performed) is obtained by performing interpolation by using a bilinear interpolation filter.

It should be understood that the predictor may be obtained by using the VPDU as a minimum predictor obtaining unit, or the predictor may be obtained by using a block smaller than the VPDU as a minimum predictor obtaining unit. This is not limited.

It should be noted that the predictor of the expanded region may also be obtained by using another method, for example, by using an 8-tap interpolation filter, or by directly using a reference sample at an integer sample location. This is not limited herein.

It should be noted that a SAD between forward and backward predictors is calculated, to determine whether the SAD is less than a threshold TH_CU, and if the SAD is less than the threshold TH_CU, BIO is not performed, or otherwise, BIO is performed. Another determining method may also be applied to this application, and details are not described herein.

A formula for calculating the SAD is as follows:

$$SAD = \sum_{j=0..cuH-1} \sum_{i=0..cuW-1} abs\left(I^{(1)}(i, j) - I^{(0)}(i, j)\right) \qquad (9)$$

The threshold TH_CU may be set to $(1<<(BD-8+shift))$ *cuW*cuH, and shift may be set to Max(2, 14-BD).

Operation 4: Calculate horizontal and vertical gradients based on the forward and backward predictors of the current CU.

If cuW is greater than or equal to VPDU_X or cuH is greater than or equal to VPDU_Y, the horizontal and vertical gradients $$\frac{\partial I^{(k)}}{\partial x}(i, j) \text{ and } \frac{\partial I^{(k)}}{\partial y}(i, j)$$

are calculated according to the formula (4), where $i=-1 \ldots$ cuW, and $j=-1 \ldots$ cuH (a gradient matrix of (cuW+2)* (cuH+2) is obtained).

If cuW is less than VPDU_X or cuH is less than VPDU_Y, the horizontal and vertical gradients $$\frac{\partial I^{(k)}}{\partial x}(i, j) \text{ and } \frac{\partial I^{(k)}}{\partial y}(i, j)$$

are calculated based on the forward and backward predictors according to the formula (4), where $i=0 \ldots$ cuW-1, and $j=0 \ldots$ cuH-1 (a gradient matrix of cuW*cuH is obtained).

Operation 5: If cuW is less than VPDU_X and cuH is less than VPDU_Y, perform padding on the forward and backward predictors of the current CU and the horizontal and vertical gradients.

Padding is performed by using the method in FIG. 9, to obtain $I^{(k)}(i,j)$, $$\frac{\partial I^{(k)}}{\partial x}(i, j), \text{ and } \frac{\partial I^{(k)}}{\partial y}(i, j),$$

where $i=-1 \ldots$ cuW, and $j=-1 \ldots$ cuH (the prediction matrix of (cuW+2)*(cuH+2), a horizontal gradient matrix, and a vertical gradient matrix are obtained).

Operation 6: Derive a refined motion vector of each 4×4 subblock, and then perform weighting.

For each 4×4 subblock, vx and vy are obtained according to the formula (2). Finally, weighting is performed according to the formula (6) to obtain a predictor of each 4×4 subblock.

It should be noted that a SAD between forward and backward predictors of each 4×4 subblock may be calculated to determine whether the SAD is less than a threshold TH_SCU. If the SAD is less than the threshold TH_SCU, weighted averaging is directly performed, or otherwise, vx and vy are obtained according to the formula (2), and then weighting is performed according to the formula (6). Another determining method may also be applied to this application, and details are not described herein. TU_SCU may be set to $1<<(BD-3+shift)$.

In this embodiment of this application, BIO prediction is performed on a boundary of the VPDU and a boundary of the CU in a same manner. When the CU includes a plurality of VPDUs, complexity of implementing motion compensation prediction is reduced.

In this embodiment of this application, when cuW is greater than or equal to Width and/or cuH is greater than or equal to Height, the second prediction block of the first picture block is obtained based on the motion information of the first picture block. Because the width of the second prediction block is cuW+4, and the height of the second prediction block is cuH+4, the gradient operation is performed on the second prediction block of the first picture block to obtain the first gradient matrix with the width of cuW+2 and the height of cuH+2, so that expansion processing can be omitted from the edge of the first gradient matrix, thereby improving inter prediction efficiency.

FIG. 17 is a schematic flowchart of a method according to an embodiment of this application. As shown in the figure, an inter prediction method is provided, and includes the following operations.

Operation S1201: Obtain motion information of a to-be-processed picture block, where the to-be-processed picture block includes a plurality of virtual pipeline data units, and the virtual pipeline data unit includes at least one basic processing unit.

Operation S1202: Obtain a predictor matrix of each virtual pipeline data unit based on the motion information.

Operation S1203: Calculate a horizontal prediction gradient matrix and a vertical prediction gradient matrix of each virtual pipeline data unit based on each predictor matrix.

Operation S1204: Calculate a motion information refinement value of each basic processing unit in each virtual pipeline data unit based on the predictor matrix, the horizontal prediction gradient matrix, and the vertical prediction gradient matrix.

In an embodiment, the obtaining a predictor matrix of each virtual pipeline data unit based on the motion information includes: obtaining an initial prediction matrix of each virtual pipeline data unit based on the motion information, where a size of the initial prediction matrix is equal to a size of the virtual pipeline data unit; and using the initial prediction matrix as the predictor matrix.

In an embodiment, after the obtaining an initial prediction matrix of each virtual pipeline data unit, the method further includes: performing sample expansion on an edge of the initial prediction matrix to obtain an expanded prediction matrix, where a size of the expanded prediction matrix is greater than the size of the initial prediction matrix; and correspondingly, the using the initial prediction matrix as the predictor matrix includes: using the expanded prediction matrix as the predictor matrix.

In an embodiment, the performing sample expansion on an edge of the initial prediction matrix includes: obtaining a sample value of a sample outside the initial prediction matrix based on an interpolation of a sample value of a sample in the initial prediction matrix; or using a sample value of a sample on the edge of the initial prediction matrix as a sample value of a sample that is outside the initial prediction matrix and that is neighboring to the edge.

In an embodiment, the virtual pipeline data unit includes a plurality of motion compensation units, and the obtaining a predictor matrix of each virtual pipeline data unit based on the motion information includes: obtaining a compensation value matrix of each motion compensation unit based on the motion information; and combining the compensation value matrices of the plurality of motion compensation units to obtain the predictor matrix.

In an embodiment, the calculating a horizontal prediction gradient matrix and a vertical prediction gradient matrix of each virtual pipeline data unit based on each predictor matrix includes: separately performing horizontal gradient calculation and vertical gradient calculation on the predictor matrix to obtain the horizontal prediction gradient matrix and the vertical prediction gradient matrix.

In an embodiment, before the calculating a motion information refinement value of each basic processing unit in each virtual pipeline data unit based on the predictor matrix, the horizontal prediction gradient matrix, and the vertical prediction gradient matrix, the method further includes: performing sample expansion on an edge of the predictor matrix to obtain a padding prediction matrix, where the padding prediction matrix has a preset size; and separately performing gradient expansion on an edge of the horizontal prediction gradient matrix and an edge of the vertical prediction gradient matrix to obtain a padding horizontal gradient matrix and a padding vertical gradient matrix, where the padding horizontal gradient matrix and the padding vertical gradient matrix each have the preset size; and correspondingly, the calculating a motion information refinement value of each basic processing unit in each virtual pipeline data unit based on the predictor matrix, the horizontal prediction gradient matrix, and the vertical prediction gradient matrix includes: calculating the motion information refinement value of each basic processing unit in each virtual pipeline data unit based on the padding prediction matrix, the padding horizontal gradient matrix, and the padding vertical gradient matrix.

In an embodiment, before the performing sample expansion on an edge of the predictor matrix, the method further includes: determining that a size of the predictor matrix is less than the preset size.

In an embodiment, before the performing gradient expansion on an edge of the horizontal prediction gradient matrix and an edge of the vertical prediction gradient matrix, the method further includes: determining that a size of the horizontal prediction gradient matrix and/or a size of the vertical prediction gradient matrix are/is less than the preset size.

In an embodiment, after the calculating a motion information refinement value of each basic processing unit in each virtual pipeline data unit, the method further includes: obtaining a predictor of each basic processing unit based on the predictor matrix of the virtual pipeline data unit and the motion information refinement value of each basic processing unit in the virtual pipeline data unit.

In an embodiment, the method is used for bi-directional prediction; correspondingly, the motion information includes first reference frame list motion information and second reference frame list motion information; the predictor matrix includes a first predictor matrix and a second predictor matrix, the first predictor matrix is obtained based on the first reference frame list motion information, and the second predictor matrix is obtained based on the second reference frame list motion information; the horizontal prediction gradient matrix includes a first horizontal prediction gradient matrix and a second horizontal prediction gradient matrix, the first horizontal prediction gradient matrix is calculated based on the first predictor matrix, and the second horizontal prediction gradient matrix is calculated based on the second predictor matrix; the vertical prediction gradient matrix includes a first vertical prediction gradient matrix and a second vertical prediction gradient matrix, the first vertical prediction gradient matrix is calculated based on the first predictor matrix, and the second vertical prediction gradient matrix is calculated based on the second predictor matrix; and the motion information refinement value includes a first reference frame list motion information refinement value and a second reference frame list motion information refinement value, the first reference frame list motion information refinement value is calculated based on the first predictor matrix, the first horizontal prediction gradient matrix, and the first vertical prediction gradient matrix, and the second reference frame list motion information refinement value is calculated based on the second predictor matrix, the second horizontal prediction gradient matrix, and the second vertical prediction gradient matrix.

In an embodiment, before the performing sample expansion on an edge of the initial prediction matrix, the method further includes: determining that a time domain location of a picture frame in which the to-be-processed picture block is located is located between a first reference frame indicated by the first reference frame list motion information and a second reference frame indicated by the second reference frame list motion information.

In an embodiment, after the obtaining a predictor matrix of each virtual pipeline data unit, the method further includes: determining that a difference between the first predictor matrix and the second predictor matrix is less than a first threshold.

In an embodiment, the motion information refinement value of the basic processing unit corresponds to one basic predictor matrix in the predictor matrix; and before the calculating a motion information refinement value of each basic processing unit in each virtual pipeline data unit based on the predictor matrix, the horizontal prediction gradient matrix, and the vertical prediction gradient matrix, the method further includes: determining that a difference between the first basic predictor matrix and the second basic predictor matrix is less than a second threshold.

In an embodiment, a size of the basic processing unit is 4×4.

In an embodiment, a width of the virtual pipeline data unit is W, a height of the virtual pipeline data unit is H, and the size of the expanded prediction matrix is (W+n+2)×(H+n+2). Correspondingly, the size of the horizontal prediction gradient matrix is (W+n)×(H+n), and the size of the vertical prediction gradient matrix is (W+n)×(H+n), where W and H are positive integers, and n is an even number.

In an embodiment, n is 0, 2, or −2.

In an embodiment, before the obtaining motion information of a to-be-processed picture block, the method further includes: determining that the to-be-processed picture block includes the plurality of virtual pipeline data units.

FIG. 18 is a schematic flowchart of a method according to an embodiment of this application. As shown in the figure, an inter prediction apparatus is provided, and includes:

an obtaining module 1301, configured to obtain motion information of a to-be-processed picture block, where the to-be-processed picture block includes a plurality of virtual pipeline data units, and the virtual pipeline data unit includes at least one basic processing unit;

a compensation module 1302, configured to obtain a predictor matrix of each virtual pipeline data unit based on the motion information;

a calculation module 1303, configured to calculate a horizontal prediction gradient matrix and a vertical prediction gradient matrix of each virtual pipeline data unit based on each predictor matrix; and a refinement module 1304, configured to calculate a motion information refinement value of each basic processing unit in each virtual pipeline data unit based on the predictor matrix, the horizontal prediction gradient matrix, and the vertical prediction gradient matrix.

In an embodiment, the compensation module 1302 is specifically configured to: obtain an initial prediction matrix of each virtual pipeline data unit based on the motion information, where a size of the initial prediction matrix is equal to a size of the virtual pipeline data unit; and use the initial prediction matrix as the predictor matrix.

In an embodiment, the compensation module 1302 is specifically configured to: perform sample expansion on an edge of the initial prediction matrix to obtain an expanded prediction matrix, where a size of the expanded prediction matrix is greater than the size of the initial prediction matrix; and use the expanded prediction matrix as the predictor matrix.

In an embodiment the compensation module 1302 is specifically configured to: obtain a sample value of a sample outside the initial prediction matrix based on an interpolation of a sample value of a sample in the initial prediction matrix; or use a sample value of a sample on the edge of the initial prediction matrix as a sample value of a sample that is outside the initial prediction matrix and that is neighboring to the edge.

In an embodiment, the virtual pipeline data unit includes a plurality of motion compensation units, and the compensation module is specifically configured to: obtain a compensation value matrix of each motion compensation unit based on the motion information; and combine the compensation value matrices of the plurality of motion compensation units to obtain the predictor matrix.

In an embodiment, the calculation module 1303 is specifically configured to separately perform horizontal gradient calculation and vertical gradient calculation on the predictor matrix to obtain the horizontal prediction gradient matrix and the vertical prediction gradient matrix.

In an embodiment, the apparatus further includes a padding module 1305, configured to: perform sample expansion on an edge of the predictor matrix to obtain a padding prediction matrix, where the padding prediction matrix has a preset size; separately perform gradient expansion on an edge of the horizontal prediction gradient matrix and an edge of the vertical prediction gradient matrix to obtain a padding horizontal gradient matrix and a padding vertical gradient matrix, where the padding horizontal gradient matrix and the padding vertical gradient matrix each have the preset size; and calculate the motion information refinement value of each basic processing unit in each virtual pipeline data unit based on the padding prediction matrix, the padding horizontal gradient matrix, and the padding vertical gradient matrix.

In an embodiment, the apparatus further includes a determining module 1306, configured to determine that a size of the predictor matrix is less than the preset size.

In an embodiment, the determining module 1306 is further configured to determine that a size of the horizontal prediction gradient matrix and/or a size of the vertical prediction gradient matrix are/is less than the preset size.

In an embodiment, the refinement module 1304 is further configured to obtain a predictor of each basic processing unit based on the predictor matrix of the virtual pipeline data unit and the motion information refinement value of each basic processing unit in the virtual pipeline data unit.

In an embodiment, the apparatus is used for bi-directional prediction; correspondingly, the motion information includes first reference frame list motion information and second reference frame list motion information; the predictor matrix includes a first predictor matrix and a second predictor matrix, the first predictor matrix is obtained based on the first reference frame list motion information, and the second predictor matrix is obtained based on the second reference frame list motion information; the horizontal prediction gradient matrix includes a first horizontal prediction gradient matrix and a second horizontal prediction gradient matrix, the first horizontal prediction gradient matrix is calculated based on the first predictor matrix, and the second horizontal prediction gradient matrix is calculated based on the second predictor matrix; the vertical prediction gradient matrix includes a first vertical prediction gradient matrix and a second vertical prediction gradient matrix, the first vertical prediction gradient matrix is calculated based on the first predictor matrix, and the second vertical prediction gradient matrix is calculated based on the second predictor matrix; and the motion information refinement value includes a first reference frame list motion information refinement value and a second reference frame list motion information refinement value, the first reference frame list motion information refinement value is calculated based on the first predictor matrix, the first horizontal prediction gradient matrix, and the first vertical prediction gradient matrix, and the second reference frame list motion information refinement value is calculated based on the first predictor matrix, the second horizontal prediction gradient matrix, and the second vertical prediction gradient matrix.

In an embodiment, the determining module 1306 is further configured to determine that a time domain location of a picture frame in which the to-be-processed picture block is located is located between a first reference frame indicated by the first reference frame list motion information and a second reference frame indicated by the second reference frame list motion information.

In an embodiment, the determining module 1306 is further configured to determine that a difference between the first predictor matrix and the second predictor matrix is less than a first threshold.

In an embodiment, the determining module 1306 is further configured to determine that a difference between the first basic predictor matrix and the second basic predictor matrix is less than a second threshold.

In an embodiment, a size of the basic processing unit is 4×4.

In an embodiment, a width of the virtual pipeline data unit is W, a height of the virtual pipeline data unit is H, and the size of the expanded prediction matrix is (W+n+2)×(H+n+2). Correspondingly, the size of the horizontal prediction gradient matrix is (W+n)×(H+n), and the size of the vertical prediction gradient matrix is (W+n)(H+n), where W and H are positive integers, and n is an even number.

In an embodiment, n is 0, 2, or −2.

In an embodiment, the determining module 1306 is further configured to determine that the to-be-processed picture block includes the plurality of virtual pipeline data units.

Figure 19:
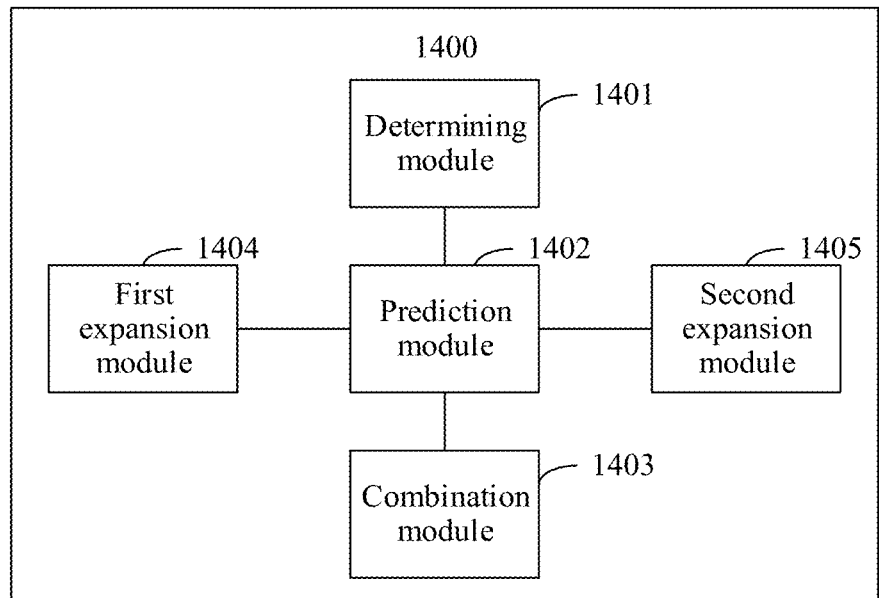
FIG. 19 is a structural block diagram of another inter prediction apparatus according to an embodiment of this application.

FIG. 19 is a schematic flowchart of a method according to an embodiment of this application. As shown in the figure, an inter prediction apparatus 1400 is provided, and includes:

a determining module 1401, configured to determine a plurality of first picture blocks in a to-be-processed picture block based on a preset picture split width, a preset picture split height, and a width and a height of the to-be-processed picture block;

a prediction module 1402, configured to separately perform bi-directional optical flow prediction on the plurality of first picture blocks to obtain a predictor of each first picture block; and a combination module 1403, configured to obtain a predictor of the to-be-processed picture block with a combination of the predictors of the plurality of first picture blocks.

In an embodiment, the determining module 1401 is configured to:

compare the preset picture split width with the width of the to-be-processed picture block to determine widths of the first picture blocks;

compare the preset picture split height with the height of the to-be-processed picture block to determine heights of the first picture block; and determine the plurality of first picture blocks in the to-be-processed picture block based on the widths and the heights of the first picture block.

In an embodiment, the width of the first picture block is a smaller value in the preset picture split width and the width of the to-be-processed picture block, and the height of the first picture block is a smaller value in the preset picture split height and the height of the to-be-processed picture block.

In an embodiment, the prediction module 1402 is configured to:

obtain a first prediction block of the first picture block based on motion information of the to-be-processed picture block;

perform a gradient operation on the first prediction block to obtain a first gradient matrix of the first picture block;

calculate a motion information refinement value of each basic processing unit in the first picture block based on the first prediction block and the first gradient matrix; and obtain the predictor of the first picture block based on the motion information refinement value of each basic processing unit.

In an embodiment, the apparatus 1400 further includes a first expansion module 1404.

The first expansion module is configured to: perform first expansion on a width and a height of the first prediction block based on a sample value of a block edge location of the first prediction block, so that a width and a height of a first prediction block obtained after the first expansion are respectively two samples greater than the width and the height of the first picture block; and/or perform first expansion on a width and a height of the first gradient matrix based on a gradient of a matrix edge location of the first gradient matrix, so that a width and a height of a first gradient matrix obtained after the first expansion are respectively two samples greater than the width and the height of the first picture block; and Correspondingly, the prediction module 1402 is configured to calculate the motion information refinement value of each basic processing unit in the first picture block based on the first prediction block obtained after the first expansion and/or the first gradient matrix obtained after the first expansion.

In an embodiment, the apparatus further includes a second expansion module 1405.

The second expansion module is configured to: perform interpolation filtering on sample values of a block edge region of the first prediction block, or replicate the sample value of the block edge location of the first prediction block, to perform second expansion on the width and the height of the first prediction block.

Correspondingly, the prediction module 1402 is configured to perform a gradient operation on a first prediction block obtained after the second expansion.

In an embodiment, the first prediction block includes a forward prediction block and a backward prediction block, and the first gradient matrix comprises a forward horizontal gradient matrix, a forward vertical gradient matrix, a backward horizontal gradient matrix, and a backward vertical gradient matrix.

In an embodiment, the preset picture split width is 64, 32, or 16, and the preset picture split height is 64, 32, or 16.

In an embodiment, the basic processing unit is a 4×4 sample matrix.

In this embodiment of this application, the determining module determines the plurality of first picture blocks in the to-be-processed picture block based on the preset picture split width, the preset picture split height, and the width and the height of the to-be-processed picture block. Therefore, a size of the first picture block is constrained by the preset picture split width and the preset picture split height, and an area of each determined first picture block is not very large, so that fewer hardware resources such as memory resources can be consumed, complexity of implementing inter prediction can be reduced, and processing efficiency can be improved.

A person skilled in the art can understand that the functions described with reference to various illustrative logical blocks, modules, and algorithm operations disclosed and described in this specification can be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). Therefore, the computer-readable medium may generally correspond to (1) a non-transitory tangible computer-readable storage medium or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example rather than limitation, such computer-readable storage medium may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium include no connection, carrier, signal, or any other transitory media, but are actually directed to a non-transitory tangible storage medium. A disk and a disc used in this specification include a compact disc (CD), a laser disc, an optical disc, a digital versatile disc (DVD), and a Blu-ray disc. The disk usually reproduces data magnetically, and the disc reproduces data optically by using a laser. Combinations of the foregoing items also should fall within the scope of the computer-readable medium.

The instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be all implemented in one or more circuits or logic elements.

The technologies in this application may be implemented in various apparatuses or devices that include a wireless handset, an integrated circuit (IC), or an IC set (for example, a chip set). Various components, modules, or units are described in this application to emphasize functional aspects of the apparatuses configured to implement the disclosed technologies, which are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, the descriptions in each embodiment have respective focuses. For a part that is not described in detail in an embodiment, refer to related descriptions in other embodiments.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An inter prediction method, comprising:
determining a plurality of first picture blocks in a to-be-processed picture block based on a preset picture split width, a preset picture split height, and a width and a height of the to-be-processed picture block;
obtaining a first prediction block of a first picture block in the plurality of first picture blocks based on motion information of the to-be-processed picture block, wherein the motion information of the to-be-processed picture block comprises information of a forward reference picture, a backward reference picture, a forward motion vector, and a backward motion vector;

obtaining a first gradient matrix of the first picture block based on the first prediction block; calculating a motion information refinement value of each basic processing unit in the first picture block based on the first prediction block and the first gradient matrix;
obtaining a predictor of the first picture block based on the motion information refinement value of each basic processing unit; and
obtaining a predictor of the to-be-processed picture block based on the predictors of the plurality of first picture blocks.

2. The method according to claim 1, wherein the determining a plurality of first picture blocks in a to-be-processed picture block based on a preset picture split width, a preset picture split height, and a width and a height of the to-be-processed picture block comprises:
comparing the preset picture split width with the width of the to-be-processed picture block to determine widths of the first picture blocks;
comparing the preset picture split height with the height of the to-be-processed picture block to determine heights of the first picture blocks; and
determining the plurality of first picture blocks in the to-be-processed picture block based on the widths and the heights of the first picture blocks.

3. The method according to claim 1, wherein the width of the first picture block is a smaller value of the preset picture split width and the width of the to-be-processed picture block, and the height of the first picture block is a smaller value of the preset picture split height and the height of the to-be-processed picture block.

4. The method according to claim 1, wherein the method further comprises:
performing first expansion on a width and a height of the first prediction block based on a sample value of a block edge location of the first prediction block, so that a width and a height of a first prediction block obtained after the first expansion are respectively two samples greater than the width and the height of the first picture block; and/or
performing first expansion on a width and a height of the first gradient matrix based on a gradient of a matrix edge location of the first gradient matrix, so that a width and a height of a first gradient matrix obtained after the first expansion are respectively two samples greater than the width and the height of the first picture block; and
correspondingly, the calculating a motion information refinement value of each basic processing unit in the first picture block based on the first prediction block and the first gradient matrix comprises:
calculating the motion information refinement value of each basic processing unit in the first picture block based on the first prediction block obtained after the first expansion and/or the first gradient matrix obtained after the first expansion.

5. The method according to claim 1, wherein the method further comprises:
performing interpolation filtering on sample values of a block edge region of the first prediction block, or replicating a sample value of a block edge location of the first prediction block, to perform second expansion on the width and the height of the first prediction block; and
correspondingly, the obtaining a first gradient matrix of the first picture block comprises: obtaining a first gradient matrix of the first picture block based on a first prediction block obtained after the second expansion.

6. The method according to claim 1, wherein the first prediction block comprises a forward prediction block and a backward prediction block, and the first gradient matrix comprises a forward horizontal gradient matrix, a forward vertical gradient matrix, a backward horizontal gradient matrix, and a backward vertical gradient matrix.

7. The method according to claim 1, wherein the preset picture split width is 64, 32, or 16, and the preset picture split height is 64, 32, or 16.

8. The method according to claim 1, wherein the basic processing unit is a 4×4 sample matrix.

9. An inter prediction device, comprising:

one or more processors;

a computer-readable storage medium coupled to the one or more processors and storing instructions, which when executed by the one or more processors, cause the inter prediction device to perform operations, the operations comprising:

determining a plurality of first picture blocks in a to-be-processed picture block based on a preset picture split width, a preset picture split height, and a width and a height of the to-be-processed picture block;

obtaining a first prediction block of a first picture block in the plurality of first picture blocks based on motion information of the to-be-processed picture block, wherein the motion information of the to-be-processed picture block comprises information of a forward reference picture, a backward reference picture, a forward motion vector, and a backward motion vector;

obtaining a first gradient matrix of the first picture block based on the first prediction block; calculating a motion information refinement value of each basic processing unit in the first picture block based on the first prediction block and the first gradient matrix;

obtaining a predictor of the first picture block based on the motion information refinement value of each basic processing unit; and obtaining a predictor of the to-be-processed picture block based on the predictors of the plurality of first picture blocks.

10. The device according to claim 9, wherein the determining a plurality of first picture blocks in a to-be-processed picture block based on a preset picture split width, a preset picture split height, and a width and a height of the to-be-processed picture block comprises:

comparing the preset picture split width with the width of the to-be-processed picture block to determine widths of the first picture blocks;

comparing the preset picture split height with the height of the to-be-processed picture block to determine heights of the first picture blocks; and determining the plurality of first picture blocks in the to-be-processed picture block based on the widths and the heights of the first picture blocks.

11. The device according to claim 9, wherein the width of the first picture block is a smaller value of the preset picture split width and the width of the to-be-processed picture block, and the height of the first picture block is a smaller value of the preset picture split height and the height of the to-be-processed picture block.

12. The device according to claim 9, wherein the operations further comprise:

performing first expansion on a width and a height of the first prediction block based on a sample value of a block edge location of the first prediction block, so that a width and a height of a first prediction block obtained after the first expansion are respectively two samples greater than the width and the height of the first picture block; and/or performing first expansion on a width and a height of the first gradient matrix based on a gradient of a matrix edge location of the first gradient matrix, so that a width and a height of a first gradient matrix obtained after the first expansion are respectively two samples greater than the width and the height of the first picture block; and correspondingly, the calculating a motion information refinement value of each basic processing unit in the first picture block based on the first prediction block and the first gradient matrix comprises:

calculating the motion information refinement value of each basic processing unit in the first picture block based on the first prediction block obtained after the first expansion and/or the first gradient matrix obtained after the first expansion.

13. The device according to claim 9, wherein the operations further comprise:

performing interpolation filtering on sample values of a block edge region of the first prediction block, or replicating a sample value of a block edge location of the first prediction block, to perform second expansion on the width and the height of the first prediction block; and correspondingly, the obtaining a first gradient matrix of the first picture block comprises: obtaining a first gradient matrix of the first picture block based on a first prediction block obtained after the second expansion.

14. The device according to claim 9, wherein the first prediction block comprises a forward prediction block and a backward prediction block, and the first gradient matrix comprises a forward horizontal gradient matrix, a forward vertical gradient matrix, a backward horizontal gradient matrix, and a backward vertical gradient matrix.

15. The device according to claim 9, wherein the preset picture split width is 64, 32, or 16, and the preset picture split height is 64, 32, or 16.

16. The device according to claim 9, wherein the basic processing unit is a 4×4 sample matrix.

17. A non-transitory computer-readable storage medium storing a video bitstream that, when decoded by a coding device, is used by the coding device to generate a video, wherein the video bitstream is generated by operations comprising:

determining a plurality of first picture blocks in a to-be-processed picture block based on a preset picture split width, a preset picture split height, and a width and a height of the to-be-processed picture block;

obtaining a first prediction block of a first picture block in the plurality of first picture blocks based on motion information of the to-be-processed picture block, wherein the motion information of the to-be-processed picture block comprises information of a forward reference picture, a backward reference picture, a forward motion vector, and a backward motion vector;

obtaining a first gradient matrix of the first picture block based on the first prediction block; calculating a motion information refinement value of each basic processing unit in the first picture block based on the first prediction block and the first gradient matrix;

obtaining a predictor of the first picture block based on the motion information refinement value of each basic processing unit; and obtaining a predictor of the to-be-processed picture block based on the predictors of the plurality of first picture blocks.

18. The non-transitory computer-readable storage medium according to claim 17, wherein the first prediction block comprises a forward prediction block and a backward prediction block, and the first gradient matrix comprises a forward horizontal gradient matrix, a forward vertical gradient matrix, a backward horizontal gradient matrix, and a backward vertical gradient matrix.

19. The non-transitory computer-readable storage medium according to claim 17, wherein the preset picture split width is 64, 32, or 16, and the preset picture split height is 64, 32, or 16.

20. The non-transitory computer-readable storage medium according to claim 17, wherein the basic processing unit is a 4×4 sample matrix.

\* \* \* \* \*